US007151647B2

(12) United States Patent
Sasaki et al.

(10) Patent No.: US 7,151,647 B2
(45) Date of Patent: Dec. 19, 2006

(54) THIN FILM MAGNETIC HEAD AND MANUFACTURING METHOD FOR CREATING HIGH SURFACE RECORDING DENSITY AND INCLUDING A SECOND YOKE PORTION HAVING TWO LAYERS OF WHICH ONE IS ETCHED TO FORM A NARROW PORTION AND A SLOPED FLARE PORTION

(75) Inventors: Yoshitaka Sasaki, Milpitas, CA (US); Takehiro Kamigama, Kwai Chung (HK); Hiroyuki Itoh, Milpitas, CA (US); Kazuo Ishizaki, Milpitas, CA (US); Shigeki Tanemura, Milpitas, CA (US); Hironori Araki, Milpitas, CA (US)

(73) Assignees: Headway Technologies, Inc., Milpitas, CA (US); SAE Magnetics (H.K.) Ltd., Kwai Chung (HK)

( * ) Notice: Subject to any disclaimer, the term of this patent is extended or adjusted under 35 U.S.C. 154(b) by 464 days.

(21) Appl. No.: 10/682,732

(22) Filed: Oct. 10, 2003

(65) Prior Publication Data
US 2005/0128639 A1 Jun. 16, 2005

(51) Int. Cl.
G11B 5/187 (2006.01)
(52) U.S. Cl. .................................... 360/126
(58) Field of Classification Search ................ 360/126
See application file for complete search history.

(56) References Cited

U.S. PATENT DOCUMENTS

| 6,043,959 | A | 3/2000 | Crue et al. | 360/317 |
|---|---|---|---|---|
| 6,259,583 | B1 | 7/2001 | Fontana, Jr. et al. | 360/126 |
| 6,466,401 | B1* | 10/2002 | Hong et al. | 360/123 |
| 6,678,942 | B1* | 1/2004 | Sasaki | 29/603.25 |
| 6,724,572 | B1* | 4/2004 | Stoev et al. | 360/126 |
| 6,731,457 | B1* | 5/2004 | Oki et al. | 360/126 |
| 6,731,460 | B1* | 5/2004 | Sasaki | 360/126 |
| 6,738,223 | B1* | 5/2004 | Sato et al. | 360/126 |
| 6,751,052 | B1* | 6/2004 | Tagawa et al. | 360/126 |
| 6,857,181 | B1* | 2/2005 | Lo et al. | 29/603.15 |
| 6,882,502 | B1* | 4/2005 | Sato et al. | 360/119 |
| 2005/0128639 | A1 | 6/2005 | Sasaki et al. | |

OTHER PUBLICATIONS

U.S. Appl. No. 10/682,732, filed Oct. 10, 2003, Sasaki, et al.
U.S. Appl. No. 10/759,005, filed Jan. 20, 2004, Sasaki, et al.
U.S. Appl. No. 11/134,447, filed May 23, 2005, Sasaki, et al.
U.S. Appl. No. 11/109,671, filed Apr. 20, 2005, Sasaki, et al.

* cited by examiner

Primary Examiner—Jefferson Evans
(74) Attorney, Agent, or Firm—Oblon, Spivak, McClelland, Maier & Neustadt, P.C.

(57) ABSTRACT

The invention is directed to improvement of a write element of a thin film magnetic head. In the write element, a first coil and a second coil are provided on a first insulating film formed on one surface of a first magnetic film and surround in a spiral form a back gap portion. A second yoke portion in the upper position comprises a wide portion, a narrow portion and a sloping flare portion. The wide portion has a flat surface and is connected to the first magnetic film by a back gap portion at the rear of the medium-facing surface. The narrow portion forms the second pole portion and the surface of the narrow portion being at a lower position than the surface of the wide portion. The sloping flare portion extends from the narrow portion to the wide portion, gradually increasing in width and its surface sloping upward away from the surface of the narrow portion to the surface of the wide portion.

29 Claims, 66 Drawing Sheets

THIN FILM MAGNETIC HEAD AND MANUFACTURING METHOD FOR CREATING HIGH SURFACE RECORDING DENSITY AND INCLUDING A SECOND YOKE PORTION HAVING TWO LAYERS OF WHICH ONE IS ETCHED TO FORM A NARROW PORTION AND A SLOPED FLARE PORTION

BACKGROUND OF THE INVENTION

1. Field of the Invention

The present invention relates to a thin film magnetic head, a magnetic recording device using the same and a method for manufacturing the same, and particularly to improvement of a write element provided in a thin film magnetic head.

2. Discussion of Background

In recent years, the improvement in performance of a thin film magnetic head is demanded with the improvement in surface recording density of a hard disk device. The improvement in performance of a thin film magnetic head must be achieved in two aspects. One aspect is the improvement in performance of a read element, and the other is the improvement in performance of a write element.

The performance of a read element has been remarkably improved by development and practical use of a GMR (giant magnetoresistive) head provided with a spin valve film (SV film) or a ferromagnetic tunnel junction. Recently, this trend is so vigorous as to exceed a surface recording density of 100 Gb/p.

On the other hand, the improvement in performance of a write element has various problems to be solved as described below.

First, since a thin film magnetic head is used as a component of a magnetic recording device in a computer, it is demanded to be excellent in high-frequency characteristic and suitable for a high-speed data transfer. The high-frequency characteristic of a thin film magnetic head is determined by the structure of yokes and coils to form a write element. From such a view point, various prior arts have been proposed up to now.

For example, U.S. Pat. No. 6,043,959 discloses a technique in which a second yoke (upper yoke) is made flat to reduce the mutual inductance of coils and thus improve a high-frequency characteristic. U.S. Pat. No. 6,259,583B1 discloses a structure in which high-permeability and low-anisotropy layers, and non-magnetic layers are alternately stacked to form a second flat yoke.

A flat pole structure as disclosed in the above-mentioned prior arts is defined by photolithography, and a submicron process through a semiconductor process technique on the pole portion is necessary to achieve a narrow-track structure with an enhanced recording density. However, this submicron process is accompanied by the problems as described below.

First, the narrower the structure of a pole portion is made in a track structure, the more the pole portion is liable to cause a magnetic saturation, with degradation in a write ability. Thus a magnetic material with a high saturation magnetic flux density (hereinafter, referred to as an HiBs material) is needed to make the pole portion.

As HiBs materials, there are known FeN, CoFeN, NiFe, CoNiFe and the like. Among them, FeN, CoFeN and the like show a high saturation magnetic flux density of 2.4 T, for example, but they are difficult to form a pattern by plating, and consequently it becomes necessary to form a film of the material by sputtering and subsequently to pattern the film by ion milling. In case of a sputtering film as thick as 0.2 μm or more, accurate control over a track width of 0.2 μm or less, however, is very difficult, concerned with a mask made of photoresist or a mask formed of a magnetic film to form an upper pole.

On the other hand, NiFe, CoNiFe and the like can be easily patterned by plating. And NiFe provides a saturation magnetic flux density of 1.5 T to 1.6 T by increasing Fe in a composition ratio of Fe to Ni. Additionally NiFe is also easy to control the composition ratio.

For a surface recording density of 80 to 100 Gb/p, the track width gets as small as 0.1 to 0.2 μm, demanding a saturation magnetic flux density as high as 2.3 to 2.4 T, and NiFe cannot satisfy the demand. For a plating method, CoNiFe is suitable but CoNiFe is as low as 1.8 T or so in saturation magnetic flux density and cannot satisfy the high saturation magnetic flux density of 2.3 to 2.4 T required for a small track width of 0.1 to 0.2 μm.

Thus it has been usual that on a seed film to be a plating ground film is deposited a sputtering film of CoFe which is 2.4 T in saturation magnetic flux density, and thereon is subsequently deposited a plating film of CoNiFe which is 2.3 T in saturation magnetic flux density, for example.

In case of forming, for example, an upper pole by the above-mentioned technique, it is necessary to use the upper pole as a mask and thus trim the seed film below the upper pole by ion beam or the like in order to achieve a required narrow track width in the upper pole.

However, the seed film is, for example, a sputtering film of CoFe, and thus is very difficult to trimmed by ion beam. Due to this, in case of trimming a lower pole using an upper pole as a mask, the upper pole greatly reduces in film thickness. For example, the upper pole that has been formed as a plating film of 3 to 3.5 μm thick reduces as thin as 1.0 μm. The upper pole having such a thin film thickness causes a magnetic saturation in a write operation, with considerable degradation in an overwrite characteristic.

And since it is necessary to trim the upper pole to a very small width of 0.1 to 0.2 μm by means of ion milling, ion beams need to be applied at a large angle. Due to this, a part closer to the tip of the upper pole is more trimmed and therefore the upper pole is formed into the shape of a triangle or a trapezoid. Thus the upper pole reduces in volume and the reduction in volume increases a risk of a magnetic saturation.

Next, in case of trimming a pole, a trimming mask is deposited so as to surround an upper yoke portion and cover a coil portion, not to cover the upper yoke portion and the upper pole. The reason is that it has been thought that covering the whole of an upper yoke portion and an upper pole connected thereto causes a side wall at the edge of the mask pattern and the side wall deposited to the pole causes a side write phenomenon, side erase phenomenon or the like.

Further, as the upper yoke portion is not covered with a mask, a flare portion, which increases progressively in width from the upper pole to a wide portion of the upper yoke portion, is trimmed by ion beam, so that the flare point, at which the upper yoke portion begins to increase in width, backs away from the air bearing surface (hereinafter, referred to as ABS). This also reduces the magnetic volume, with degradation in the overwrite characteristic.

Generally, the closer the flare point of a flare portion is to the ABS, the more excellent overwrite characteristic is obtained. The flare point must be made close to the ABS, especially in the case of the small track width of 0.2 μm or less. In the conventional trimming method, the flare point recedes not only for the above-mentioned reason, but also for the following reason.

That is to say, as a trimming mask is deposited so as to surround an upper pole portion and cover a coil portion, not to cover the upper yoke portion and the upper pole, metal particles scattered by trimming the lower pole by ion beams are deposited on the side wall faces of the upper pole. To obtain a prescribed track width, the deposit film must be removed. To remove the deposit film, ion beams must be applied at a large angle of 50 to 75 degrees. This ion beam irradiation at a large angle narrows the upper pole. Furthermore, the pole is narrowed to have a taper angle making the width gradually smaller from the flare point toward the ABS, causing a problem that the track width varies according to individual thin film magnetic heads.

And while a narrow-track structure might be achieved by applying a semiconductor process technique on a flat pole structure to perform a submicron process on a pole portion, the surface of a flare portion expanding in width from the pole portion toward the yoke portion forms the same plane as the surfaces of the pole portion and yoke portion, causing problems that, in a write operation, the magnetic flux leaked from a side of the flare portion might erase a magnetic record on an adjacent track in a magnetic recording medium (side erase phenomenon), give a magnetic record to an adjacent track in a magnetic recording medium (side write phenomenon), or the like. Due to these problems, it is difficult to perform an accurate track control of 0.2 µm or less, and consequently it is impossible to achieve a high surface recording density of 100 Gb/p or more.

Next, it is known that in a thin film magnetic head of this type, the shorter the yoke length YL from the back gap to the pole portion is, the more excellent high-frequency characteristic is obtained. In order to shorten the yoke length, it is necessary to reduce the number of turns of a coil positioned between the back gap and the pole portion or to reduce the width of the coil without reducing the number of turns.

As the number of turns of a coil is determined by a magneto motive force required, however, reducing the number of coil turns to shorten the yoke length YL has a limit.

On the other hand, in case of reducing the width of a coil without reducing the number of coil turns, the electric resistance of the coil increases, so a temperature rise due to heat generation in a write operation increases. When the temperature rise increases, the pole portion thermally expands to cause a thermal protrusion that the pole portion swells on the ABS side. When a thermal protrusion occurs, the part where the thermal protrusion has occurred comes into contact with a magnetic recording medium in write and read operations, causing head crash, damage or destruction of a magnetic record on the magnetic recording medium. Consequently, a thermal protrusion must be strictly avoided. If it is impossible to avoid a thermal protrusion, the floating height of a thin film magnetic head must be increased after all, which makes it impossible to meet a demand for a low floating height for a high recording density.

SUMMARY OF THE INVENTION

An object of the present invention is to provide a thin film magnetic head and a magnetic recording device suitable for a high surface recording density of 100 Gb/p or more.

Another object of the present invention is to provide a thin film magnetic head and a magnetic recording device of a high surface recording density type in which a sufficient over-write characteristic can be achieved in spite of a narrow track width.

A further object of the present invention is to provide a thin film magnetic head and a magnetic recording device of a high surface recording density type in which a pole comprises a material with a high saturation magnetic flux density of 2.2 to 2.4 T (referred to as an HiBs material) and has a track width of 0.1 to 0.2 µm.

A still further object of the present invention is to provide a thin film magnetic head and a magnetic recording device of a high surface recording density type having a high-frequency characteristic improved by shortening the yoke length.

A still further object of the present invention is to provide a thin film magnetic head and a magnetic recording device of a high surface recording density type having a yoke length of 5.5 µm or less.

A still further object of the present invention is to provide a thin film magnetic head and a magnetic recording device of a high surface recording density type in which the amount of generated heat is reduced by lowering the resistance of coils as keeping the number of coil turns.

A still further object of the present invention is to provide a manufacturing method suitable for manufacturing a thin film magnetic head described above.

In order to achieve the above-mentioned objects, in a thin film magnetic head according to the present invention, a second yoke portion (upper yoke portion) included in a write element comprises a wide portion and a narrow portion. The wide portion has a flat surface and is connected to a first yoke part by a back gap portion that is recessed in the thin film magnetic head from the medium-facing surface. Consequently, a write magnetic circuit going through the first yoke portion, the back gap portion, the second yoke portion and a write gap film is formed.

The coil surrounds in a spiral form the back gap portion on a first insulating film formed on a flat surface of the first yoke portion. Consequently, a magnetic flux is generated by a write current supplied to the coil, and flows through the write magnetic circuit going through the first yoke portion, the back gap portion, the second yoke portion and the write gap film, and leaks out in the vicinity of the gap film, and thus provides a magnetic recording medium with a magnetic record.

The narrow portion of the second yoke portion comprises a second pole portion and an flare portion. The second pole portion has a surface being at a position lower than the surface of the wide portion. The flare portion extends from the second pole portion to the wide portion, gradually increasing in width and its surface sloping upward away from the surface of the second pole portion to the surface of the wide portion.

In this structure, the sloping flare portion produces a three-dimensional difference in level between the surface of the second pole portion and the surface of the second yoke portion. The three-dimensional difference in level provides a large magnetic volume extending to the flare point, so the overwrite characteristic is improved. Accordingly, the present invention makes it possible to provide a thin film magnetic head of a high surface recording density type in which a sufficient overwrite characteristic is achieved in spite of a narrow track width.

Moreover, as the sloping flare portion is close to the ABS and its surface slopes upward away from the surface of the second pole portion to the surface of the wide portion of the second yoke portion, there is no risk that, in a write operation, a magnetic flux leaked from the sloping flare portion might erase a magnetic record provided on an adjacent track in a magnetic recording medium (side erase phenomena) or give a magnetic record to an adjacent track in a magnetic recording medium (side write phenomena).

Accordingly, the present invention makes it possible to provide a thin film magnetic head of a high surface recording density type which has a track width of 0.1 to 0.2 μm and is suitable for a high surface recording density of 100 Gb/p or more.

As a concrete aspect, the surface of the second pole portion and the surface of the sloping flare portion are obtained by etching part of the surface of a third magnetic film deposited on a second magnetic film. Preferably, the second magnetic film is made of a magnetic material containing Co and Fe. More concretely, the second magnetic film is made of CoFe or CoFeN. CoFe or CoFeN is an HiBs material of 2 to 2.4 T in saturation magnetic flux density, which produces a thin film magnetic head of a high surface recording density type having a track width of 0.1 to 0.2 μm.

Concretely, the second magnetic film of CoFe or CoFeN is formed as a sputtering film, which makes it possible to utilize the second magnetic film as a seed film for a plating process to form the third magnetic film on it. The third magnetic film is made of CoNiFe or the like.

As a preferable aspect, the first pole portion has a pole piece adjacent to the gap film, wherein the pole piece is trimmed at both sides in the width direction to have a narrow part having substantially the same width as the second pole portion and each indention formed by the trimming has a bottom increasing in thickness toward the narrow part. This structure makes it possible to avoid magnetic saturation in the pole piece adjacent to the gap film, and consequently improve the overwrite characteristic.

A magnetic film forming the pole piece adjacent to the gap film is made of CoFe, CoFeN, FeAlN, FeN, FeCo or FeZrN. The magnetic film can be formed as a plating film in case of CoFe or CoFeN, and can be formed as a sputtering film in case of FeAlN, FeN, FeCo or FeZrN.

The coil comprises a first coil and a second coil. The first and second coils surround in a spiral form the back gap portion on the surface of a first insulating film formed on one surface of the first yoke portion. One of the first and second coils is fitted into the space between coil turns of the other, insulated from the coil turns of the other by a second insulating film. The first and second coils are connected to each other so as to generate magnetic flux in the same direction.

The second insulating film between the first coil and the second coil can be formed as a very thin $Al_2O_3$ film of about 0.1 μm in thickness by applying chemical vapor deposition (hereinafter, referred to as CVD) or the like. Therefore, it is possible to maximize the sectional area of the first and second coils between the back gap portion and the first pole portion, and consequently decrease the resistance of the coils and the quantity of generated heat as keeping the number of coil turns. This makes it possible to suppress occurrence of a thermal protrusion in a pole portion, and consequently avoid a head crash and the damage or destruction of a magnetic record on a magnetic recording medium and meet a demand for a low floating height for a high recording density.

As one of the first coil and the second coil is fitted into the space between coil turns of the other, insulated from the coil turns of the other by the second insulating film, high wiring density of coil conductors is achieved. This makes it possible to shorten the yoke length YL as keeping the same number of coil turns.

The first coil and the second coil are connected to each other so as to generate magnetic flux in the same direction. As the first coil and the second coil are the same in winding direction, it is possible to generate magnetic flux in the same direction by making a series-connection structure in which the inner end of the first coil is connected to the outer end of the second coil. Alternatively, magnetic flux may be generated in the same direction by connecting the first coil to the second coil in parallel. In this case, the number of coil turns decreases, but decrease in coil resistance is achieved.

The upper surfaces of the first coil and the second coil form the same plane. This structure makes it possible to form a common third insulating film on the upper surfaces of the first and second coils and so, an insulating structure on the upper surfaces of the first and second coils is simplified. And this structure provides a stable base for forming another coil above the first and second coils, so said another coil can be formed as a high-accuracy pattern.

In case of providing another coil on the first and second coils, the upper surfaces of the pole piece and the back gap piece are also made to form the same plane as the upper surfaces of the first and second coils in addition to flattening the upper surfaces of the coils. By doing so, a pole piece and a back gap piece required for providing another coil can be formed as a high-accuracy pattern on the flattened upper surfaces of the first pole piece and back gap piece.

In general, a thin film magnetic head according to the present invention forms a composite thin-magnetic head comprising a read element as well as a write element. The read element comprises a giant magnetoresistance effect element (hereinafter, referred to as a GMR element). The GMR element comprises a spin valve film or a ferromagnetic tunnel junction.

In case of manufacturing a thin film magnetic head as described above, a third magnetic film is formed so as to be uniform in film thickness and then the whole third magnetic film except parts to become a second pole portion and an inclined flare portion is covered with a resist mask.

Next, at least the parts which are to become the second pole portion and the inclined flare portion and are not covered with the resist mask are etched to obtain a track width made narrow.

According to the above-mentioned manufacturing method, it is possible to surely manufacture a thin film magnetic head according to the present invention.

An etching process as described above can include a process of etching said third magnetic film and said gap film under the existence of said resist mask and then exfoliating said resist mask, and thereafter etching said second magnetic film.

As a further other aspect, said etching process can include a process of performing the etching up to the surface of said gap film under the existence of said resist mask and then exfoliating said resist film, and thereafter etching said gap film and said second pole portion.

The present invention further also discloses a magnetic head device having a thin film magnetic head and a head supporting device combined with each other, and a magnetic recording/reproducing apparatus having this magnetic head device and a magnetic recording medium (hard disk) combined with each other.

Other objects, structures and advantages of the present invention are described in more detail with reference to the accompanying drawings. The drawings are only exemplifications.

DETAILED DESCRIPTION OF THE PREFERRED EMBODIMENTS

1. Thin Film Magnetic Head

Figure 1:
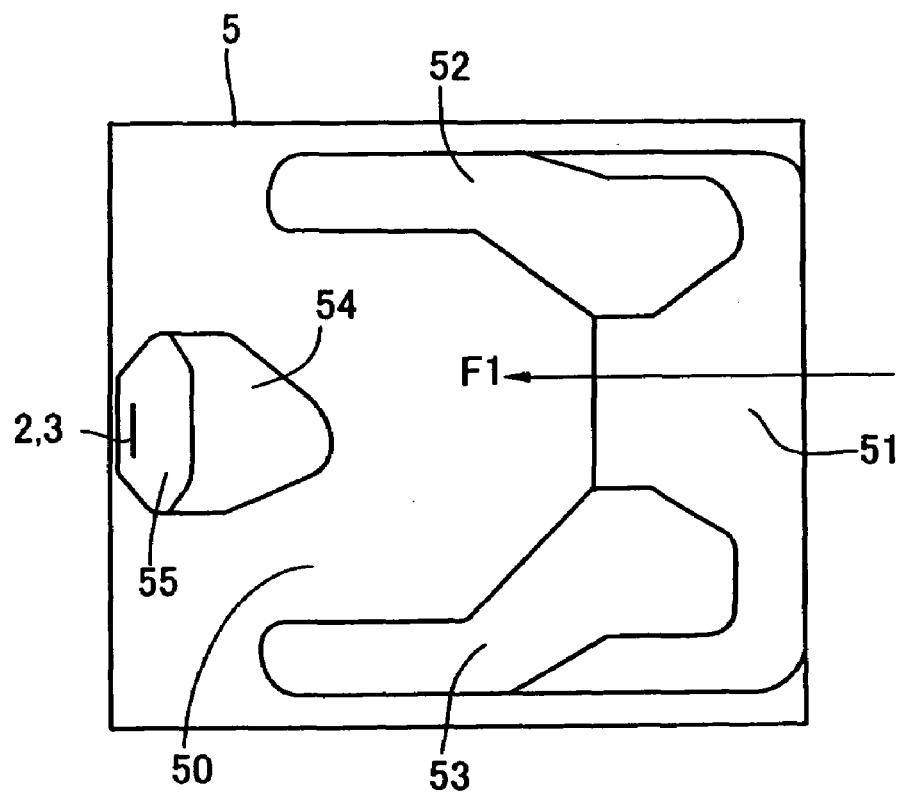
FIG. 1 is a plan view of a thin film magnetic head according to the present invention, seen from the ABS side.
Figure 2:
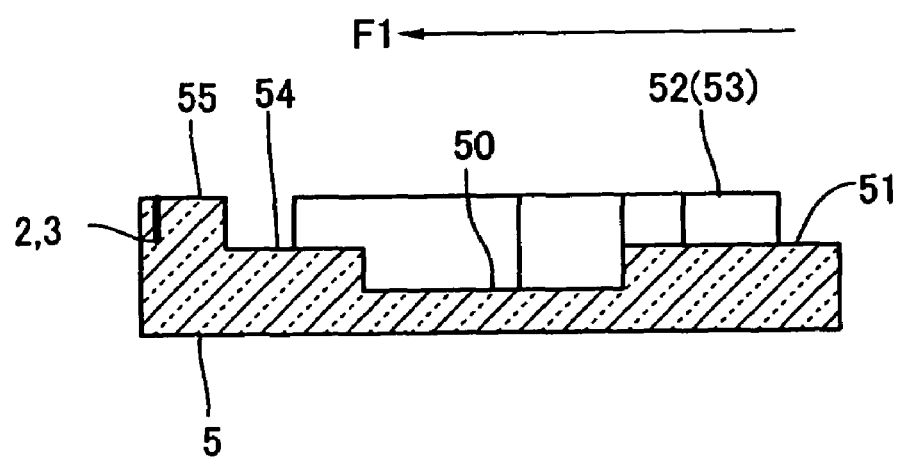
FIG. 2 is a sectional view of the thin film magnetic head shown in FIG. 1.

Referring to FIGS. 1 to 4, a thin film magnetic head according to the present invention comprises a slider 5, a write element 2 and a read element 3. The slider 5 is, for example, a ceramic structure having a base body 15 made of $Al_2O_3$—TiC or the like with an insulating film 16 of $Al_2O_3$, $SiO_2$ or the like provided on the surface thereof (see FIG. 3). The slider 5 has a geometrical shape for controlling a floating characteristic in the surface facing a medium. As a representative example of such a geometrical shape, there is shown an example being provided with a first step part 51, a second step part 52, a third step part 53, a fourth step part 54 and a fifth step part 55 on a base face 50 at the ABS side. The base face 50 becomes a negative pressure generating portion to air flowing in the direction shown by arrow F1, the second step part 52 and the third step part 53 form a step-shaped air bearing rising from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic converter elements 2 and 3 are provided in the fifth step part 55.

The electromagnetic converter elements 2 and 3 comprise a write element 2 and a read element 3. The write element 2 and the read element 3 are provided at the air flowing-out end (trailing edge) side when seeing in the air flowing direction F1.

Figure 3:
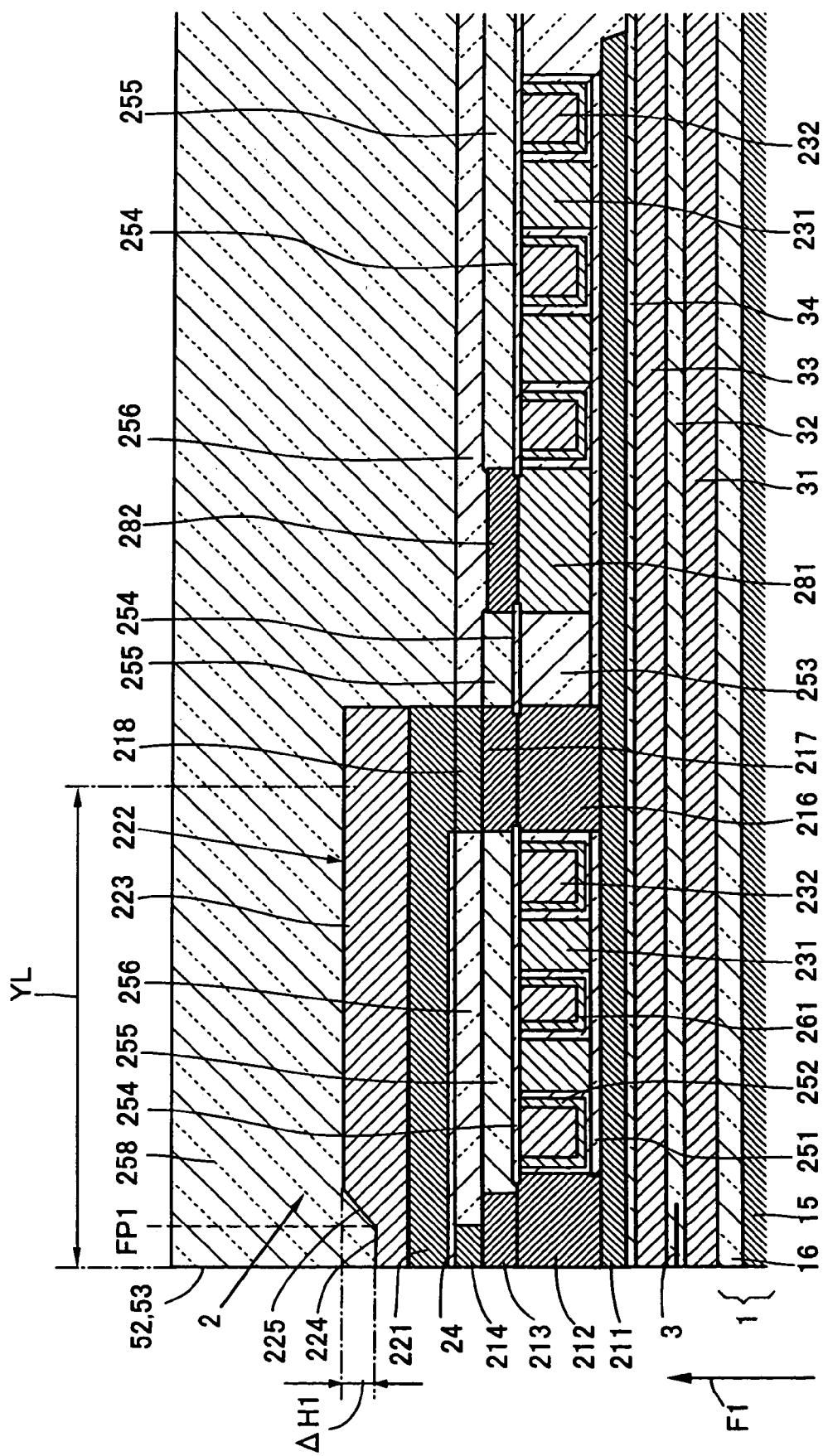
FIG. 3 is a magnified sectional view of an electromagnetic converter portion of the thin film magnetic head shown in FIGS. 1 and 2.
Figure 4:
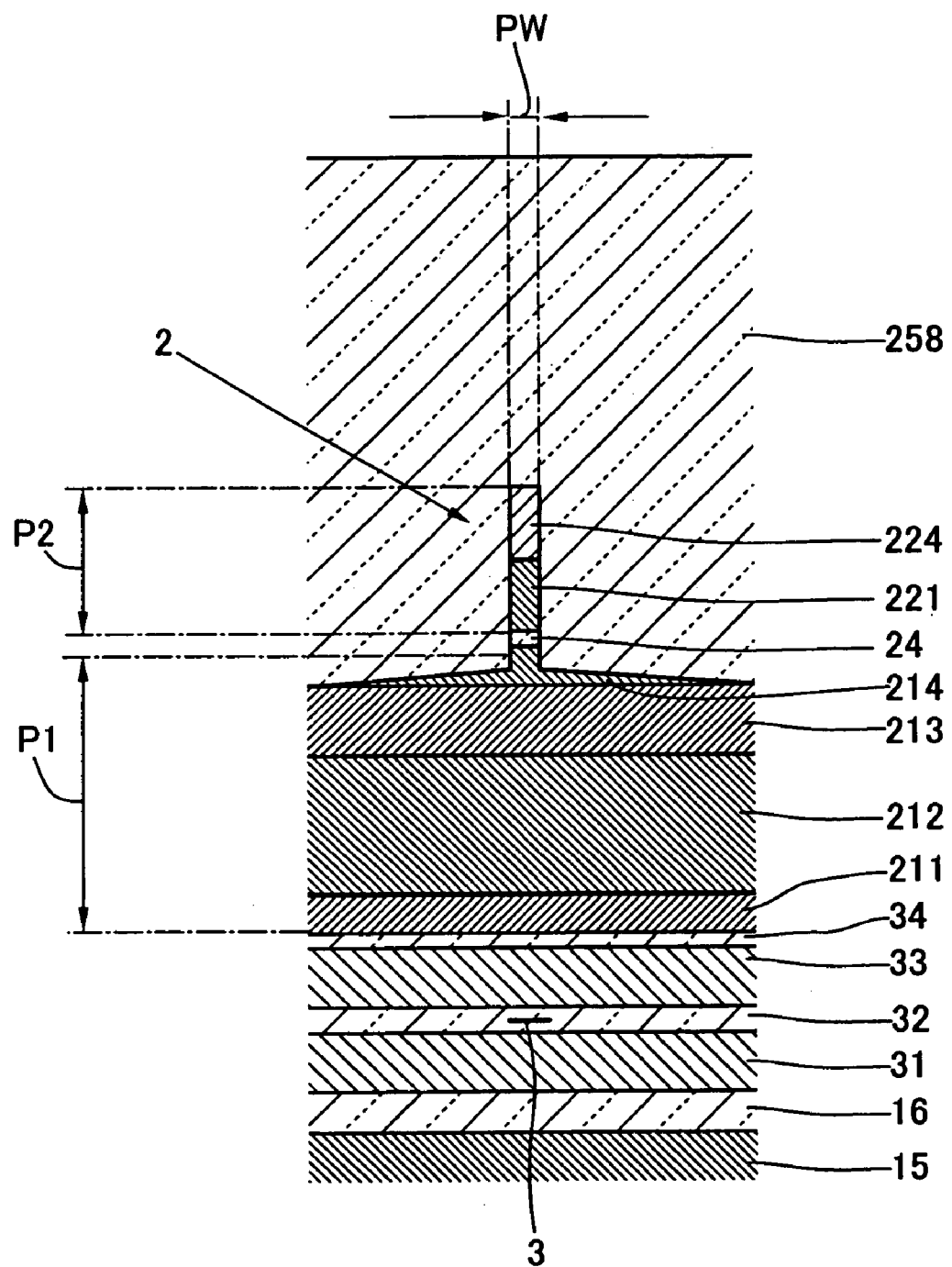
FIG. 4 is a diagram of the electromagnetic converter portion shown in FIG. 3, seen from the ABS side.

Referring to FIGS. 3 and 4, the write element 2 comprises a first yoke portion 211, second yoke portions 221 and 222, a gap film 24 made of alumina or the like, a first pole portion P1, a second pole portion P2, a first coil 231 and a second coil 232.

The first yoke portion 211 is formed of a first magnetic film. In the illustrated embodiment, as the first yoke portion 211 is formed of a first magnetic film of one layer, the first yoke portion 211 has the same meaning as the first magnetic film. For simplification, the following description may sometimes represent the first yoke portion 211 as the first magnetic film 211.

The first magnetic film 211 is supported by an insulating film 34 and its surface is made substantially flat. The insulating film 34 is made of an inorganic insulating material such as $Al_2O_3$, $SiO_2$, AlN or DLC.

The second yoke portions 221 and 222 face the first yoke portion 211 with an inner gap between the second yoke portions and the inner gap. The second yoke portions 221 and 222 have a structure in which a second magnetic film 221 and a third magnetic film 222 are stacked. For simplification of the description, the second yoke portions 221 and 222 may be sometimes represented as the second magnetic film 221 and the third magnetic film 222.

The first magnetic film 211, the second magnetic film 221 and the third magnetic film 222 can be made of one or more magnetic materials selected from NiFe, CoFe, CoFeN, CoNiFe, FeN, FeZrN and the like. Each of the first magnetic film 211, the second magnetic film 221 and the third magnetic film 222 is determined within a range of 0.25 to 3 μm in thickness, for example. Such first magnetic film 211, second magnetic film 221 and third magnetic film 222 can be formed by a sputtering method, a frame plating method or their combination.

In the illustrated embodiment, it is assumed that the first magnetic film 211 is made of CoFeN or CoNiFe. The third magnetic film 222 can be made of CoNiFe, and the second magnetic film 221 can be made of CoFeN being high in saturation magnetic flux density.

The front end portions of the first magnetic film 211, the third magnetic film 222 and the second magnetic film 221 form parts of the first pole portion P1 and the second pole portion P2 opposite each other with a very thin gap film 24, and a write operation is performed in the first pole portion P1 and the second pole portion P2. The gap film 24 is made of a non-magnetic metal film or an inorganic insulating film such as alumina.

In the illustrated embodiment, the first pole portion P1 has a structure in which a second pole piece 212, a third pole piece 213 and a fourth pole piece 214 are deposited in this order on a first pole piece formed of an end portion of the first magnetic film 211. The second pole piece 212, the third pole piece 213 and the fourth pole piece 214 are made of an HiBs material such as CoFeN or CoNiFe.

The second pole portion P2 has a structure in which a fifth pole piece 221 formed of an end portion of the second magnetic film 221 and a sixth pole piece 224 formed of an end portion of the third magnetic film 222 are deposited in this order on the gap film 24.

Referring to FIG. 4, the end portion of the first magnetic film 211, the second pole piece 212 and the third pole piece 213 spread in the track width direction of the ABS. However, the fourth pole piece 214 has the upper end portion narrowed at both sides in the track width direction to produce a narrow track width PW, and the gap film 24 deposited thereon, the fifth pole piece 221 formed of the end portion of the second magnetic film 221 and a sixth pole piece 224 formed of the end portion of the third magnetic film 222 have also nearly the same narrow track width PW as the fourth pole piece 214. Consequently, the narrow track width PW for high-density recording is obtained.

The third magnetic film 222 and the second magnetic film 221 extend to the rear side of the ABS 52, 53 as keeping an inner gap between the first magnetic film 211 and them, and are connected to the first magnetic film 211 by back gap pieces 216, 217 and 218. Consequently, a thin film magnetic circuit going through the first magnetic film 211, the third magnetic film 222, the second magnetic film 221 and the gap film 24 is completed.

The inner gap is filled up with insulating films 254 to 256 and the gap film 24, and the second yoke portion comprised of the second magnetic film 221 and the third magnetic film 222 is formed on the gap film 24.

The second yoke portion comprised of the second magnetic film 221 and the third magnetic film 222 comprises a wide portion 223, a narrow portion 224 and a flare portion 225. The wide portion 223 has a flat surface and is connected to the first magnetic film 211 by the back gap pieces 216 to 218 that are recessed in the thin film magnetic head from the ABS 52, 53. Consequently, a write magnetic circuit going through the first magnetic film 211, the back gap pieces 216 to 218, the second magnetic film 221, the third magnetic film 222 and a write gap film 24 is formed.

The narrow portion 224 is a part forming the second pole portion P2 and its surface is at a position lower than the surface of the wide portion 223. The flare portion 225 extends from the second pole portion P2 to the wide portion 223, gradually increasing in width and its surface sloping upward away from the surface of the second pole portion P2 to the surface of the wide portion 223.

Consequently, the sloping flare portion 225 produces a three-dimensional difference in level ΔH1 between the surface of the narrow portion forming the second pole portion P2 and the surface of the wide portion 223 (see FIG. 3). The three-dimensional difference in level ΔH1 provides a large magnetic volume extending to the flare point FP1 (see FIG. 3), so the overwrite characteristic is improved. Accordingly, the present invention makes it possible to provide a thin film magnetic head of a high surface recording density type in which a sufficient overwrite characteristic is achieved in spite of the narrow track width PW.

Moreover, as the sloping flare portion 225 is close to the ABS 52, 53 and its surface slopes upward away from the surface of the narrow portion 224 to the surface of the wide portion 223, there is no risk that, in a write operation, magnetic flux leaked from the sloping flare portion 225 might erase a magnetic record provided on an adjacent track in a magnetic recording medium (side erase phenomena) or give a magnetic record to an adjacent track in a magnetic recording medium (side write phenomena).

Accordingly, the present invention makes it possible to provide a thin film magnetic head of a high surface recording density type which has a track width of 0.1 to 0.2 μm and is suitable for a high surface recording density of 100 Gb/p or more.

In the first pole portion P1, the fourth pole piece 214 adjacent to the gap film 24 has a film thickness larger than the three-dimensional difference in level ΔH1 made by the sloping flare portion 225 and has a base portion extending in the width direction in both sides. This structure allows the fourth pole piece 214 to have an increased sectional area in addition to an HiBs characteristic, and the increased sectional area prevents magnetic saturation in the fourth pole piece 214. Consequently, an improved overwrite characteristic is obtained.

As a concrete aspect, the surface of the narrow portion 224 and the surface of the sloping flare portion 225 are obtained by etching part of the surface of the third magnetic film 222 deposited on the second magnetic film 221. Preferably, the second magnetic film 221 is made of a magnetic material containing Co and Fe. More concretely, the second magnetic film 221 is made of CoFe or CoFeN. CoFe or CoFeN is an HiBs material of 2.2 to 2.4 T in saturation magnetic flux density, which produces a thin film magnetic head of a high surface recording density type having a track width of 0.1 to 0.2 μm.

Concretely, the second magnetic film 221 of CoFe or CoFeN is formed of a sputtering film, which makes it possible to utilize the second magnetic film 221 as a seed film for a plating process to form the third magnetic film 222 on it. The third magnetic film 222 is made of CoNiFe or the like.

Figure 5:
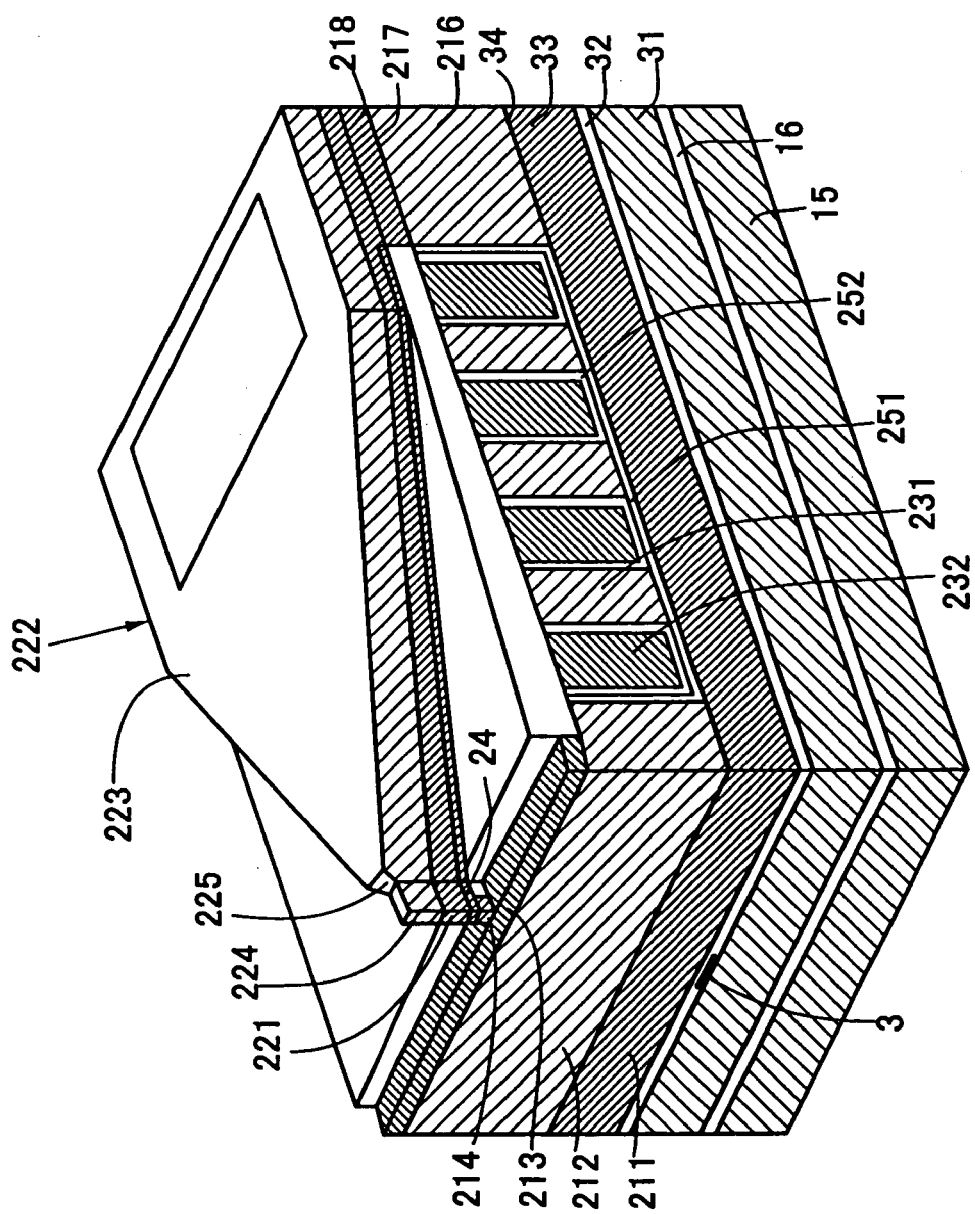
FIG. 5 is a perspective view showing a write element part cut out from the electromagnetic converter portion shown in FIGS. 3 and 4.
Figure 6:
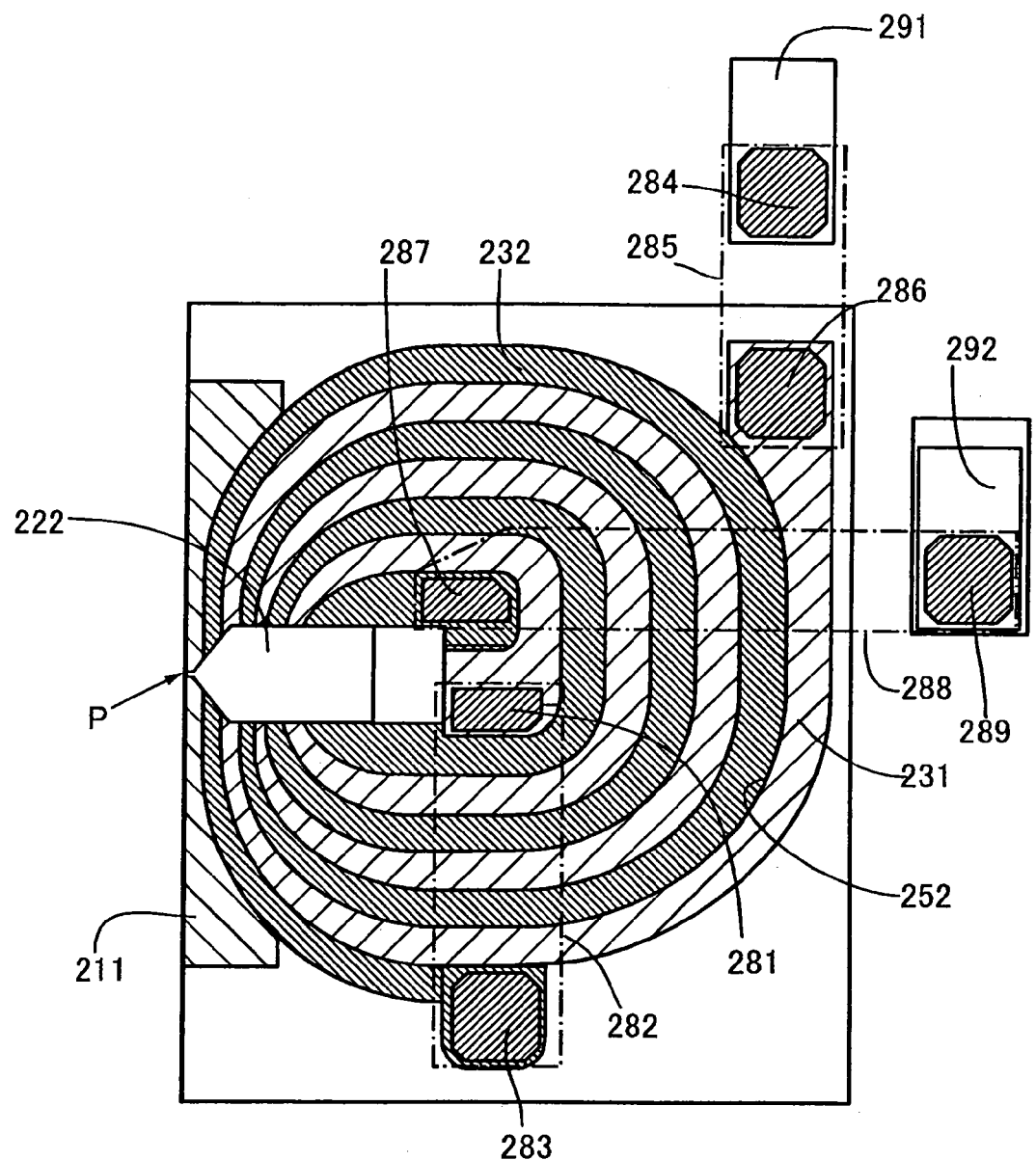
FIG. 6 is a plan view showing a coil structure of the write element part in the electromagnetic converter portion shown in FIGS. 3 to 5.

Next, referring to FIG. 6 together with FIGS. 3 to 5, the first and second coils 231 and 232 surround the back gap pieces 216 to 218. The first coil 231 is in a spiral shape and is formed on the surface of an insulating film 251 formed on a flat surface of the first magnetic film 211, and the pattern of the first coil 231 is wound in a flat form around an axis perpendicular to the surface of the insulating film 251. The first coil 231 is made of a conductive metal material such as Cu (copper). The insulating film 251 is made of an inorganic insulating material such as $Al_2O_3$, $SiO_2$, AlN or DLC.

The second coil 232 is also in a spiral shape and is fitted into the space between coil turns of the first coil 231, insulated from the coil turns by an insulating film 252, and the pattern of the second coil 232 is wound in a flat form around the axis. The second coil 232 is also made of a conductive metal material such as Cu (copper). The insulating film 252 is made of an inorganic insulating material such as $Al_2O_3$, $SiO_2$, AlN or DLC.

The periphery of the first coil 231 and the second coil 232 is filled up with an insulating film 253 (see FIG. 3). The insulating film 253 is also made of an inorganic insulating material such as $Al_2O_3$, $SiO_2$, AlN or DLC.

The insulating film 252 between the first coil 231 and the second coil 232 can be formed as a very thin $Al_2O_3$ film of about 0.1 μm in thickness by applying a CVD process or the like. Therefore, it is possible to maximize the first coil 231 and the second coil 232 in sectional area, and consequently decrease the coil resistance and the quantity of generated heat as keeping the number of coil turns. This makes it possible to suppress occurrence of a thermal protrusion in the pole portions P1, P2 during a write operation, and consequently avoid a head crash, damage and destruction of a magnetic record on a magnetic recording medium and meet a demand for a low floating height for a high recording density.

As the second coil 232 is fitted into the space between coil turns of the first coil 231, insulated from the coil turns by the insulating film 252, high wiring density of coil conductors is achieved. This makes it possible to shorten the yoke length YL (see FIG. 3) as keeping the same number of coil turns and so, the high-frequency characteristic is improved.

The first coil 231 and the second coil 232 are connected to each other so as to generate magnetic flux in the same direction. As the first coil 231 and the second coil 232 have the same winding direction, it is possible to generate the magnetic flux in the same direction by making a series-connection structure in which the inner end 281 of the first coil 231 and the outer end 283 of the second coil 232 are connected to each other by a connecting conductor 282. The outer end 286 of the first coil 231 is connected to a terminal 284 by a connecting conductor 285, led outside by a lead conductor 291 and connected to a takeout electrode. The inner end 287 of the second coil 232 is connected to a terminal 289 by a connecting conductor 288, led outside by a lead conductor 292 and connected to a takeout electrode.

Unlike the structure shown in FIG. 6, magnetic flux may be generated in the same direction by connecting the first coil 231 and the second coil 232 in parallel with each other. In the case, the number of coil turns decreases, but decrease in the coil resistance is achieved.

Moreover, the second coil 232 is separated from the second pole piece 212 and the back gap piece 216 by the insulating film 252 which can be formed as a very thin film of about 0.1 μm in thickness by applying CVD or the like. This makes it possible to promote shortening of the yoke length YL.

The upper surfaces of the first coil 231 and the second coil 232 form the same plane. This structure makes it possible to form a common insulating film 254 on the upper surfaces of the first coil 231 and the second coil 232 and so, an insulating structure on the upper surfaces of the first coil 231 and the second coil 232 is simplified. And this structure makes it possible to form a flat and stable base face on the first coil 231 and the second coil 232 and thereafter form a high-accuracy pattern.

In this case, the first coil 231 is a plating film and is formed on an insulating film 251 deposited on one surface of the first magnetic film 211. The second coil 232 is also a plating film and is formed on an insulating film 252 in the space between coil turns of the first coil 231. The insulating film 252 is formed on the bottom face and both side faces of the space.

A protective film 258 covers the whole write element 2. The protective film 258 is made of an inorganic material such as $Al_2O_3$ or $SiO_2$.

In the vicinity of the read element 3, there are provided a first shield film 31, an insulating film 32 and a second shield film 33. The first shield film 31 and the second shield film 33 are made of NiFe or the like. The first shield film 31 is formed on an insulating film 16 made of $Al_2O_3$, $SiO_2$ or the like. The insulating film 16 is formed on the surface of a base body 15 made of $Al_2O_3$—TiC or the like.

The read element 3 is provided inside the insulating film 32 between the first shield film 31 and the second shield film 33. The end face of the read element 3 comes out at the ABS 52, 53. The read element 3 comprises a giant magneto-resistance effect element (GMR element). The GMR element can be formed of a spin valve film or a ferromagnetic tunnel junction element.

Figure 7:
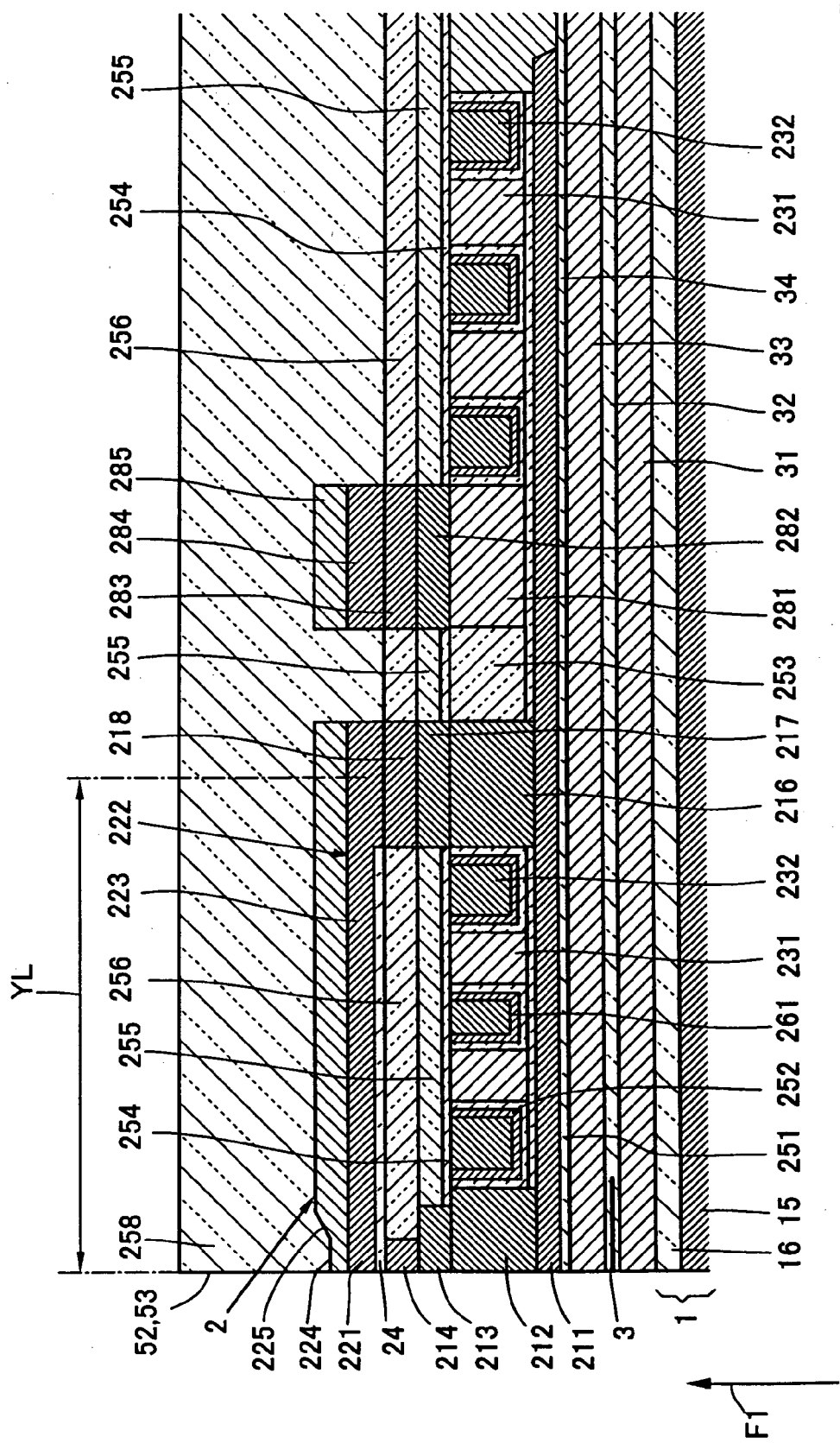
FIG. 7 is a magnified sectional view of another embodiment of an electromagnetic converter portion of a thin film magnetic head according to the present invention.
Figure 8:
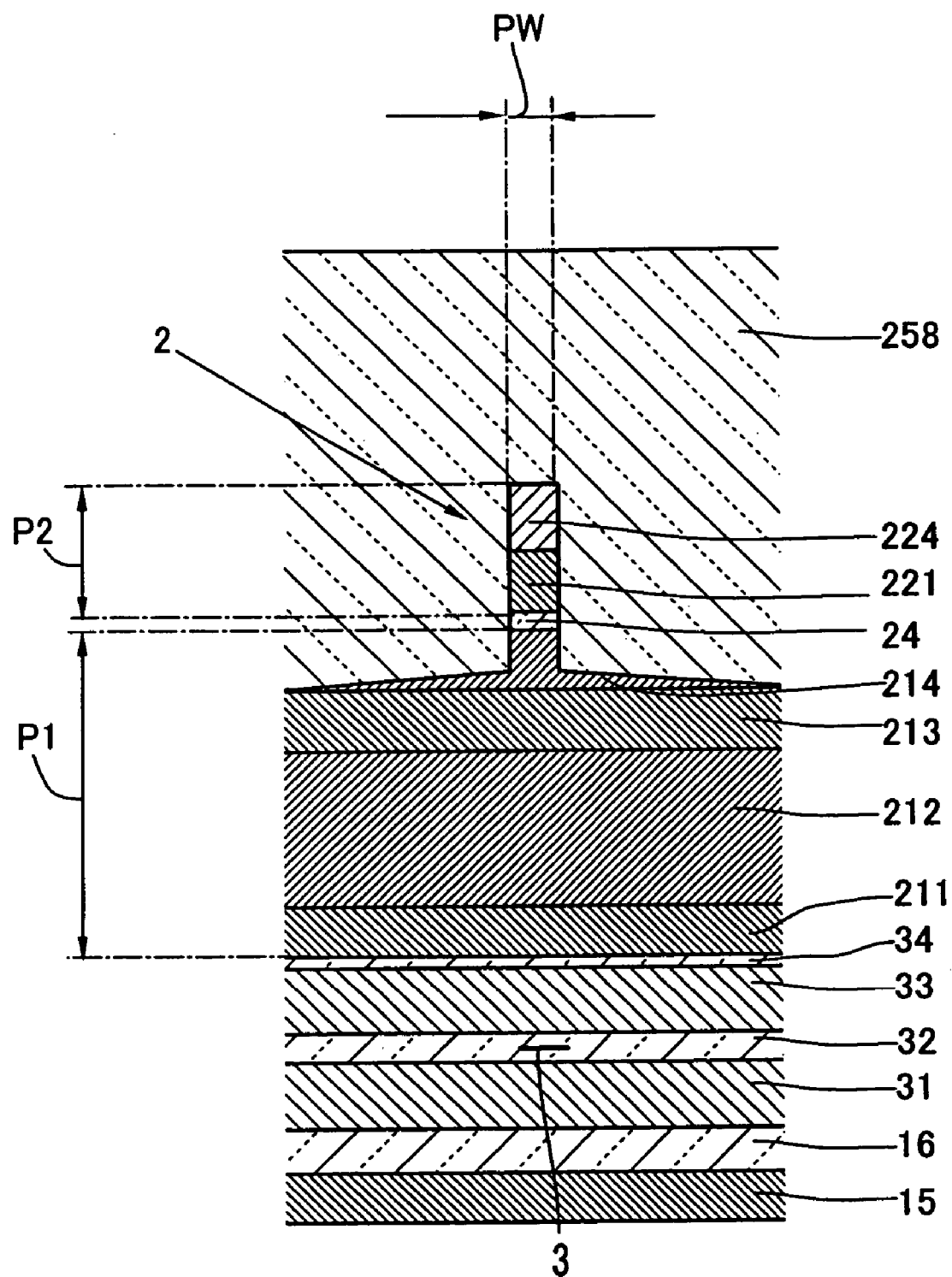
FIG. 8 is a diagram of the electromagnetic converter portion shown in FIG. 7, seen from the ABS side.

Next, another embodiment of a thin film magnetic head according to the present invention is described with reference to FIGS. 7 and 8. In FIGS. 7 and 8, the same components as those shown in FIGS. 1 to 6 are given the same reference symbols. A thin film magnetic head of the illustrated embodiment has the same basic structure as the thin film magnetic head shown in FIGS. 1 to 6.

One of differences between a thin film magnetic head shown in FIGS. 7 and 8 and the thin film magnetic head illustrated and described in FIGS. 1 to 6 is that in the thin film magnetic film shown in FIGS. 7 and 8, conductive layers 282 to 285 are deposited on the inner end 281 of the first coil 231 and a connecting conductor for connecting the first coil 231 to the second coil 232 is formed. The conductive layers 282 to 285 are respectively formed and patterned by the same processes as those of a third pole piece 213, a fourth pole piece 214, a second magnetic film 221 and a third magnetic film 222.

Consequently, the thin film magnetic head shown in FIGS. 7 and 8 has an advantage that a process of forming a connecting conductor for connecting the first coil 231 to the second coil 232 is simplified in addition to the advantages of the thin film magnetic head shown in FIGS. 1 to 6.

Figure 9:
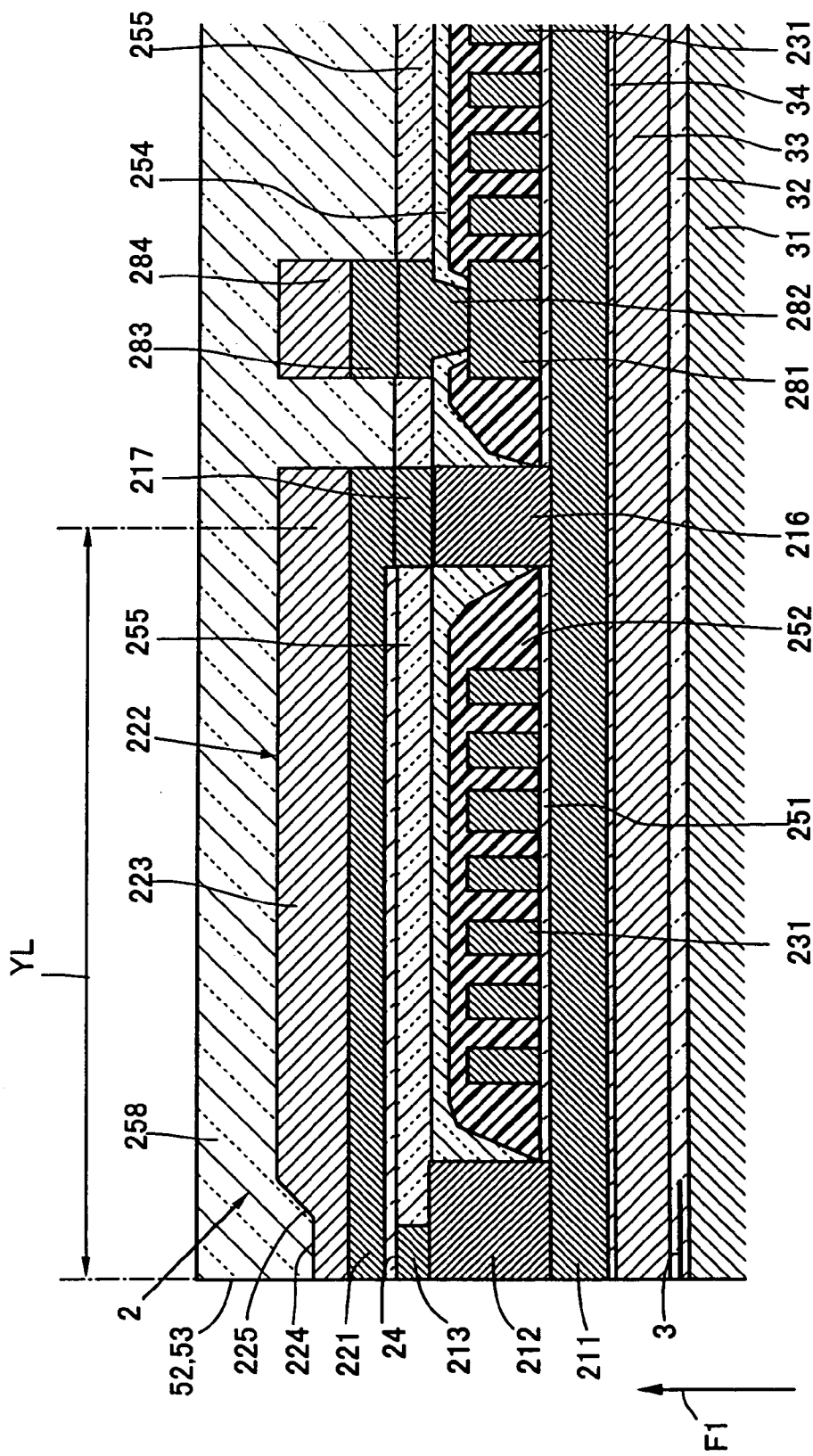
FIG. 9 is a magnified sectional view of a further other embodiment of an electromagnetic converter portion of a thin film magnetic head according to the present invention.

Still another embodiment of a thin film magnetic head according to the present invention is described with reference to FIG. 9. In FIG. 9, the same components as those shown in FIGS. 1 to 6 are given the same reference symbols. A thin film magnetic head of the illustrated embodiment has the same basic structure as the thin film magnetic head shown in FIGS. 1 to 6.

One of differences between a thin film magnetic film shown in FIG. 9 and the thin film magnetic head illustrated and described in FIGS. 1 to 6 is that in the thin film magnetic head shown in FIG. 9, conductive layers 282 to 284 are deposited on the inner end 281 of the first coil 231 and a connecting conductor for connecting the first coil 231 to the second coil 232 is formed. The conductive layers 282 to 284 are respectively formed and patterned by the same processes as those of the third pole piece 213, the second magnetic film 221 and the third magnetic film 222.

The thin film magnetic head shown in FIG. 9 has an advantage that a process of forming a connecting conductor for connecting the first coil 231 to the second coil 232 is simplified in addition to the advantages of the thin film magnetic head shown in FIGS. 1 to 6.

Another difference is that the head of FIG. 9 has only the first coil 231, the space between coil turns of the first coil 231 being filled with the insulating film 252, the insulating film 252 being covered with an insulating film 254.

2. Method for Manufacturing a Thin Film Magnetic Head (1) Embodiment 1

Embodiment 1 related to a manufacturing method is a process of manufacturing a thin film magnetic head of a first aspect having a first coil 231 and a second coil 232 (FIGS. 1 to 6). It is notified in advance that processes illustrated in FIGS. 11 to 44 are performed on a wafer.

Figure 10:
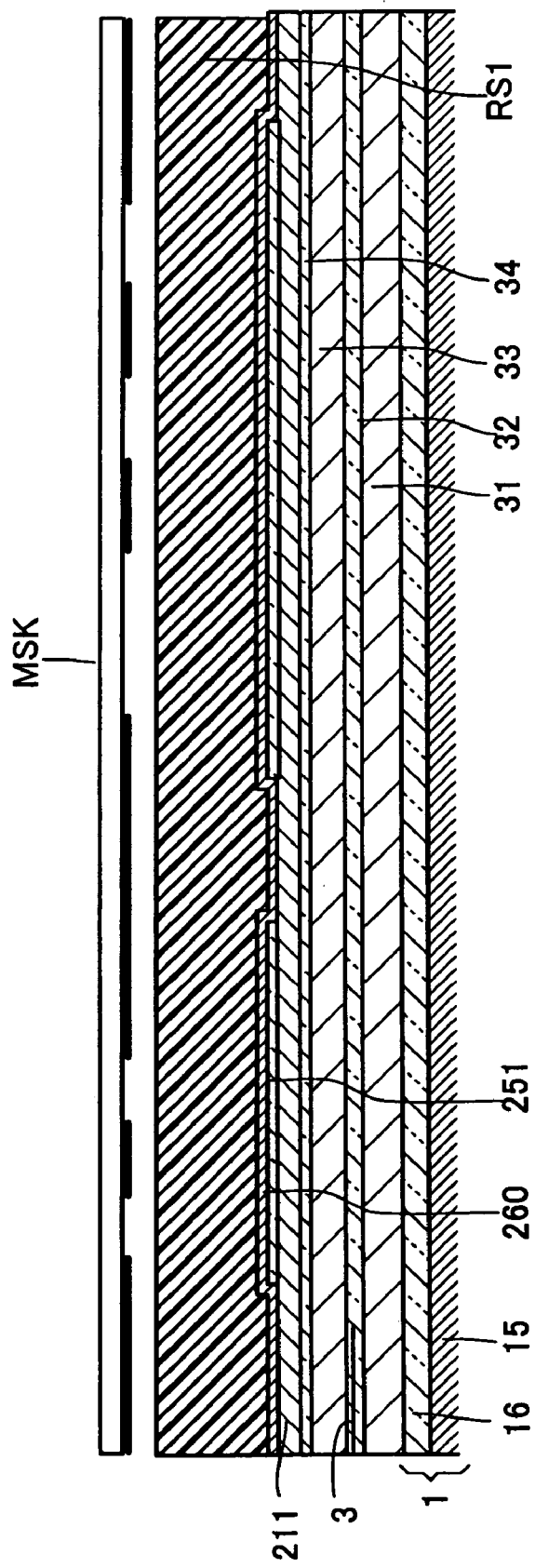
FIG. 10 is a diagram showing a process of manufacturing a thin film magnetic head having the electromagnetic converter portion shown in FIGS. 3 to 6.

First, referring to FIG. 10, on an insulating film 16 deposited on a base body 15 there are formed a first shield film 31, a read element 3, an insulating film 32, a second shield film 33, an insulating film 34 and a first magnetic film 211 by means of publicly known processes. After that, an insulating film 251 is formed on the flat surface of the first magnetic film 211, the insulating film 251 having an area slightly larger than an area necessary for forming a coil, and then a seed film 260 is formed on the surface of the insulating film 251. The seed film 260 is formed so as to cover the surface of the insulating film 251 and the surface of the first magnetic film 211. The seed film 260 is made of a material suitable for a Cu-plating ground and is formed 50 nm to 80 nm thick by a Cu-CVD process.

Figure 11:
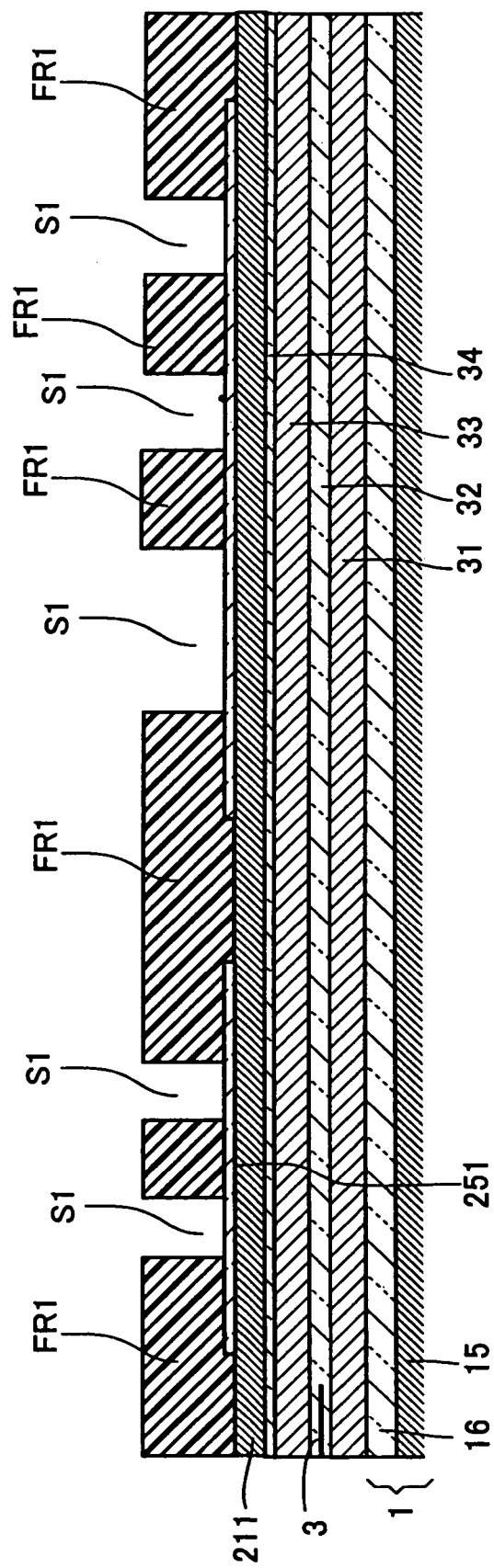
FIG. 11 is a diagram showing a process after the process shown in FIG. 10.

Next, a photoresist film RS1 is formed on the seed film 260 by applying a spin coating method or the like and then is exposed through a mask MSK having a coil pattern and developed. Consequently, a resist frame FR1 having a specified pattern is formed as shown in FIG. 11. The photoresist film RS1 may be either positive photoresist or negative photoresist. In the embodiment, the case of using positive photoresist is described as an example.

Figure 12:
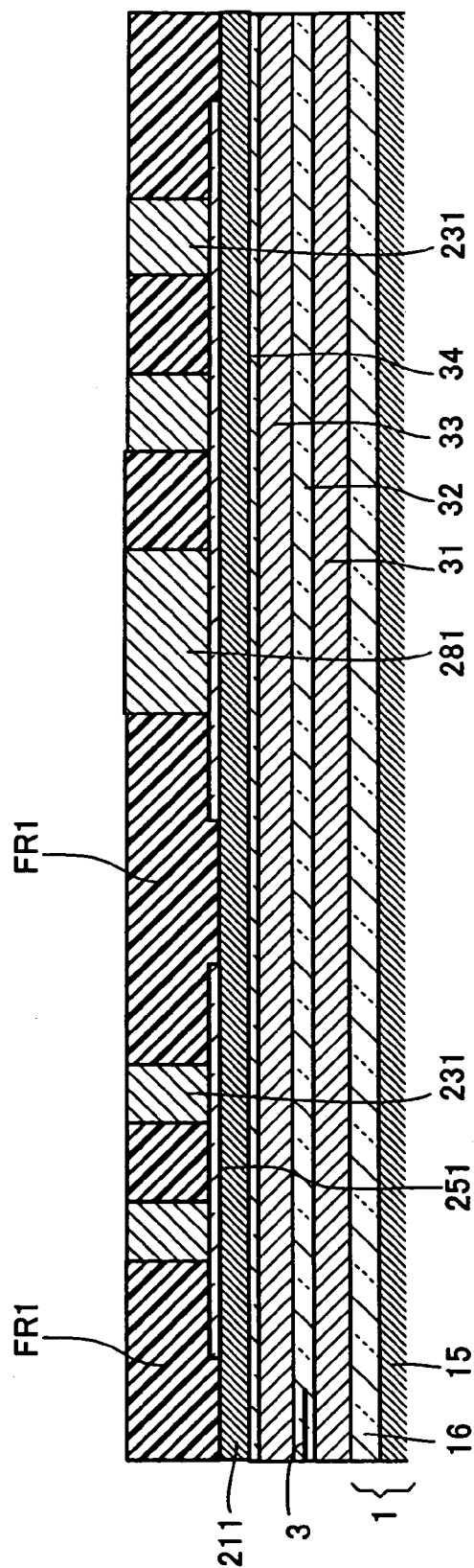
FIG. 12 is a diagram showing a process after the process shown in FIG. 11.

Next, a selective Cu-plating process is performed so that a first coil 231 is grown to be 3 to 3.5 μm thick on the seed film 260 inside the coil forming pattern S1. FIG. 12 shows a state in which the above-mentioned selective Cu-plating process has been performed.

Figure 13:
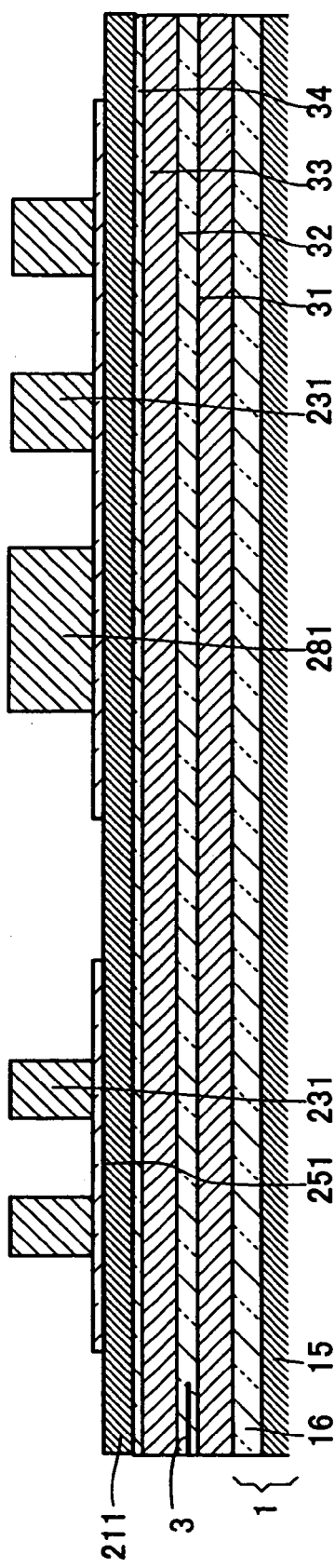
FIG. 13 is a diagram showing a process after the process shown in FIG. 12.

Next, as shown in FIG. 13, the resist frame FR1 is removed by means of chemical etching or the like. After that, a photolithography process for forming a pole piece and a back gap piece is performed so that a resist frame for forming the pole piece and the back gap piece is formed.

Figure 14:
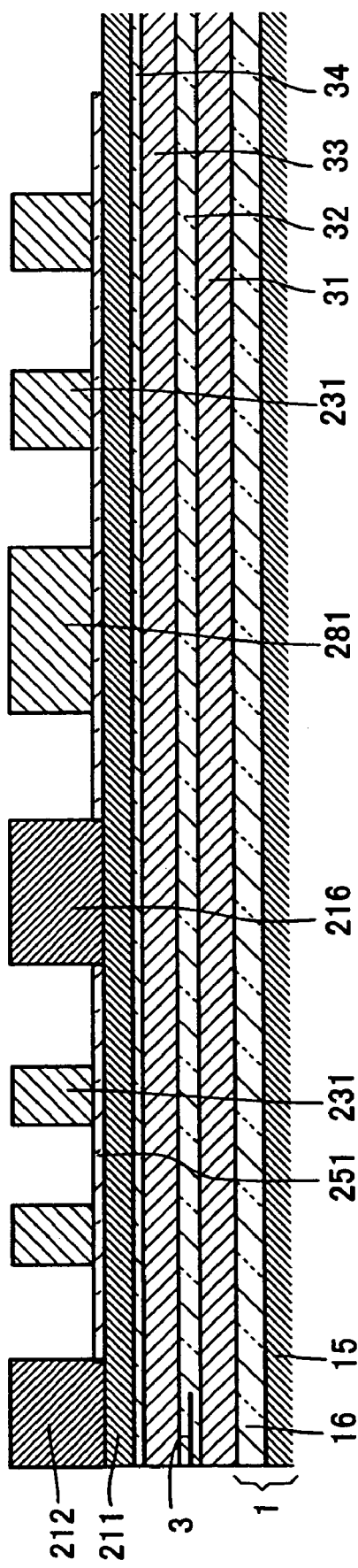
FIG. 14 is a diagram showing a process after the process shown in FIG. 13.

Next, a selective plating process is performed so that the pole piece and the back gap piece are grown on the first magnetic film 211. After that, the resist frame is removed by means of chemical etching or the like. Consequently, as shown in FIG. 14, the pole piece 212 and the back gap piece 216 are formed with a space between them on one surface of the first magnetic film 211.

Figure 15:
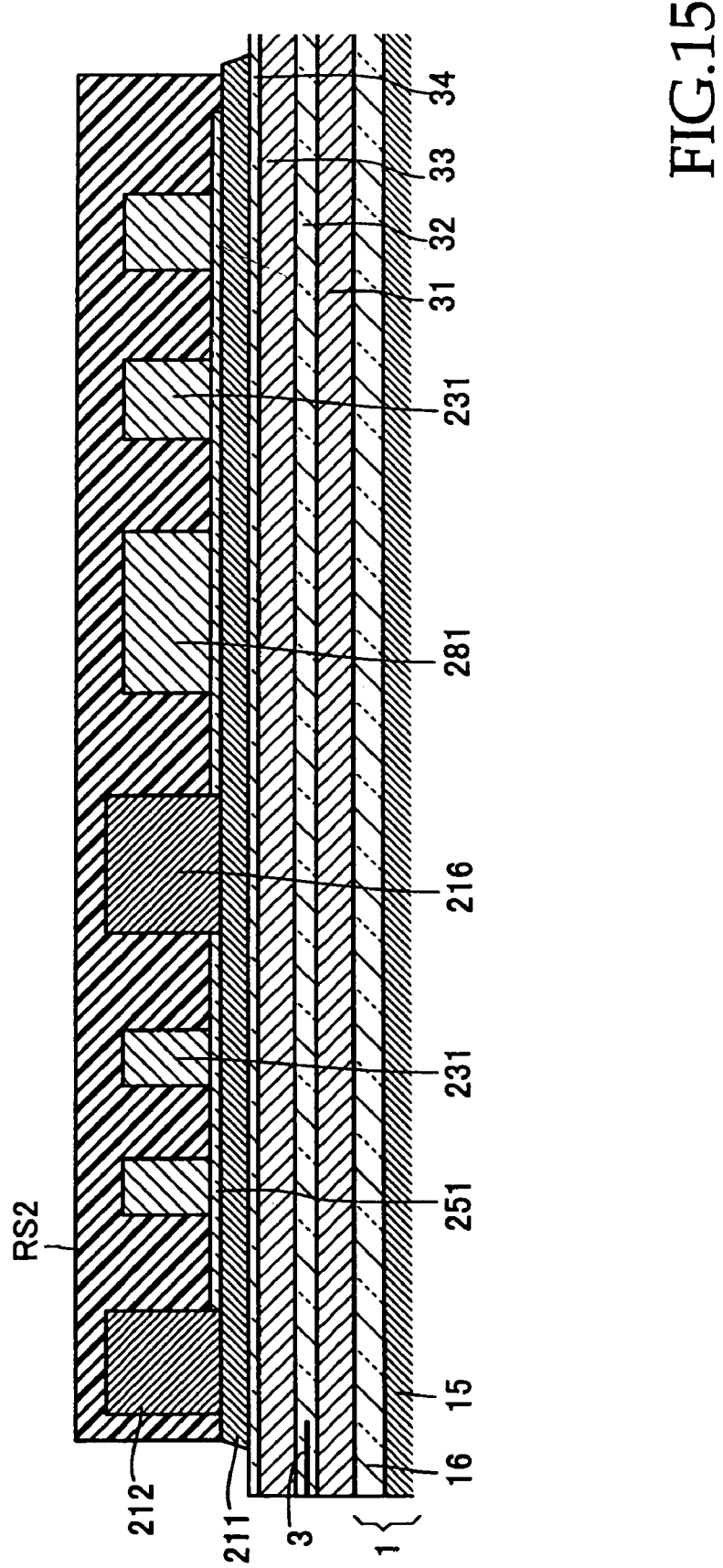
FIG. 15 is a diagram showing a process after the process shown in FIG. 14.
Figure 16:
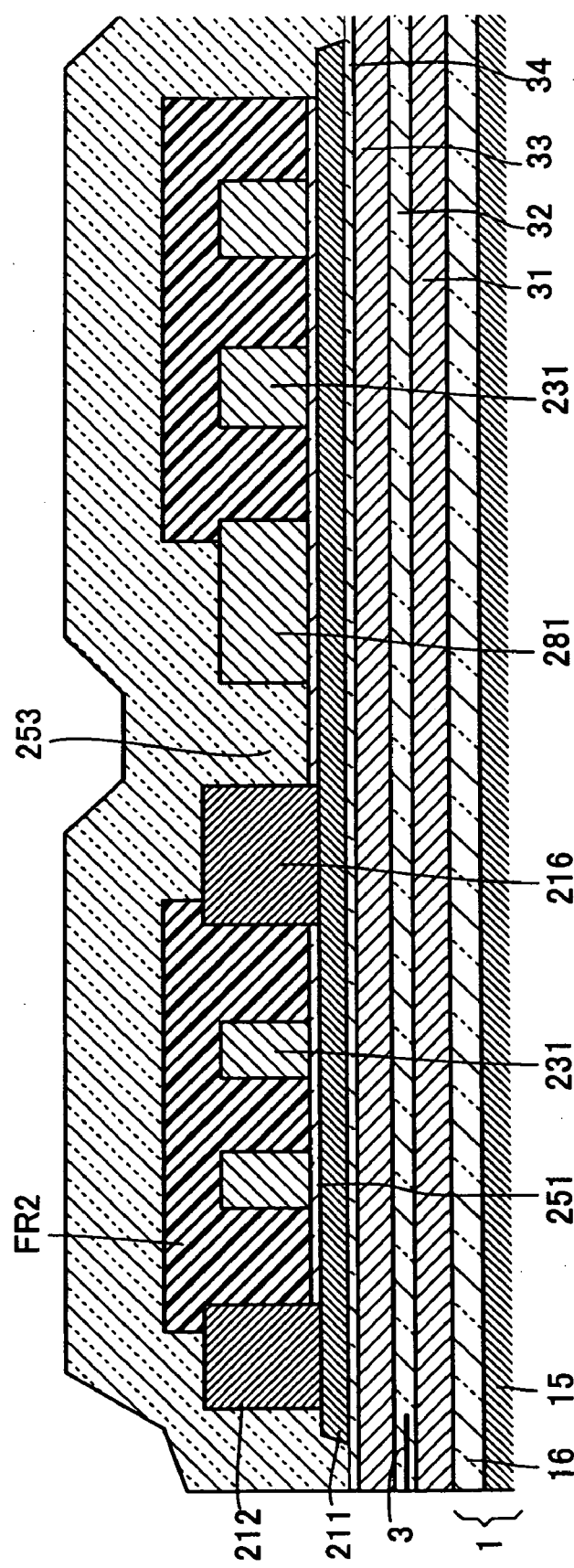
FIG. 16 is a diagram showing a process after the process shown in FIG. 15.

Next, as shown in FIG. 15, a photoresist film RS2 covering the first coil 231, the pole piece 212 and the back gap piece 216 is formed. After that, a photolithography process is performed on the photoresist film RS2 so that a resist cover FR2 covering the first coil 231 and its periphery is formed as shown FIG. 16. In addition, an insulating film 253 covering the whole resist cover FR2 is deposited thereon. The insulating film 253 is formed 4 to 5 µm thick.

Figure 17:
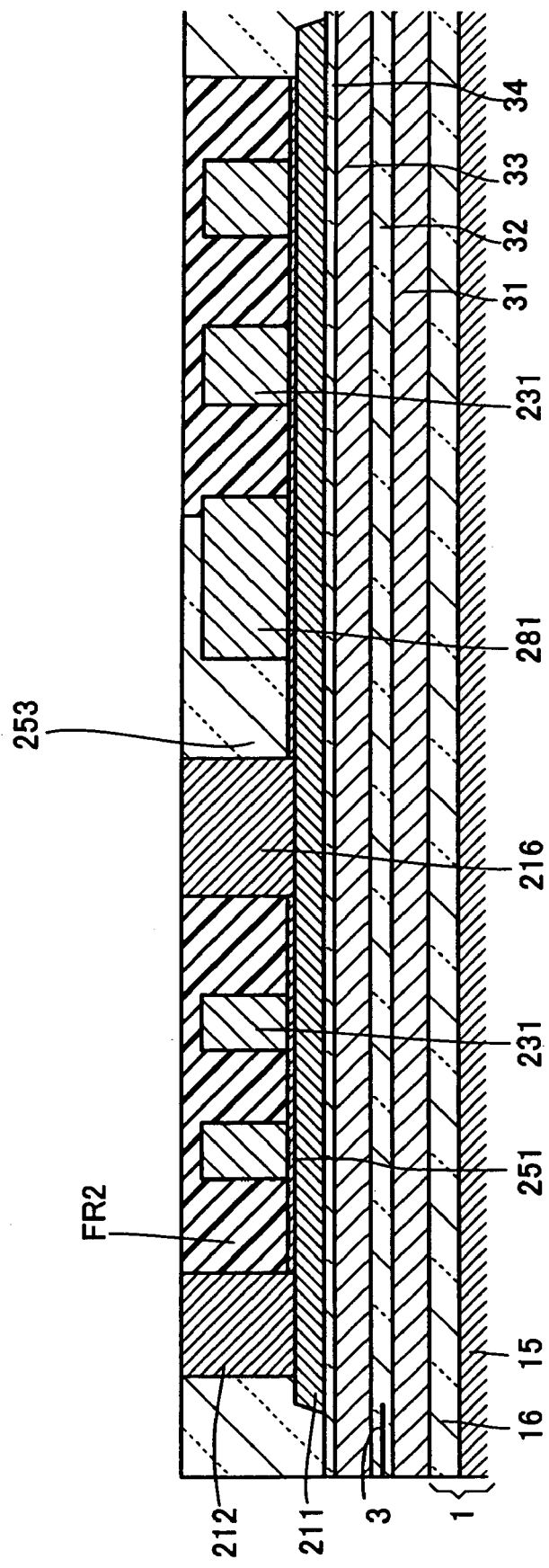
FIG. 17 is a diagram showing a process after the process shown in FIG. 16.

Next, the insulating film 253 and the resist cover FR2 are polished by chemical mechanical polishing (hereinafter, referred to as CMP) to be flattened. Alumina-based slurry is used in the CMP. FIG. 17 shows a state in which the CMP process has been performed.

Next, the resist cover FR2 is removed and after that, an insulating film 252 is deposited on the surfaces and side faces of the insulating films 251 and 253, the first coil 231, the second pole piece 212 and the back gap piece 216. Concretely, the insulating film 252 is formed about 0.1 µm in thickness by an $Al_2O_3$-CVD process.

Furthermore, a seed film 261 is deposited 0.05 to 0.1 µm thick on the surface of the insulating film 252 by a Cu-CVD process.

Figure 18:
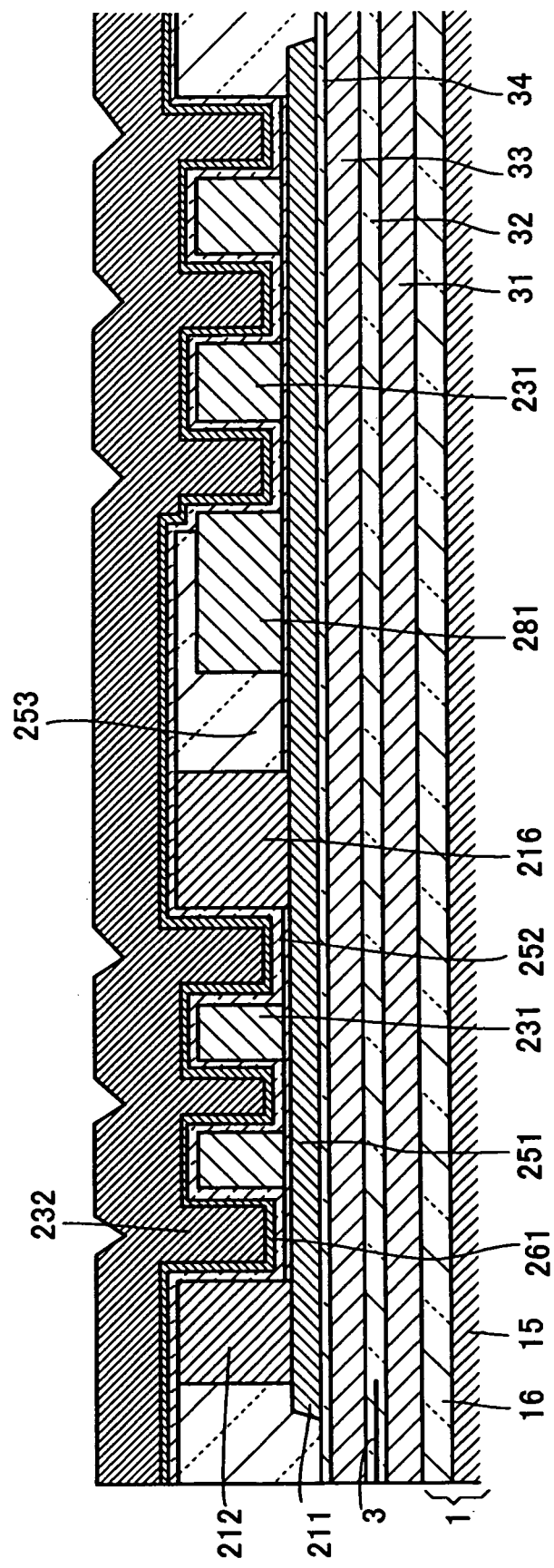
FIG. 18 is a diagram showing a process after the process shown in FIG. 17.

Next, as shown in FIG. 18, a plating film 232 to be a second coil is formed, for example, 5 µm thick on the seed film 261. The plating film 232 comprises Cu as its main constituent.

Figure 19:
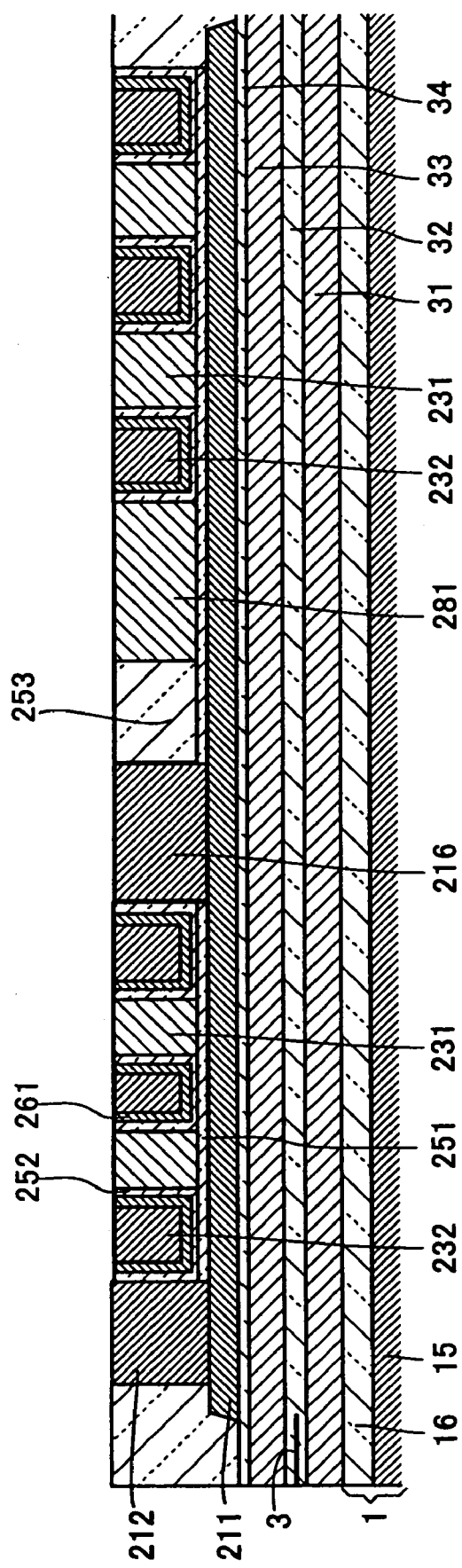
FIG. 19 is a diagram showing a process after the process shown in FIG. 18.

Next, as shown in FIG. 19, the plating film 232 is polished to be flattened by CMP. Alumina-based slurry is used in the CMP. Consequently, the second coil 232 of a flat spiral pattern is obtained, insulated from the first coil 231 by the insulating film 252. In CMP, the surfaces of the pole piece 212, the back gap piece 216 and the insulating film 253 are also polished so as to form the same plane as the surfaces of the first coil 231 and the second coil 232.

Next, an insulating film 254 covering the surfaces of the first coil 231 and the second coil 232 is deposited thereon. The insulating film 254 is made of $Al_2O_3$ to be 0.2 µm thick, for example.

Figure 20:
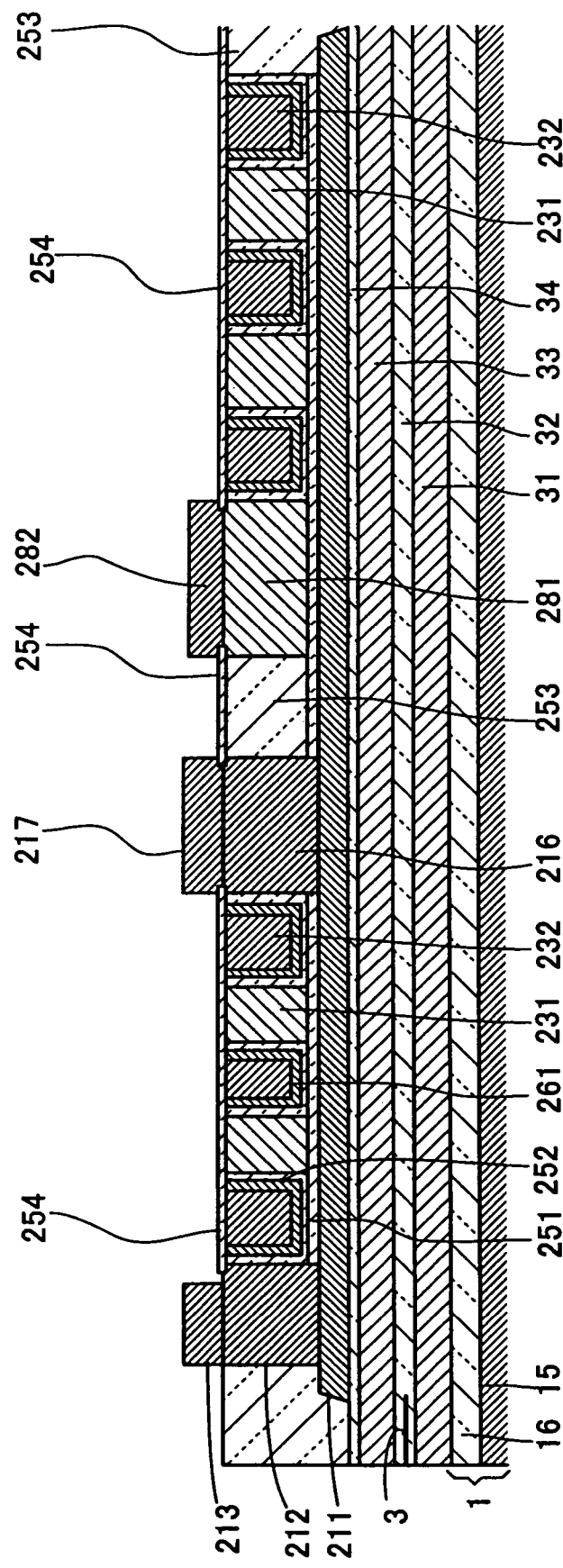
FIG. 20 is a diagram showing a process after the process shown in FIG. 19.

Next, a photolithography process is performed on one surface where the insulating film 254 has been formed, so that a resist frame for forming a connecting conductor 282 for connecting the inner end 281 of the first coil 231 with the outer end 283 of the second coil 232 (see FIG. 6) and a resist frame for forming a third pole piece 213 and a back gap piece 217 (see FIG. 7) are formed. According to the patterns defined by the resist frames thus obtained, a frame plating method is performed. Consequently, as shown in FIG. 20, the connecting conductor 282, the third pole piece 213 and the back gap piece 217 are formed. The connecting conductor 282, the third pole piece 213 and the back gap piece 217 each are plating films of CoFe or CoNiFe and are 1 to 2 µm thick, for example.

Figure 21:
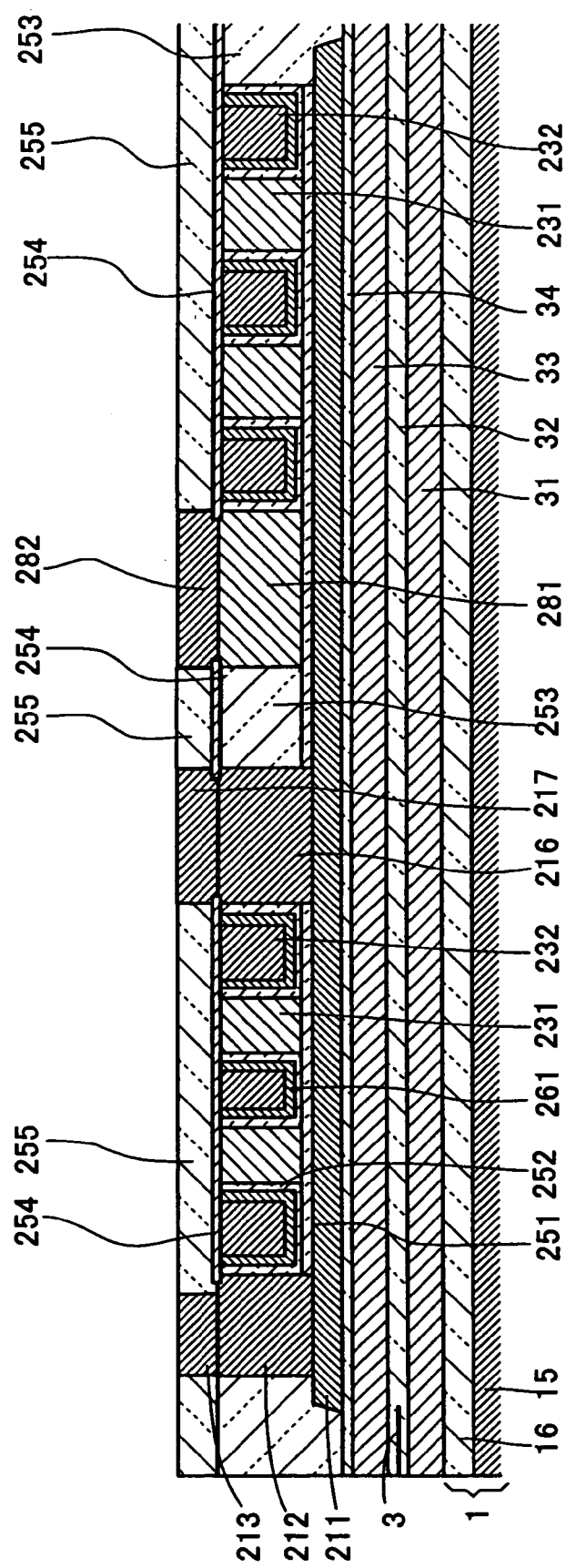
FIG. 21 is a diagram showing a process after the process shown in FIG. 20.

Next, an insulating film 255 of $Al_2O_3$ is deposited on the surface where the connecting conductor 282, the third pole piece 213 and the back gap piece 217 have been formed, the insulating film 255 being 2 to 3 µm thick, for example. After that, the surfaces of the insulating film 255, the third pole piece 213, the back gap piece 217 and the connecting conductor 282 are polished by CMP. This CMP is performed so that the pole piece 213 and the back gap piece 217 become 0.2 to 0.6 µm thick. FIG. 21 shows a state in which the CMP has been performed.

Figure 22:
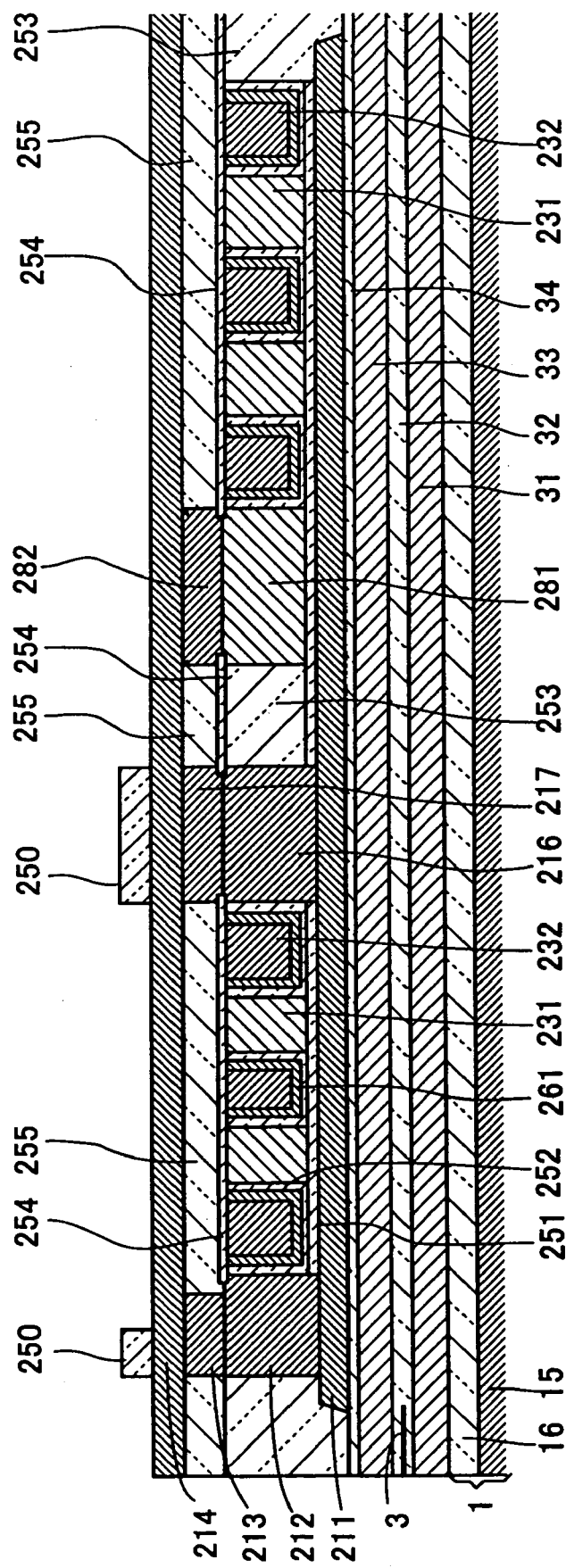
FIG. 22 is a diagram showing a process after the process shown in FIG. 21.

Next, as shown in FIG. 22, a magnetic film 214 to be a fourth pole piece 214 (see FIG. 3) is formed by sputtering on the polished surfaces of the insulating film 255, the third pole piece 213 and the back gap piece 217, the magnetic film 214 being 0.5 to 1 µm thick, for example. The magnetic film 214 can be made of CoFeN (2.4 T), FeAlN, FeN, FeCo or FeZrN. In this embodiment, the magnetic film 214 is made of CoFeN (2.4 T). Moreover, a pattern-plating film 250 of NiFe, CoNiFe or the like is formed by a frame-plating method on the surface of the magnetic film 214. The pattern-plating films 250 are formed right above the back gap pieces 216 and 217 and right above the third pole piece 213.

Figure 23:
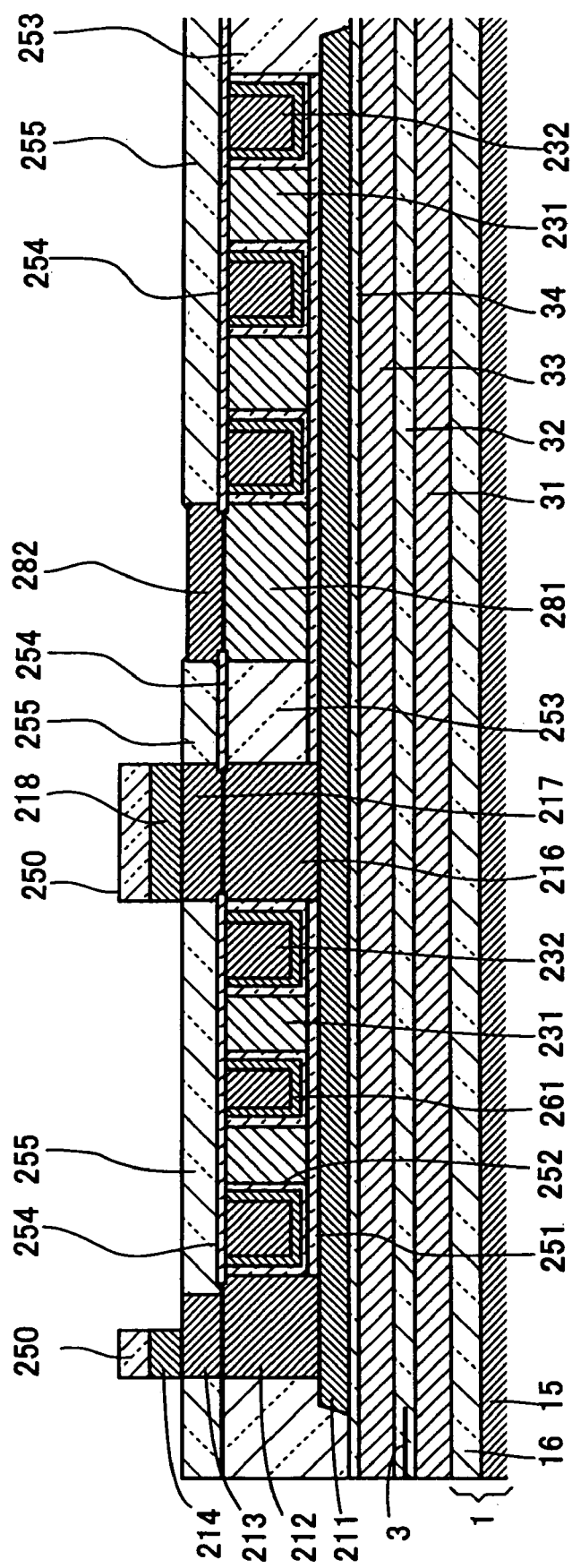
FIG. 23 is a diagram showing a process after the process shown in FIG. 22.
Figure 24:
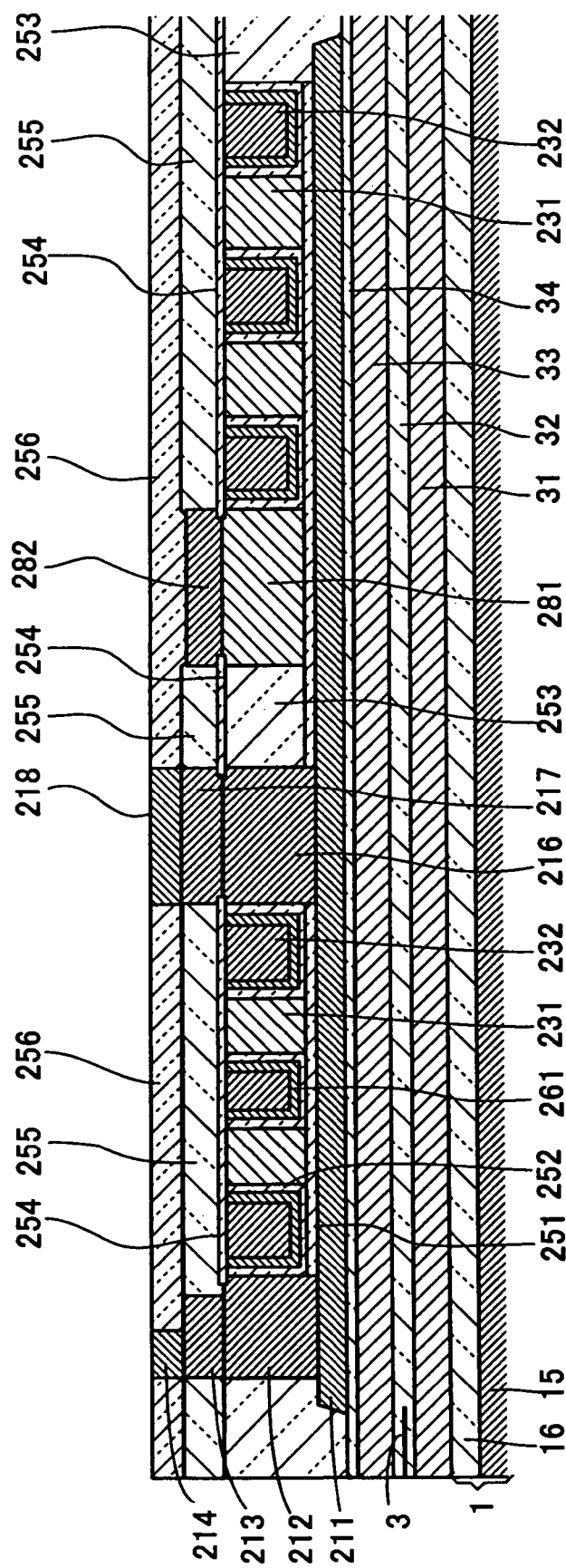
FIG. 24 is a diagram showing a process after the process shown in FIG. 23.

Next, as shown in FIG. 23, the magnetic film 214 is etched by ion beam using the pattern-plating film 250 as a mask. After that, an insulating film 256 of alumina or the like is deposited 2 to 3 µm thick by sputtering and then, the insulating film 256 is polished and flattened by CMP to such a position that the pattern-plating film 250 is removed. FIG. 24 shows a state in which this CMP process has been performed.

Figure 25:
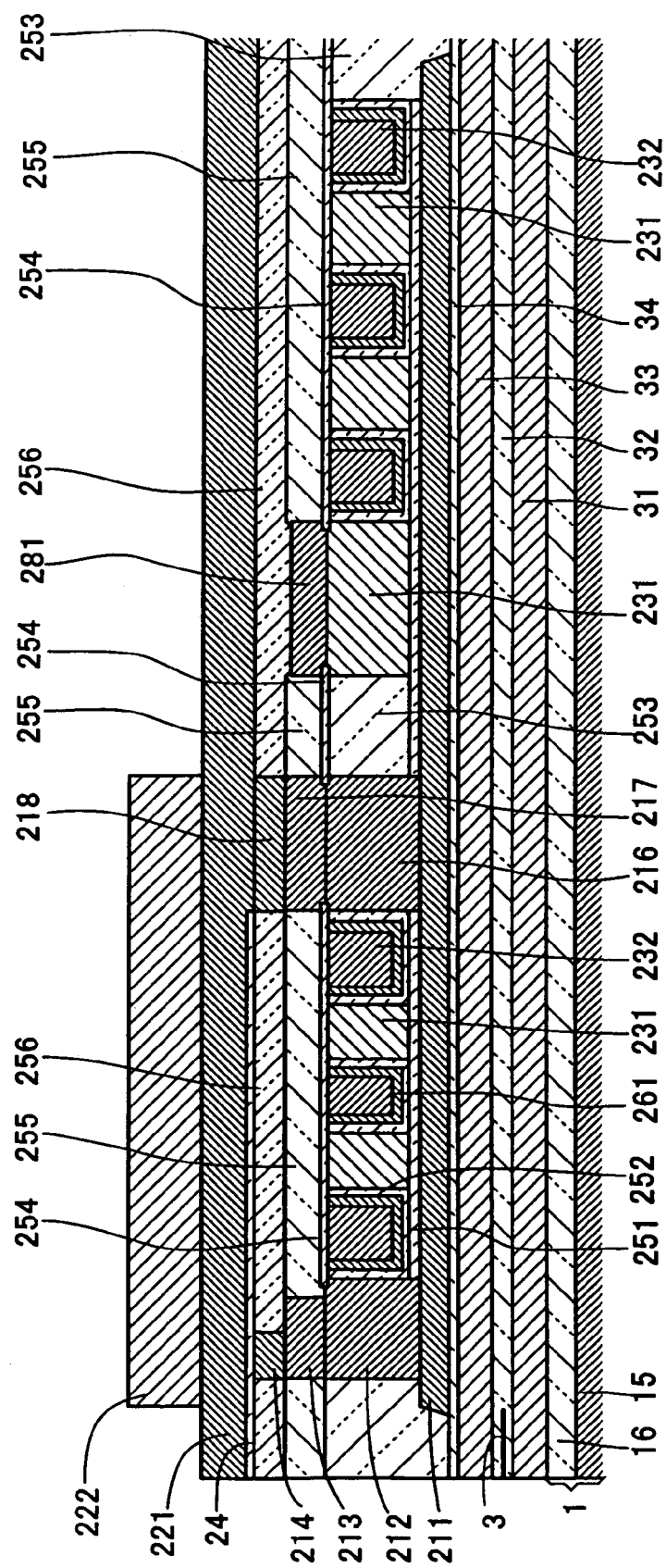
FIG. 25 is a diagram showing a process after the process shown in FIG. 24.

Next, as shown in FIG. 25, a gap film 24 is formed 0.06 to 0.1 µm thick on the flattened surface thus obtained by CMP. The gap film 24 is made of a non-magnetic metal material such as Ru, for example, and can be formed by sputtering or the like. After that, a second magnetic film 221 is formed on the surface of the gap film 24 and the flattened surface. The second magnetic film 221 is made of an HiBs material. Concretely, CoFe and CoFeN are particularly suitable among HiBs materials such as FeAlN, FeN, CoFe, CoFeN, FeZrN and the like. The second magnetic film 221 is formed, for example, 0.3 to 0.6 µm thick and is to be used as a seed film in the subsequent plating process for forming a third magnetic film.

Figure 26:
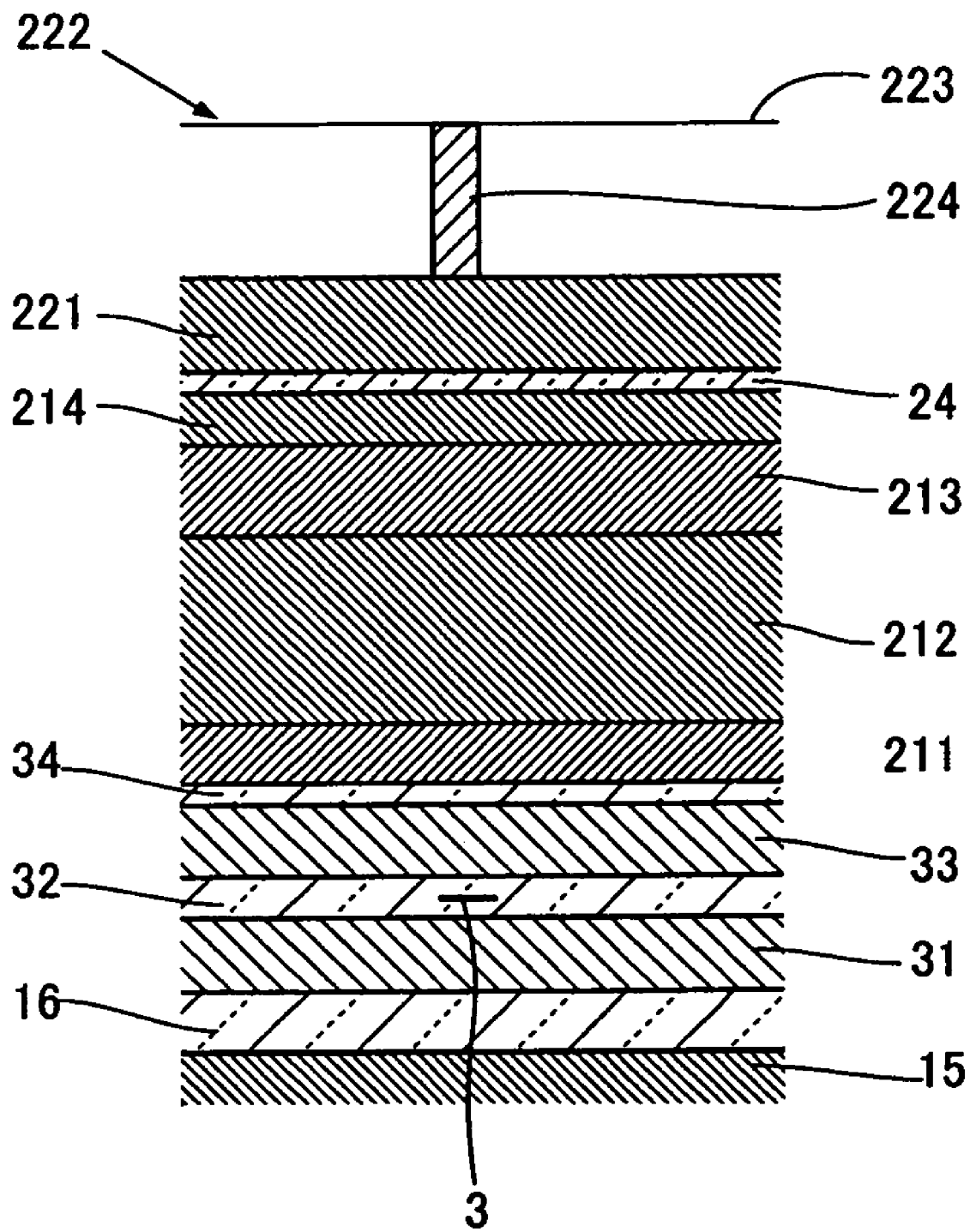
FIG. 26 is a view of the process shown in FIG. 25, seen from the ABS side.

After that, the third magnetic film 222 is formed by a frame-plating method using the second magnetic film 221 as a seed film. The third magnetic film 222 is made of NiFe (composition ratio, 55:45), CoNiFe (composition ratio, about 67:15:18, 1.9 T to 2.1 T), CoFe (composition ratio, 40:60, 2.3 T) or the like. The third magnetic film 222 is 3.5 to 4.0 µm thick. The third magnetic film 222 is formed so as to have a wide portion 223 and a narrow portion 224 as shown in FIG. 26. The wide portion 223 forms the second yoke portion and the narrow portion 224 forms the second pole portion P2.

Figure 27:
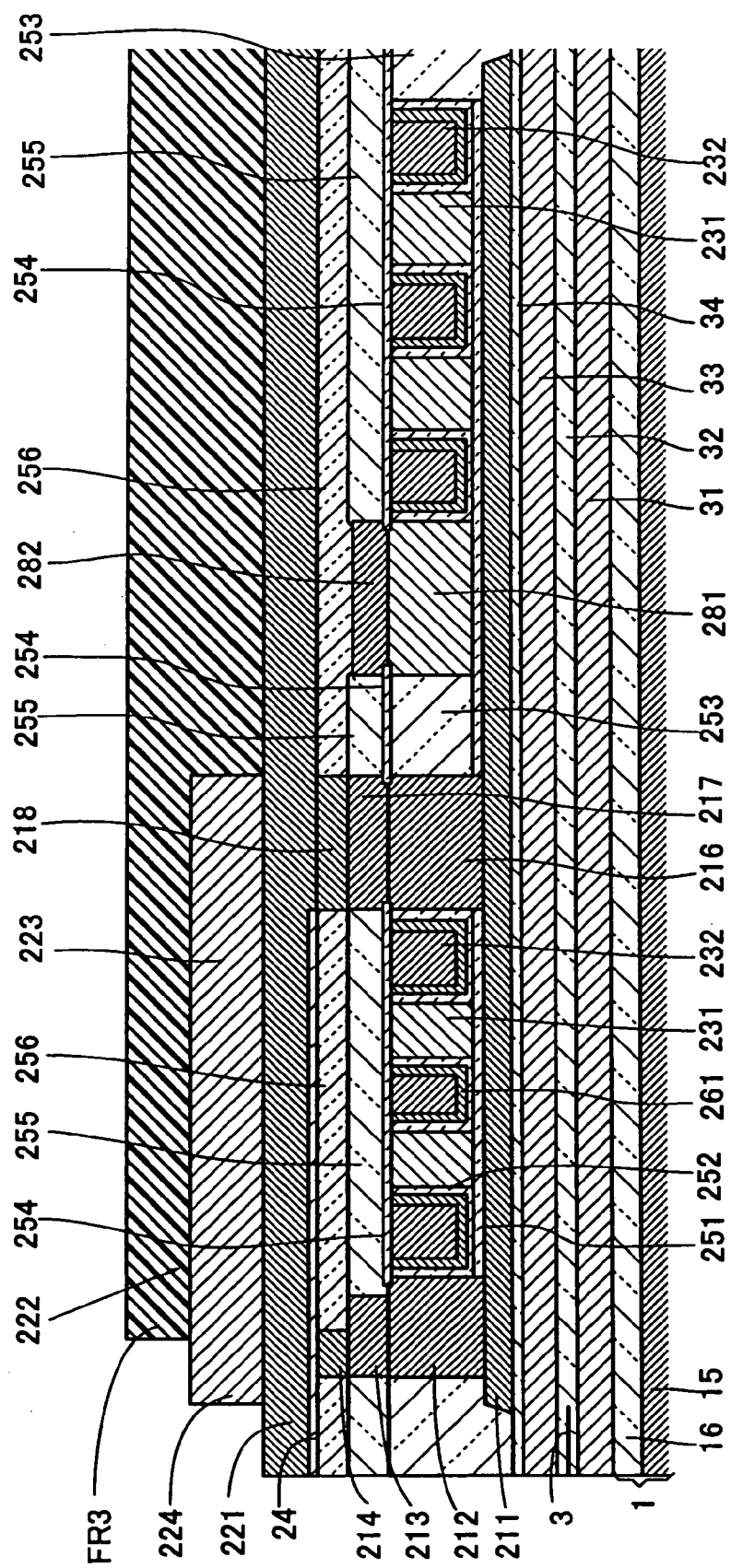
FIG. 27 is a diagram showing a process after the process shown in FIGS. 25 and 26.
Figure 28:
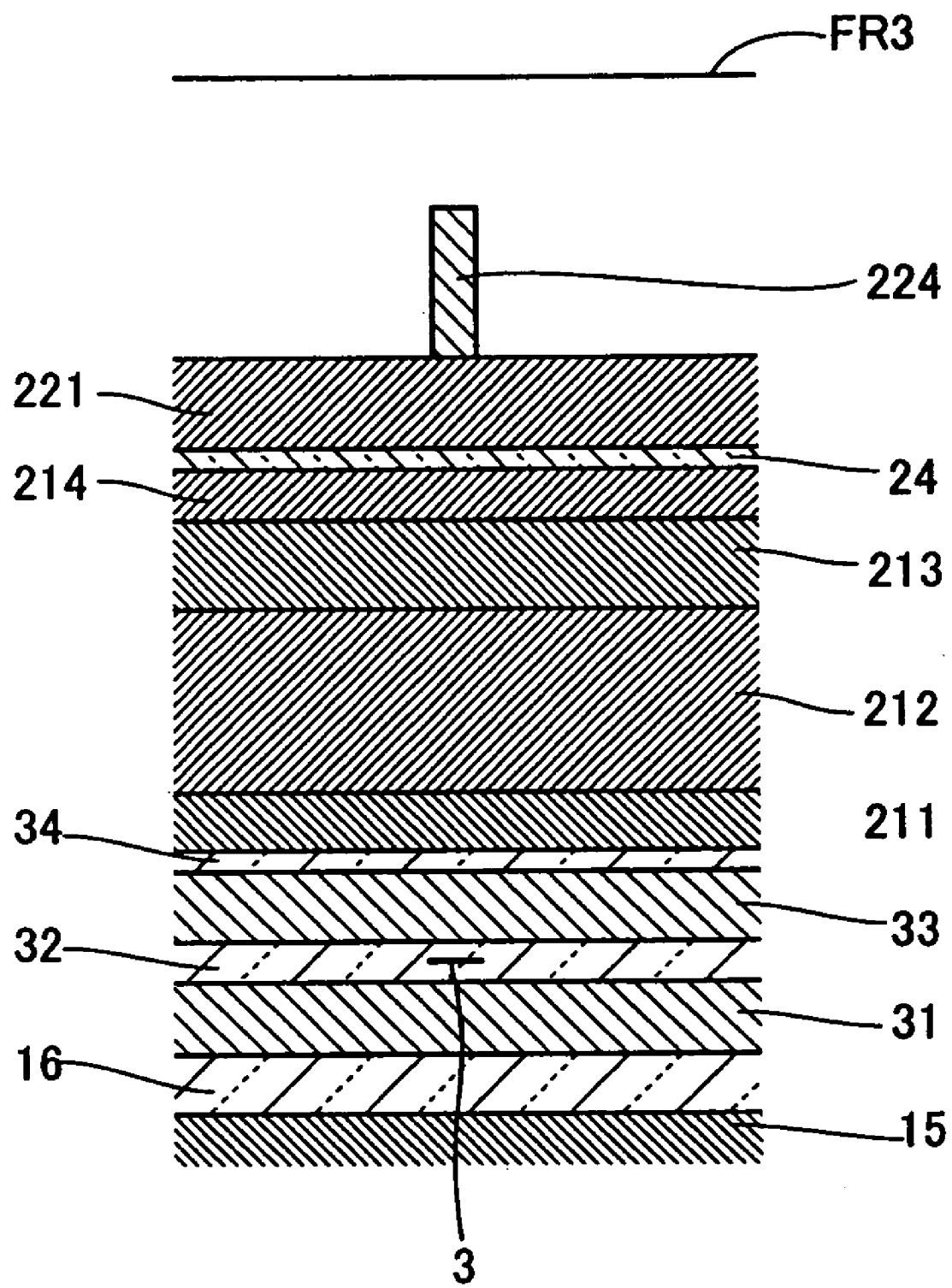
FIG. 28 is a view of the process shown in FIG. 27, seen from the ABS side.
Figure 29:
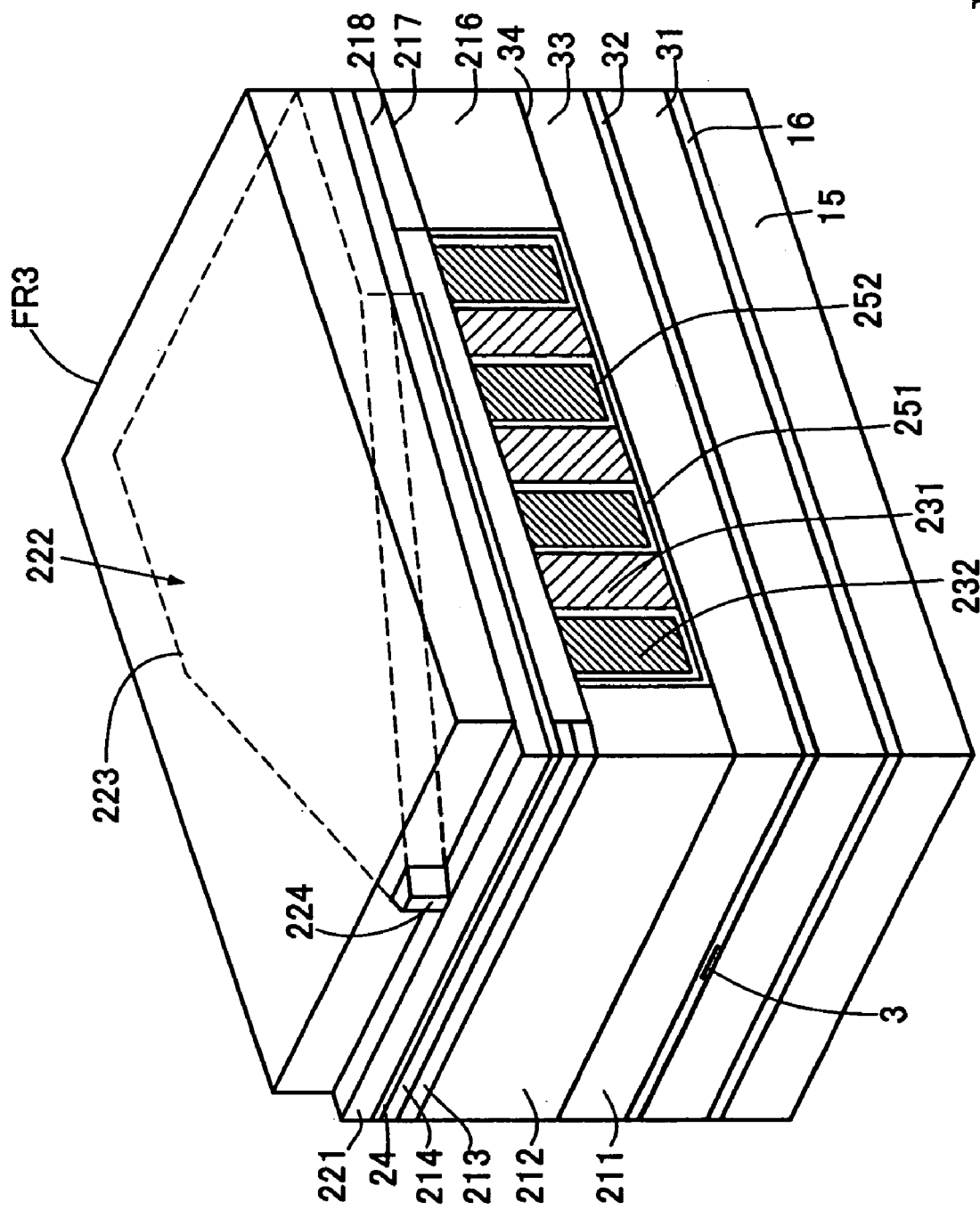
FIG. 29 is a perspective view showing a write element part cut out in the process shown in FIGS. 27 and 28.

Next, as shown in FIGS. 27 to 29, the whole wide portion 223 except the narrow portion 224 of the third magnetic film 222 is covered with a resist mask FR3. The resist mask FR3 is formed to spread above the first coil 231 and the second coil 232. Also, the resist mask FR3 is formed to have an end face perpendicular to the surface of the narrow portion 224.

Figure 30:
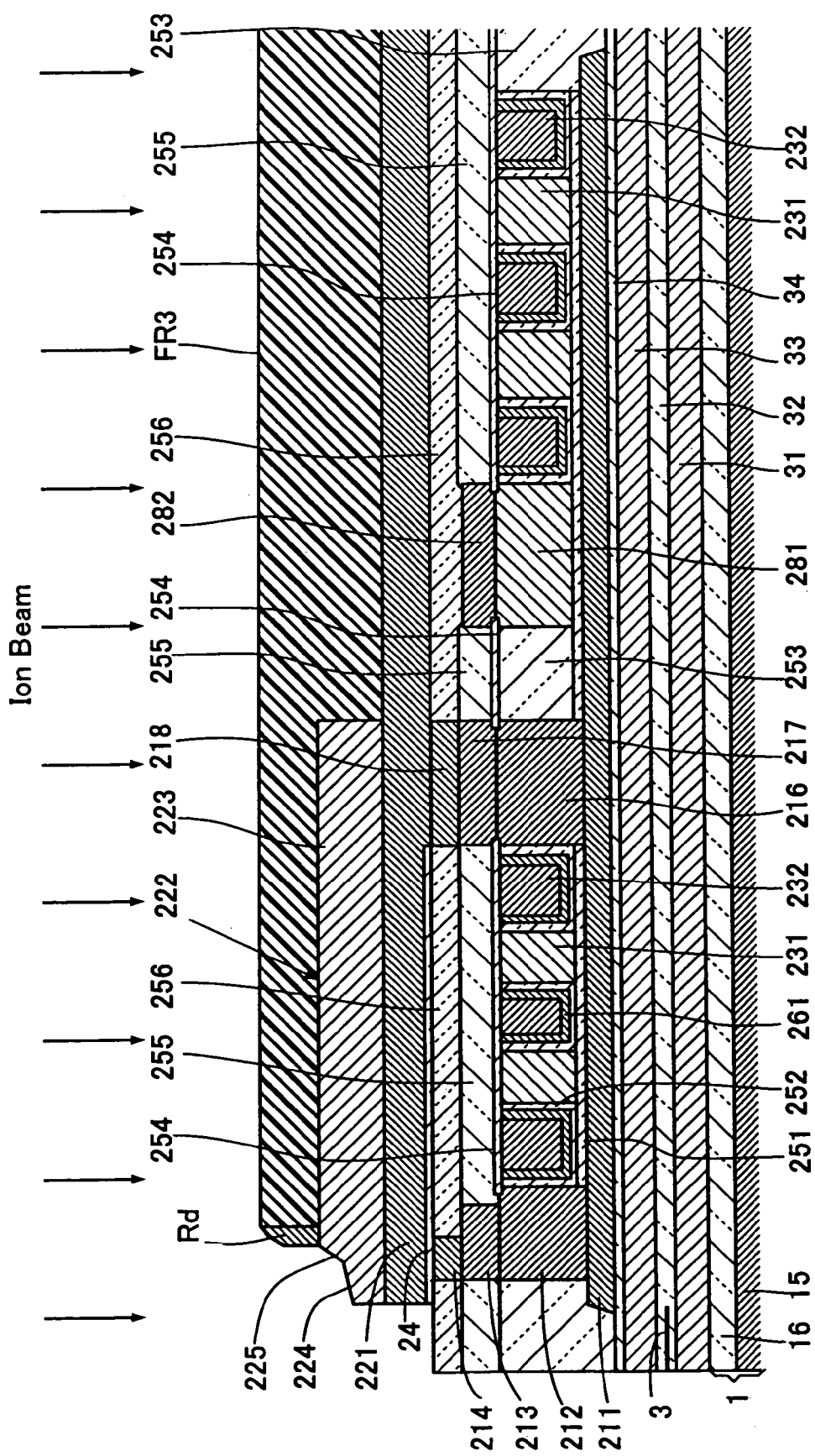
FIG. 30 is a diagram showing a process after the process shown in FIGS. 28 and 29.
Figure 31:
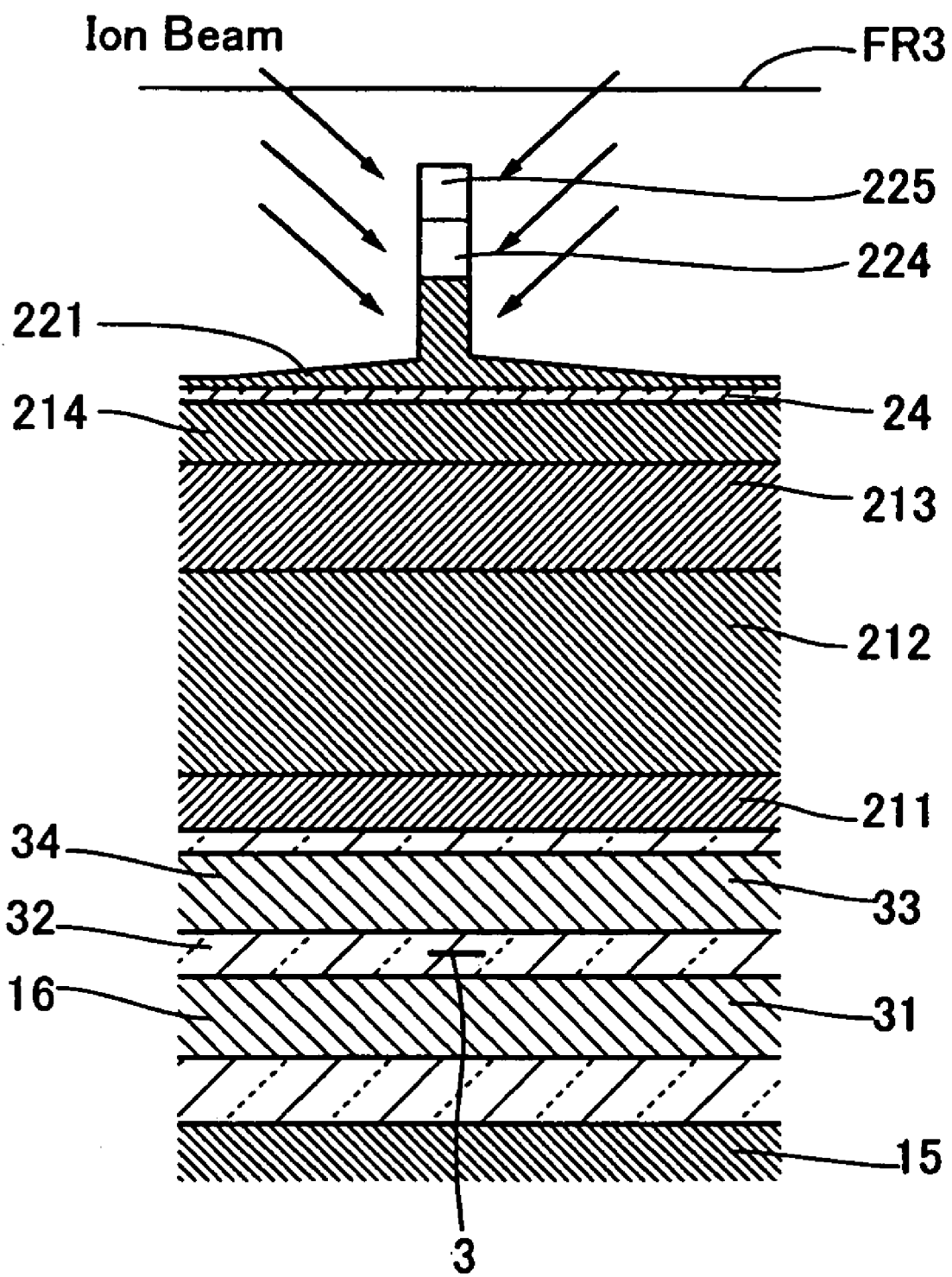
FIG. 31 is a view of the process shown in FIG. 30, seen from the ABS side.

Next, as shown in FIGS. 30 and 31, the area not covered with the resist mask FR3 is etched by ion beam. Consequently, the seed film 221 and the narrow portion 224 of the third magnetic film 222 exposed around the resist mask FR3 are trimmed.

The etching with the presence of the resist mask FR3 may be stopped within the thickness of the seed film 221, or may be continued to expose the gap film 24, or may be continued to expose the gap film 24 and then expose the magnetic film 214, which is a part of the first pole portion P1.

Figure 32:
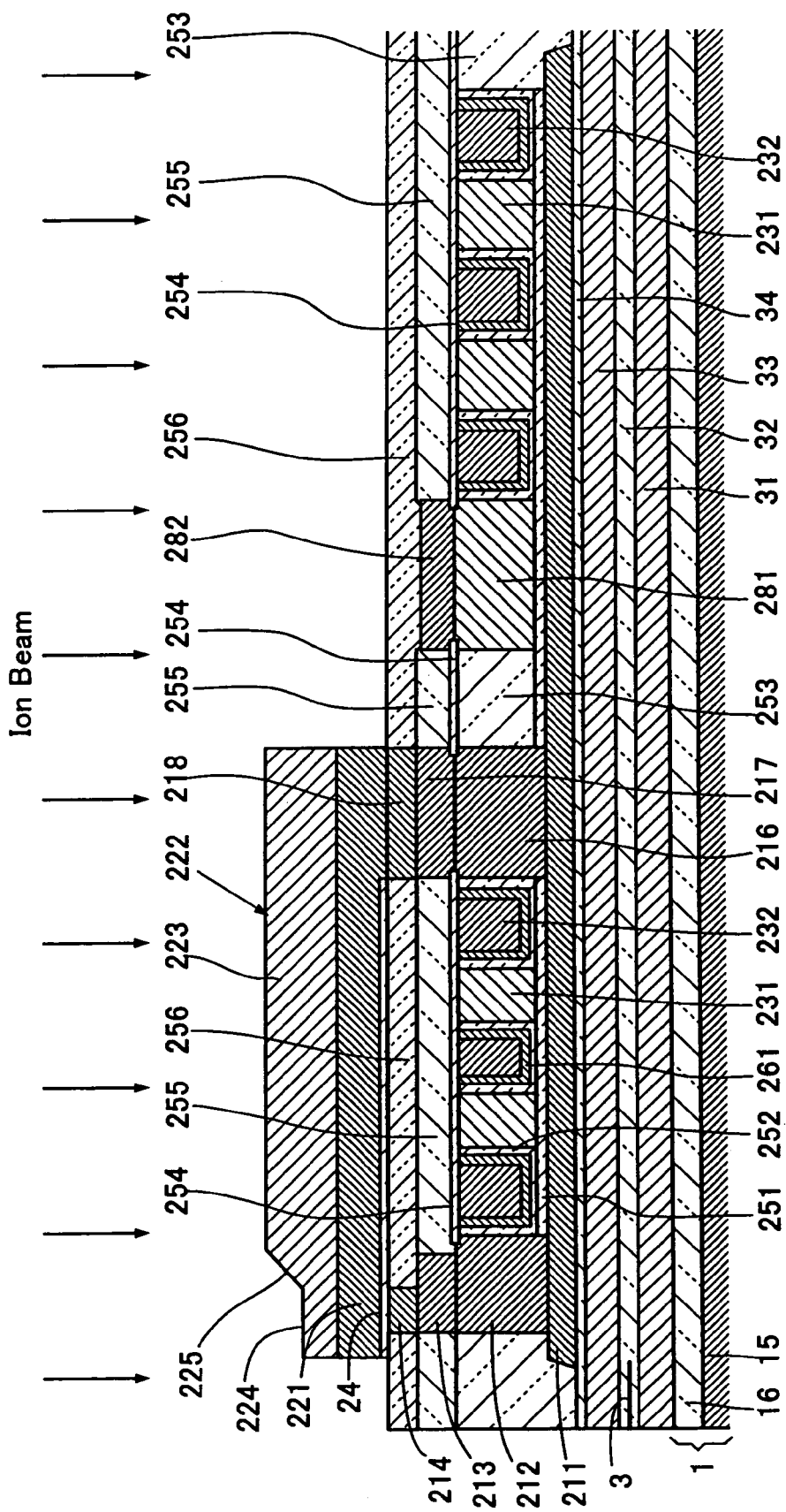
FIG. 32 is a diagram showing a process after the process shown in FIGS. 30 and 31.
Figure 33:
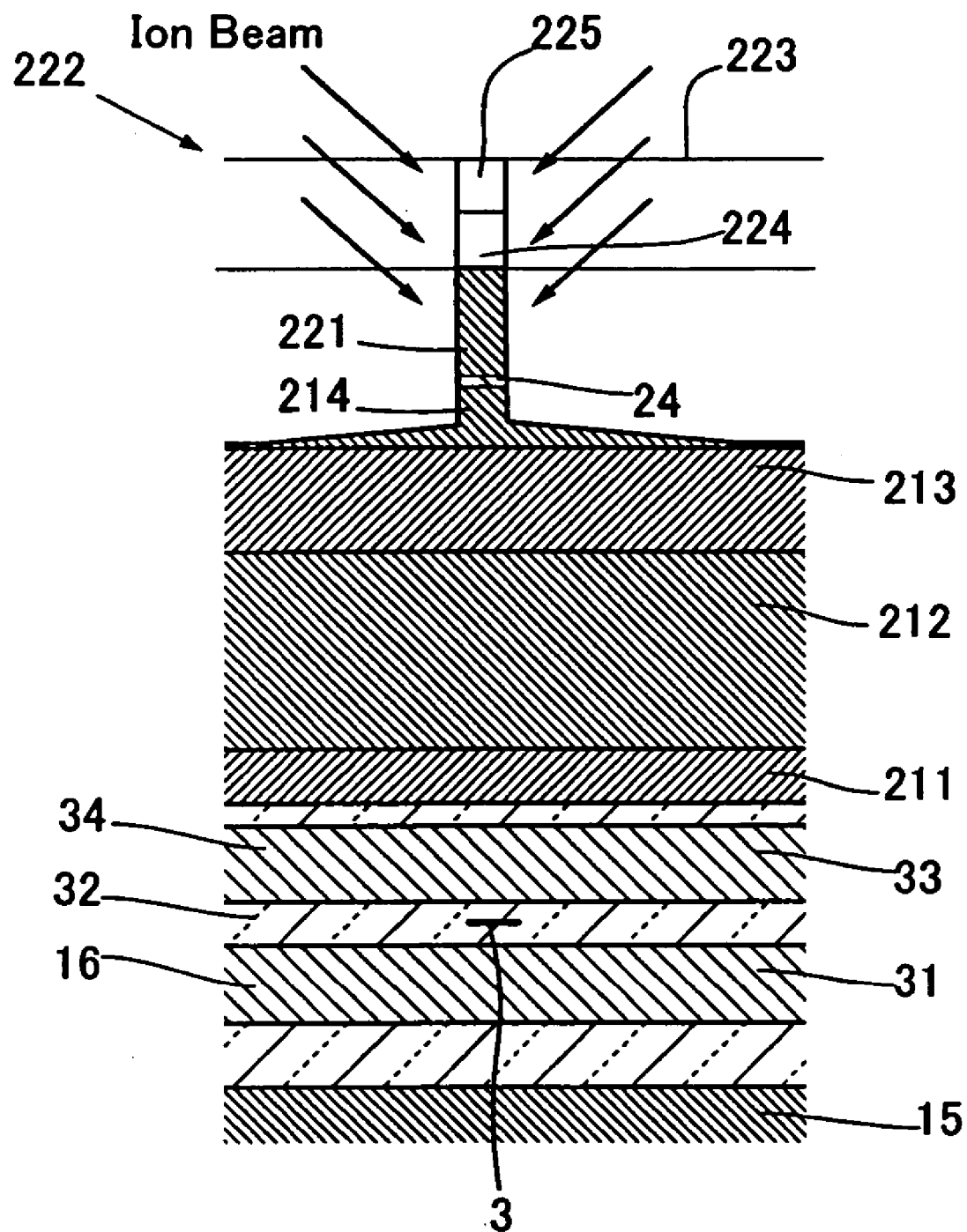
FIG. 33 is a view of the process shown in FIG. 32, seen from the ABS side.

In the illustrated embodiment, referring to FIG. 31, the etching with the presence of the resist mask FR3 is stopped within the thickness of the seed film 221. Next, as shown in FIGS. 32 and 33, the resist mask FR3 is removed and then etching without the resist mask is performed, continued to expose the magnetic film 214. Consequently, the fourth pole piece 214 adjacent to the gap film 24 is trimmed at both sides in the width direction to have substantially the same width as the second pole portion P2. The indentations formed by the trimming have a bottom gradually increasing in thickness toward the fourth pole piece 214. After that, a protective film 258 is formed (see FIG. 2) and the manufacturing process is finished.

By the above-mentioned etching process, the surface of the narrow portion 224 is trimmed, lowered to a position lower than the surface of the wide portion 223. This produces a sloping flare portion 225 that extends from the narrow portion 224 to the wide portion 223, gradually increasing in width and its surface sloping upward away from the surface of the narrow portion 224 to the surface of the wide portion 223.

Consequently, a three-dimensional difference in level by the sloping flare portion 225 is formed between the surface of the narrow portion 224 forming the second pole portion P2 and the surface of the wide portion 223. The advantage of this three-dimensional difference in level is as already described.

Now, a pole trimming process is described in more detail.

Figure 34:
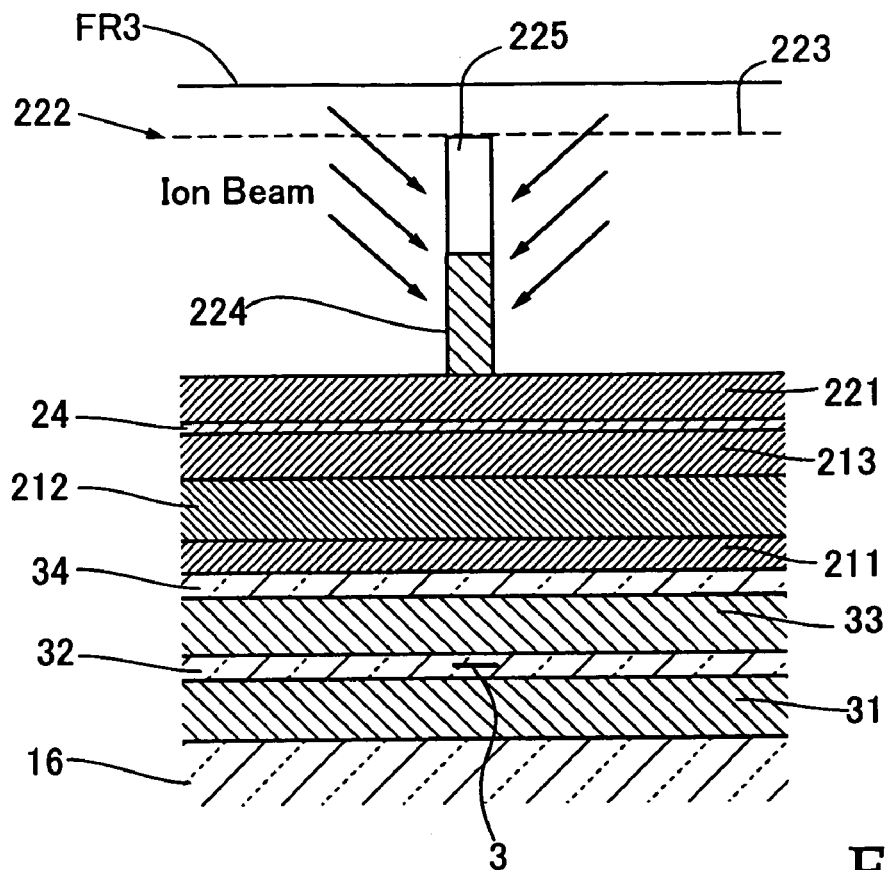
FIG. 34 is a diagram showing details of the process shown in FIGS. 32 and 33.
Figure 35:
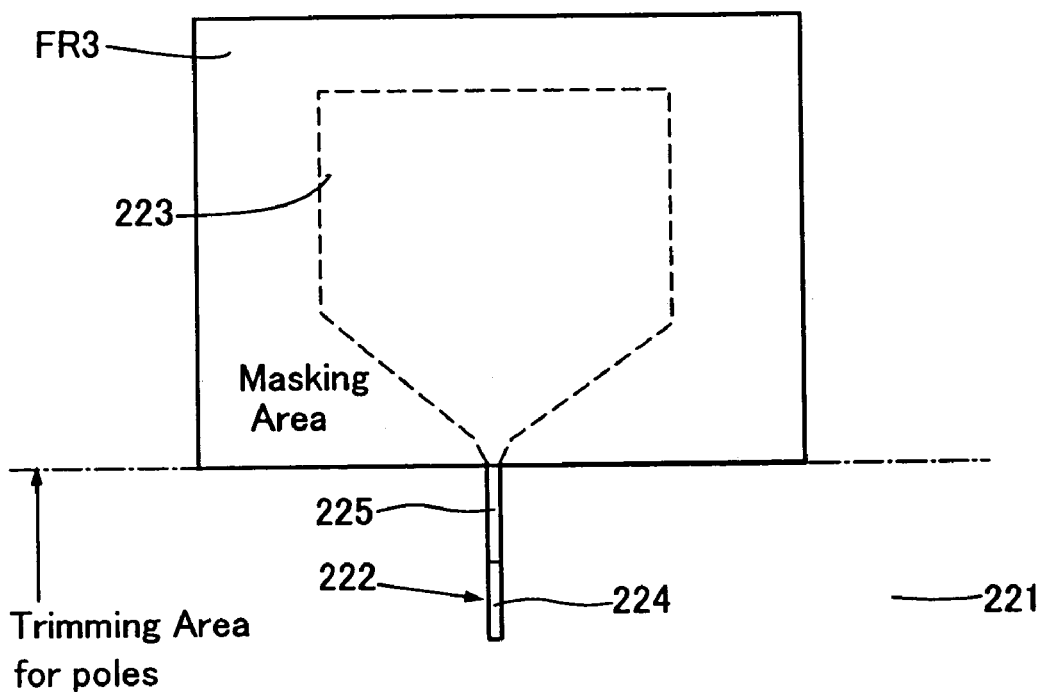
FIG. 35 is a view of the process shown in FIG. 34, seen from the upper face side.

The pole trimming process is required to make the first pole portion P1 and the second pole portion P2 equal in width to each other and consequently prevent expansion of an effective write track width. Referring to FIGS. 34 and 35, the resist mask FR3 is open at a part of the third magnetic film 222 including the narrow portion 224 and covers the whole wide portion 223 of the third magnetic film 222 and the coil. In this state, the surface of the narrow portion 224 is trimmed by ion beam and as a consequence, portions of the magnetic film 213 around the resist mask FR3 is also etched correspondingly to the trimming depth of the narrow portion 224.

Referring to FIG. 35, the resist frame FR3 rises at the substantially same position with the flare point FP1 in the rear of the ABS (in the coil side). Consequently, there is no possibility of the flare point FP1 varying in the trimming process shown in FIGS. 34 and 35. This assures a constant minimal value of the distance from the ABS to the flare point FP1 in a thin film magnetic head and consequently assures the overwrite characteristic.

Figure 36:
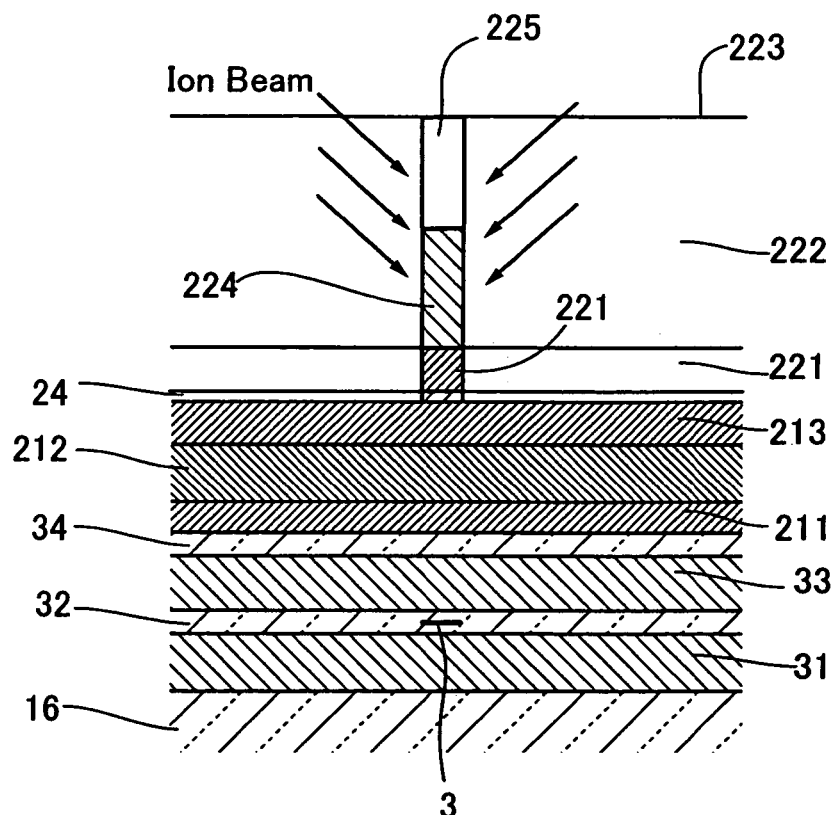
FIG. 36 is a diagram showing a process after the process shown in FIGS. 34 and 35.
Figure 37:
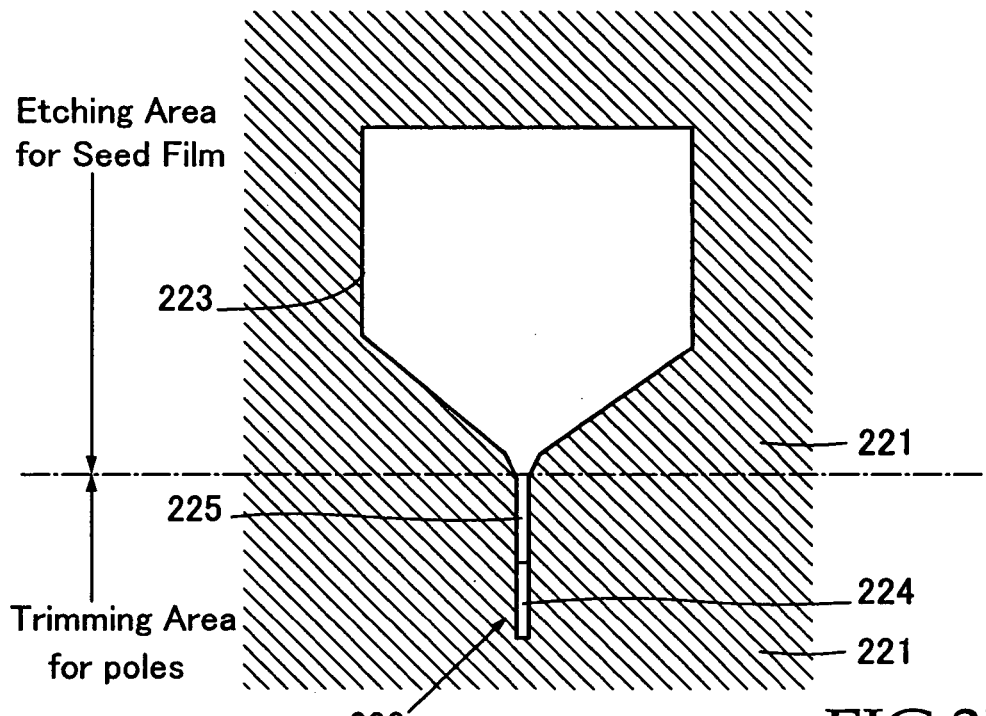
FIG. 37 is a view of the process shown in FIG. 36, seen from the upper face side.

Next, as shown in FIGS. 36 and 37, the resist mask FR3 is removed and then the second magnetic film 221 used as a seed film is etched by ion beam using the third magnetic film 222 as a mask. In the etching process of the second magnetic film 221, the resist mask FR3 has been already removed and so, there is no possibility that metal particles resulting from the etching of the second magnetic film 221 might be deposited on a side end face of the resist mask with resultant deposit on the narrow portion 224 to be the second pole portion P2. Consequently, a narrowed track width, for example, 0.2 μm or less is achieved.

Figure 38:
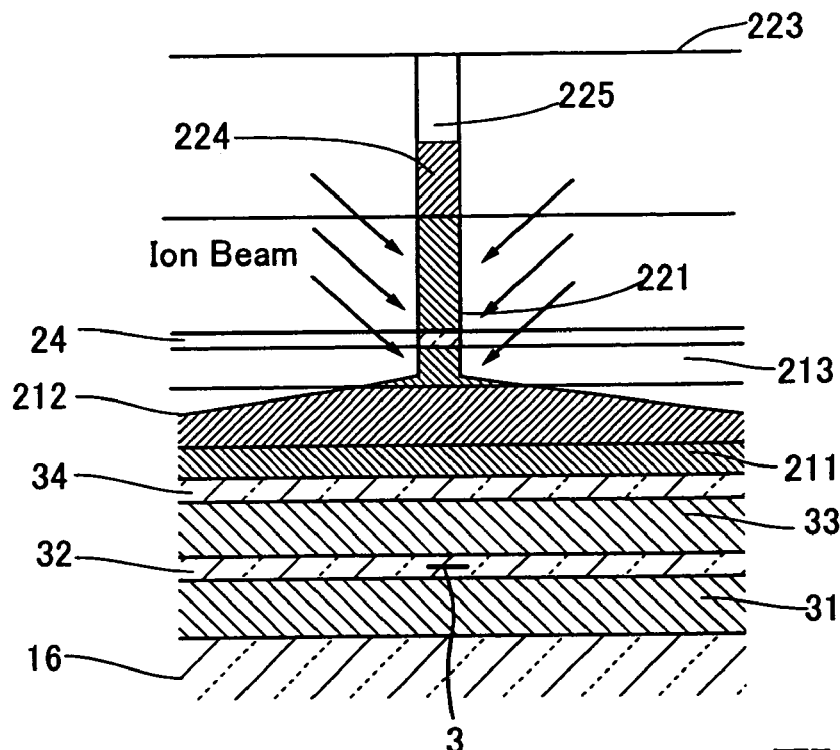
FIG. 38 is a diagram showing a process after the process shown in FIGS. 36 and 37.
Figure 39:
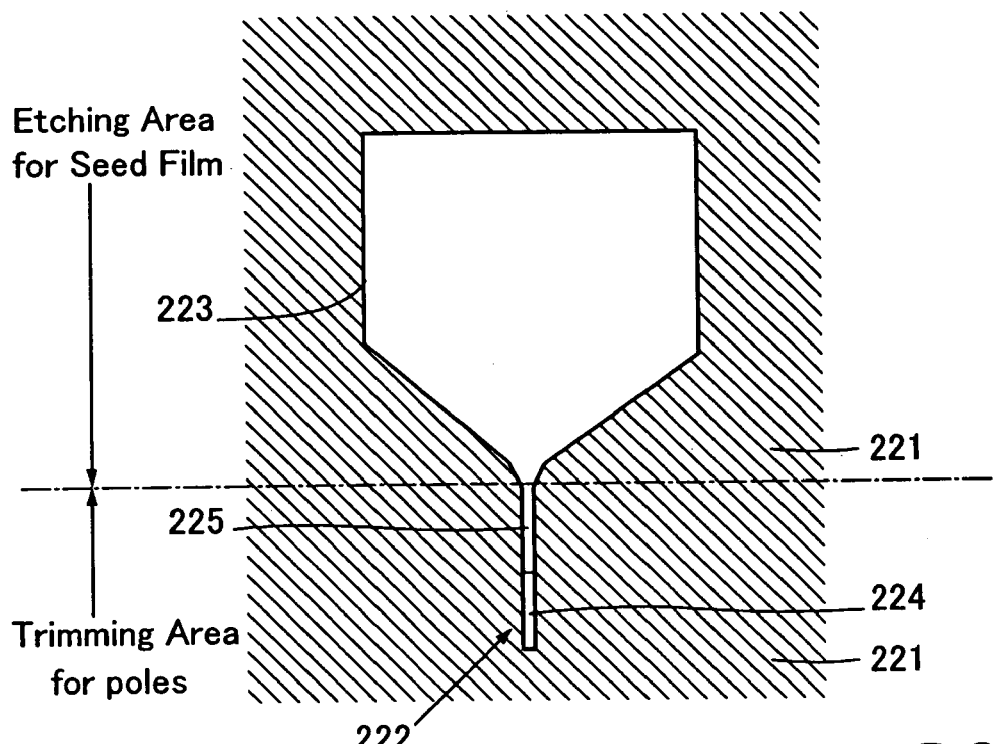
FIG. 39 is a view of the process shown in FIG. 38, seen from the ABS side.

As shown in FIGS. 38 and 39, the trimming is continued to expose the magnetic film 213, which is the top layer of the first pole portion P1. As a result, the first pole portion P1 and the second pole portion P2 are made to have the same track width, which prevents expansion of an effective write track width.

With regard to the quantity of trimmed portion of the third magnetic film 222, trimming quantity on the surface of the third magnetic film 222 is larger than that on the both sides of the pole portion. The reason is that: on the surface of the third magnetic film 222, there is no obstacle to the ion beams while on the both sides of the pole portion, the pole portion itself acts as an obstacle. Consequently, a structure having a three-dimensional difference in level is obtained.

Now, advantages of a trimming method according to the present invention are described in comparison with a conventional trimming method.

Figure 40:
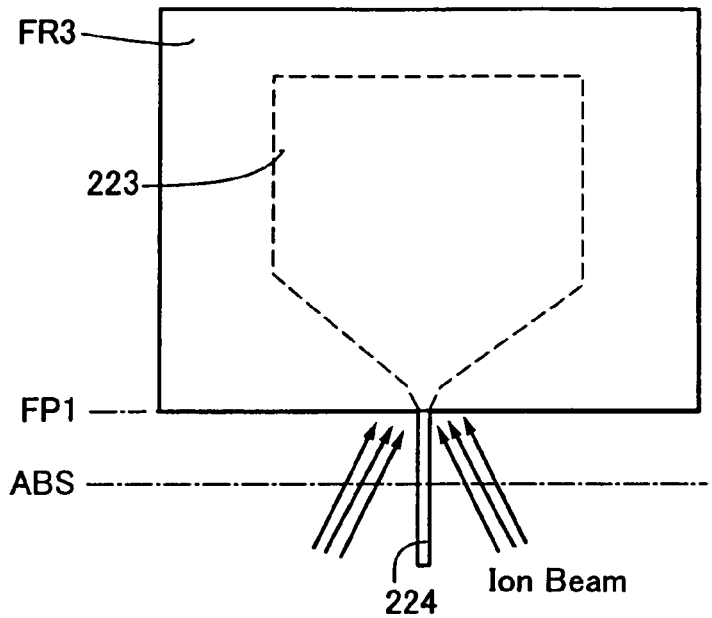
FIG. 40 is a view of the process shown in FIGS. 30 and 31, seen from the upper face side.
Figure 42:
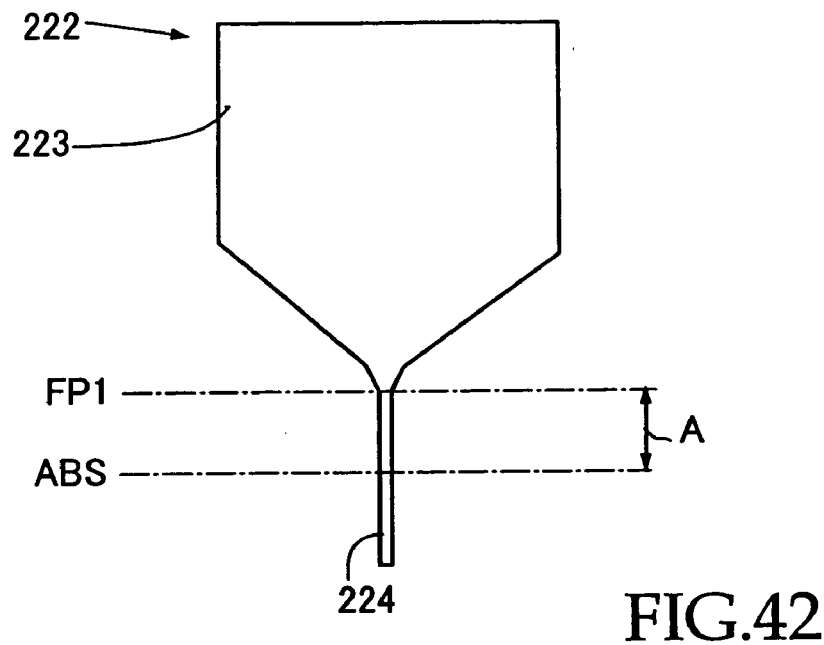
FIG. 42 is a view of a state in which the process shown in FIG. 40 has been performed, seen from the upper face side.

FIG. 40 is a plan view showing a trimming method according to the present invention, and FIG. 42 is a diagram showing a state in which the trimming shown in FIG. 40 has been performed. FIG. 40 is a diagram showing the process shown in FIGS. 35 and 36 as a plan view. Referring to FIG. 40, the resist frame FR3 rises at the substantially same position with the flare point FP1 in the coil side (in the rear of the ABS). The position at which the resist frame FR3 rises is not necessarily the same position with the flare point FP1 and may be in the vicinity of the flare point FP1.

In the trimming method of the present invention, as the resist frame FR3 rises at the rear of the ABS (in the coil side), there is no possibility of the flare point FP1 varying in the trimming process shown in FIG. 40. This assures a constant minimal value of the distance from the ABS to the flare point FP1 in a thin film magnetic head and consequently assures the overwrite characteristic.

Figure 41:
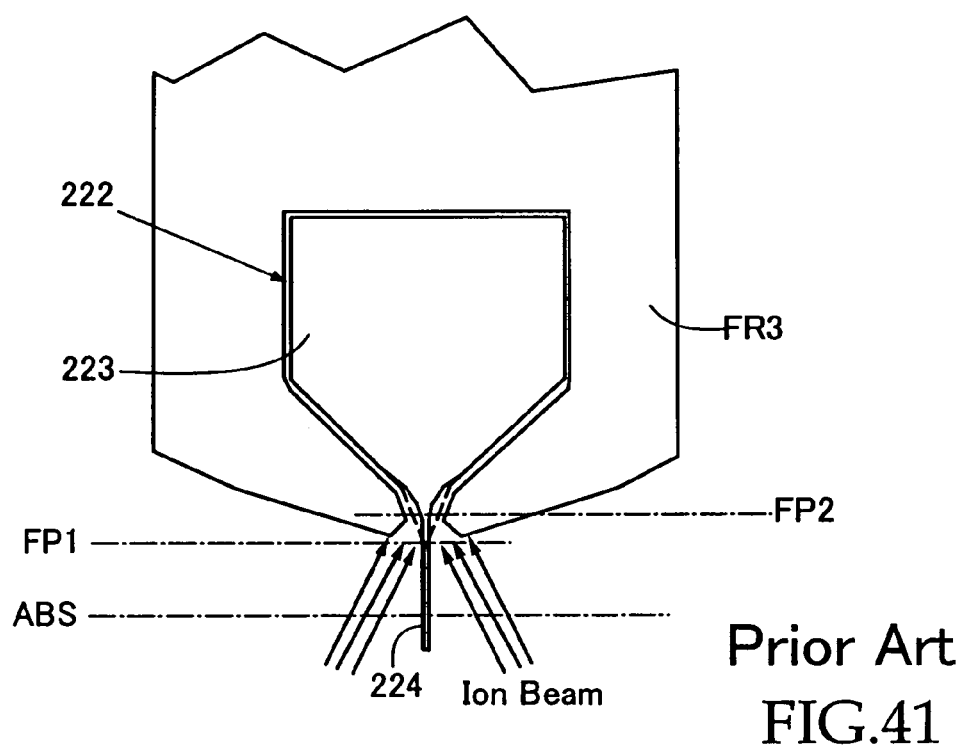
FIG. 41 is a view of a conventional process to be compared with FIG. 40, seen from the upper face side.
Figure 43:
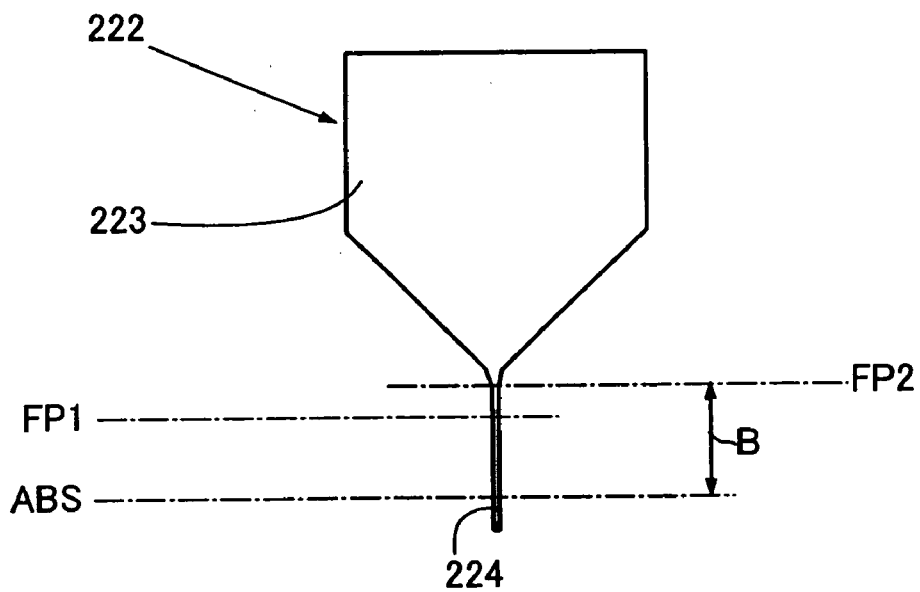
FIG. 43 is a view of a state in which the conventional process shown in FIG. 41 has been performed, seen from the upper face side.

FIG. 41 is a plan view showing a conventional trimming method and FIG. 43 is a plan view showing a state in which the trimming of FIG. 41 has been performed. In the conventional trimming method shown in FIG. 41, a trimming mask FR3 is formed so as to surround a third magnetic film 222 to be an upper yoke portion and cover a coil portion, not to cover the wide portion 223 to be the upper yoke and the narrow portion 224 to be the upper pole.

Due to the trimming mask FR3 not covering the wide portion 223 and the narrow portion 224, ion beams trim a sloping flare portion 225, which extends, gradually increasing in width, from the narrow portion 224 to be the upper pole portion to the wide portion 223 to be the upper yoke, so that the flare point FP1, at which the third magnetic film 222 begins to increase in width, backs to point FP2, with the increased distance B from the ABS to the flare point FP2 as shown in FIG. 43. Distance B is larger than distance A (B>A).

The flare point backing described above reduces the magnetic volume, with degradation in the overwrite characteristic. The reason is that the closer the flare point FP1 is to the ABS in the sloping flare portion 225, the more excellent over-write characteristic is obtained. The flare point must be made close to the ABS, especially in the case of a track width of 0.2 μm or less.

In the conventional trimming method, another problem arises in addition to the flare point backing due to the above-mentioned reason. The problem is described with reference to FIGS. 44 to 47.

Figure 44:
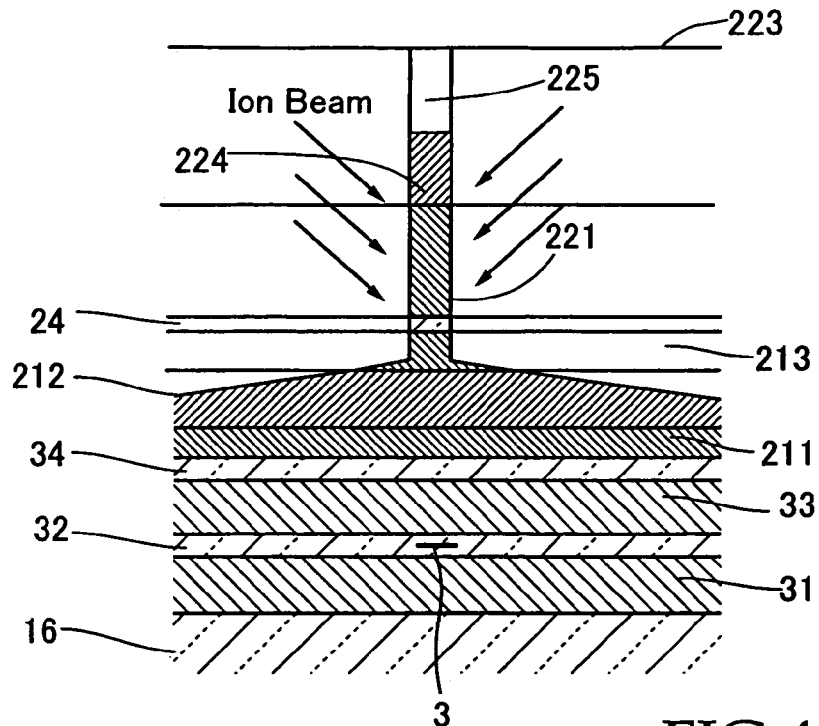
FIG. 44 is a diagram showing a process after the process shown in FIG. 40.
Figure 45:
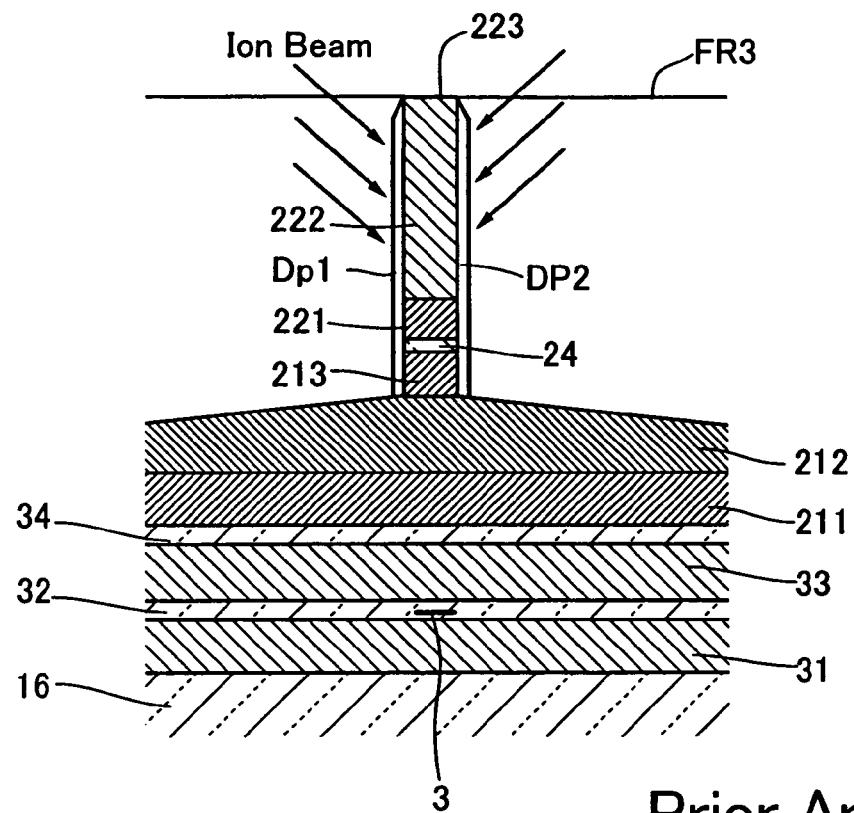
FIG. 45 is a diagram showing a process after the process shown in FIG. 41.

FIG. 44 is a diagram showing a pole structure obtained by a trimming method of the present invention, and FIG. 45 is a diagram showing a pole structure obtained by a conventional trimming method.

In the trimming method of the present invention, as shown in FIG. 44, a resist mask is removed and after that the whole including a pole portion and a seed film is trimmed by ion beam. In this step, as the resist mask FR3 has been already removed, it is possible to apply ion beam at a relatively small angle of 30 to 45 degrees. Consequently, accurate control on the track width of a pole portion is achieved.

Figure 46:
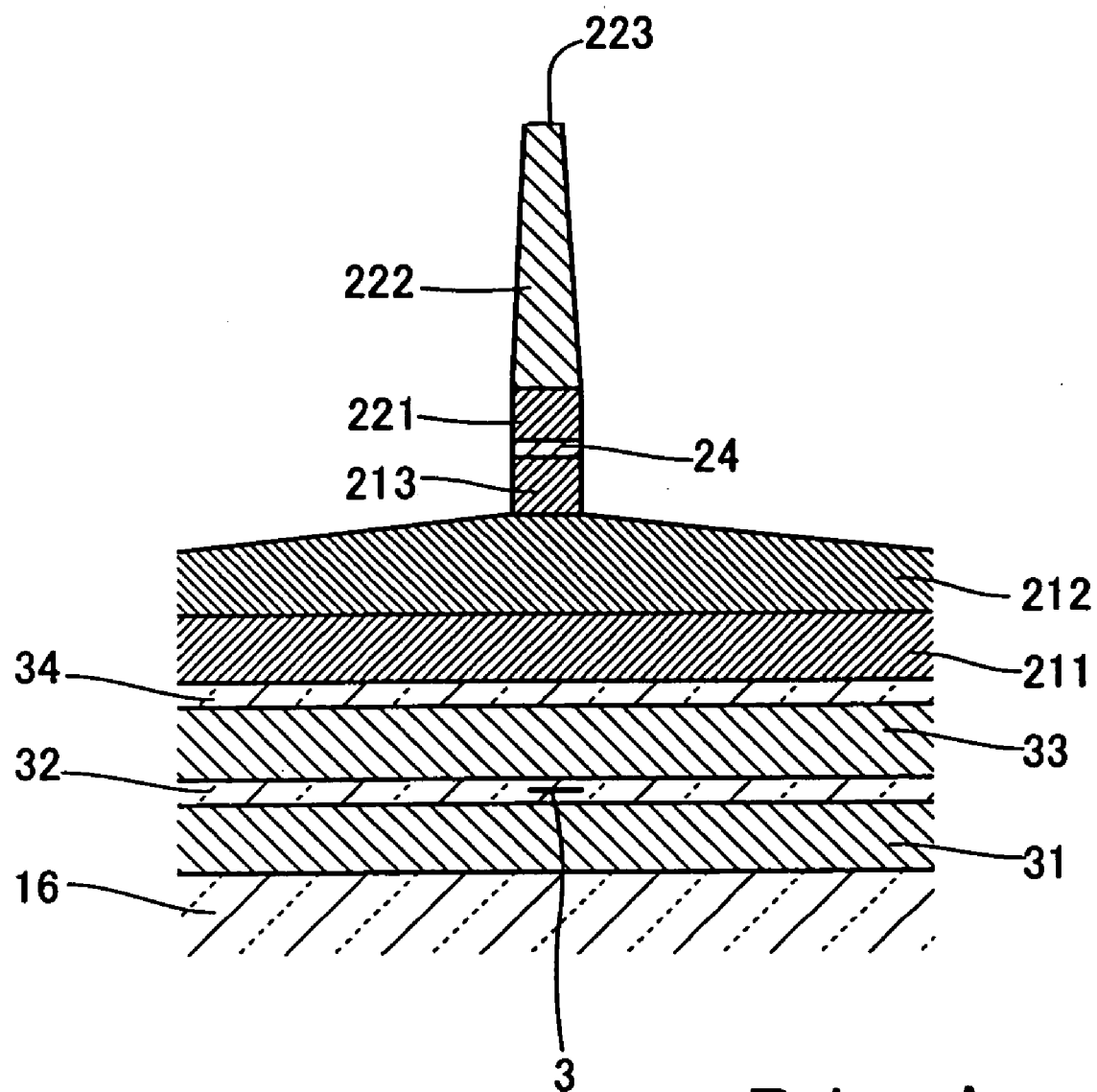
FIG. 46 is a diagram showing a result obtained by a conventional process after the process shown in FIG. 44.

In the prior art, a trimming mask FR3 is formed so as to surround a third magnetic film 222 to be the upper yoke and cover a coil portion, not to cover the third magnetic film 222 and the upper pole. As a result, when the magnetic film 213 is trimmed by ion beam, metal particles scattered by the ion beam trimming are deposited on the side walls of the upper pole as shown FIG. 45 (see the deposit films DP1, DP2). To obtain a specified track width, the deposit films DP1 and DP2 must be removed. To remove the deposit films DP1 and DP2, ion beams must be applied at a large angle of 50 to 75 degrees. As shown in FIG. 46, the ion beam irradiation at a large angle causes the narrower magnetic films 222 and 221, which form the upper pole.

Moreover, the ion beam irradiation at a large angle gives the pole a taper angle to reduce the pole in width from the flare point toward the ABS. is gradually reduced, and this causes a problem of individual magnetic heads varying in track width on the ABS.

And while a narrow-track structure might be achieved by applying a semiconductor process technique on a flat pole structure to perform a submicron process on a pole portion, the surface of a flare portion expanding in width from the pole portion toward the yoke portion forms the same plane as the surfaces of the pole portion and yoke portion, causing problems that, in a write operation, the magnetic flux leaked from a side of the flare portion might erase a magnetic record on an adjacent track in a magnetic recording medium (side erase phenomenon), give a magnetic record to an adjacent track in a magnetic recording medium (side write phenomenon), or the like. Due to these problems, it is difficult to perform an accurate track control of 0.2 μm or less, and consequently it is impossible to achieve a high surface recording density of 100 Gb/p or more.

From the above description, it is apparent that the present invention can solve these problems of the conventional trimming method.

(2) Embodiment 2

Embodiment 2 relates to a method for manufacturing a thin film magnetic head shown in FIGS. 7 and 8. FIGS. 47 to 65 show a process of manufacturing the same. It is notified in advance that processes illustrated in FIGS. 47 to 63 are also performed on a wafer.

Figure 47:
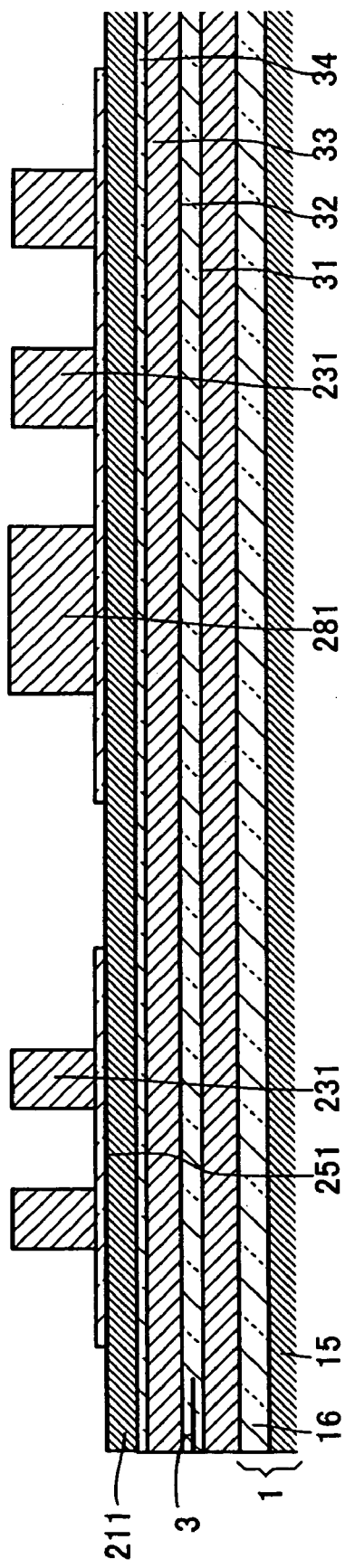
FIG. 47 is a diagram showing a process of a thin film magnetic head shown in FIGS. 7 and 8.

(A) Process Leading to a State of FIG. 47.

Referring to FIG. 47, on an insulating film 16 deposited on a base body 15 there are formed a first shield film 31, a read element 3, an insulating film 32, a second shield film 33, an insulating film 34 and a first magnetic film 211 by means of publicly known processes.

The first magnetic film 211 can be made of a plating film of NiFe (80%:20%), NiFe (45%:55%) or CoNiFe. The first magnetic film 211 may be made of a sputtering film of FeAlN, FeN, FeCo, CoFeN, FeZrN or the like with a thickness of 0.5 to 0.6 μm.

After that, an insulating film 251 is formed, for example, 0.2 μm thick on the flat surface of the first magnetic film 211, the insulating film 251 having an area slightly larger than an area necessary for forming a coil, and then a seed film 260 is formed on the insulating film 251. The seed film 260 is formed so as to cover the surface of the insulating film 251 and the surface of the first magnetic film 211. The seed film 260 is made of a material suitable for a Cu-plating ground and formed 50 nm to 80 nm thick by a Cu-CVD process.

Next, a photoresist film is formed on the seed film 260 by applying a spin coating method or the like, and then is exposed through a mask having a coil pattern and developed. The photoresist film may be either positive photoresist or negative photoresist. The above-mentioned exposure process and development process form a resist frame. Next, a selective Cu-plating process is performed so that a first coil 231 is grown to be 3 to 3.5 μm thick on the seed film 260 inside the coil forming pattern. FIG. 47 shows a state in which the above-mentioned selective Cu-plating process has been performed.

Figure 48:
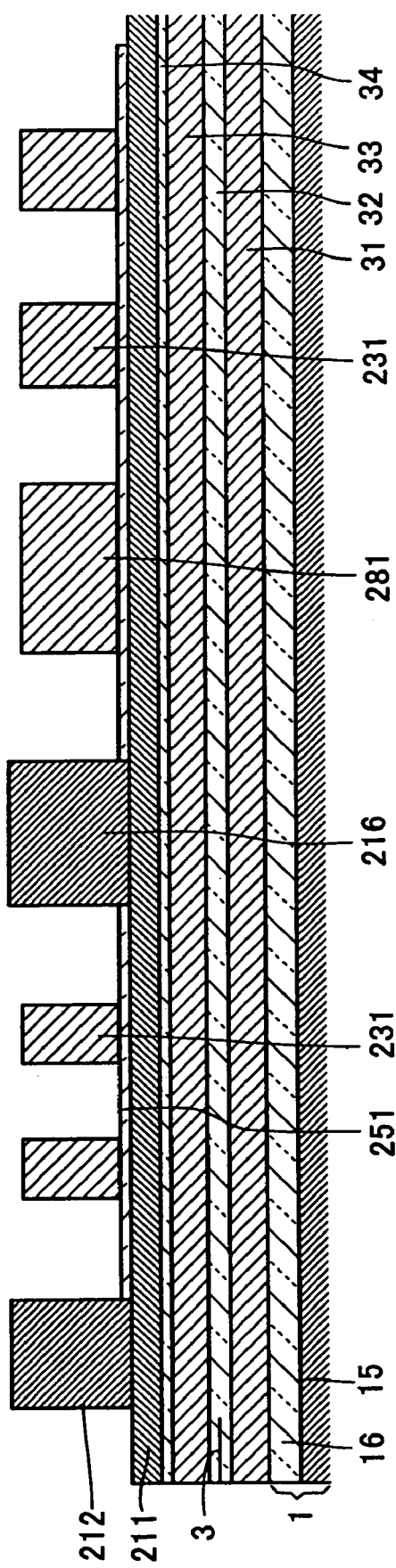
FIG. 48 is a diagram showing a process after the process shown in FIG. 47.

(B) Process Leading to a State of FIG. 48

In a process leading from the state of FIG. 47 to the state of FIG. 48, a photolithography process for forming a pole piece and a back gap piece is performed so that a resist frame for forming the pole piece and the back gap piece is formed.

Next, a selective plating process is performed so that the pole piece and the back gap piece are formed 3.5 μm thick on the first magnetic film 211, and then the resist frame is removed by means of chemical etching or the like. Consequently, as shown in FIG. 48, the pole piece 212 and the back gap piece 216 are formed with a space between them on one surface of the first magnetic film 211. The pole piece 212 and the back gap piece 216 can be made of CoNiFe (composition ratio, 67:15:18, 1.8 to 1.9 T) or FeCo (composition ratio, 60:40, 2.4 T).

Figure 49:
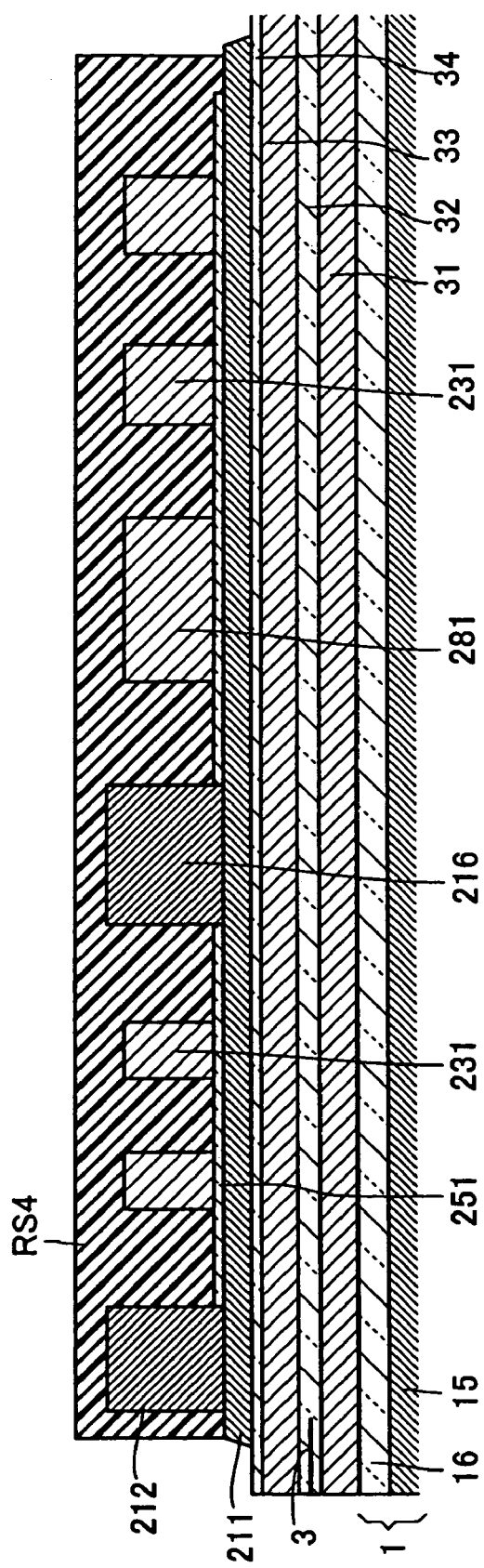
FIG. 49 is a diagram showing a process after the process shown in FIG. 48.

(C) Process Leading to a State of FIG. 49

In a process leading from the state of FIG. 48 to the state of FIG. 49, a photoresist film RS4 covering the first coil 231, the pole piece 212 and the back gap piece 216 is formed, and then the first magnetic film 211 is selectively etched by ion beam etching (hereinafter, referred to as IBE), using the photoresist film RS4 as a mask.

Figure 50:
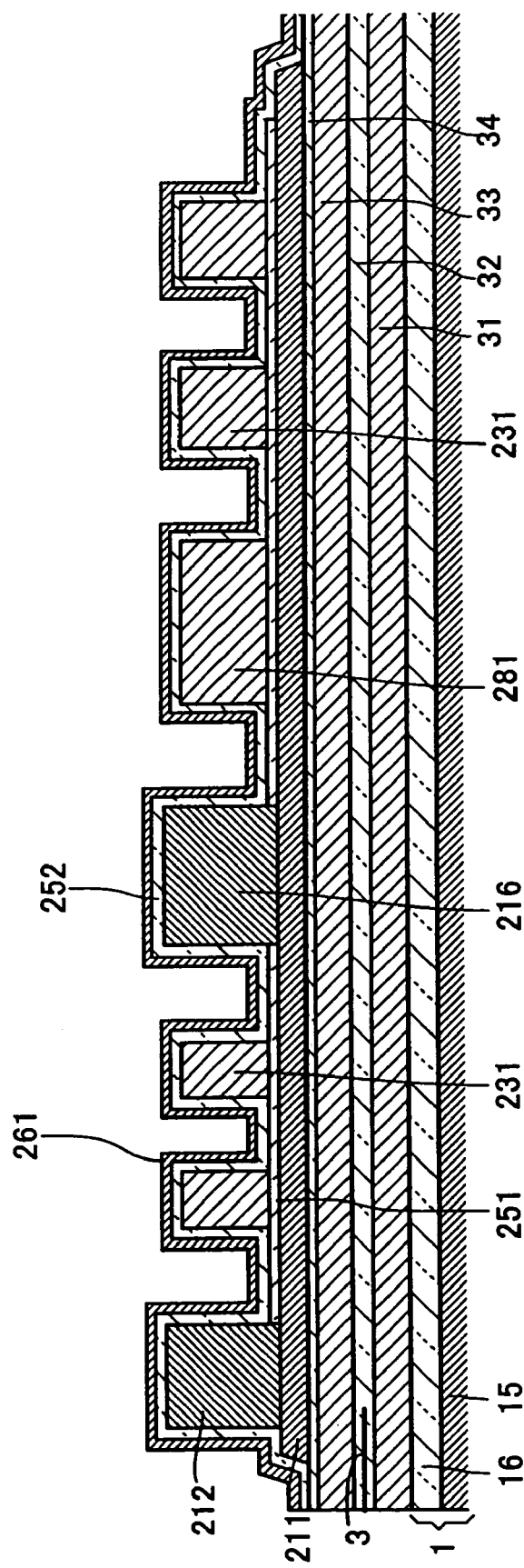
FIG. 50 is a diagram showing a process after the process shown in FIG. 49.

(D) Process Leading to a State of FIG. 50

In a process leading from the state of FIG. 49 to the state of FIG. 50, the resist cover RS4 shown in FIG. 49 is removed and then, as shown in FIG. 50, an insulating film 252 is deposited on the surfaces and side faces of the insulating film 251, the first coil 231, the second pole piece 212 and the back gap piece 216. Concretely, the insulating film 252 is formed 0.05 to 0.15 μm thick by an $Al_2O_3$—CVD process. The insulating film is formed under a low-pressure atmosphere at a temperature not less than 100 C. In case of forming the insulating film 252 as an $Al_2O_3$ film, it is possible to adopt an alumina-CVD film forming method of spraying $Al(CH_3)_3$ and $AlCl_3$ in an alternate and intermittent way under a low-pressure atmosphere of $H_2O$, $N_2$, $N_2O$ or $H_2O_2$.

Next, a seed film 261 is deposited on the surface of the insulating film 252. The seed film 261 can be formed as a Cu-sputtering film of 50 nm in thickness, a Cu-CVD film stack of 50 nm in thickness or the like.

Figure 51:
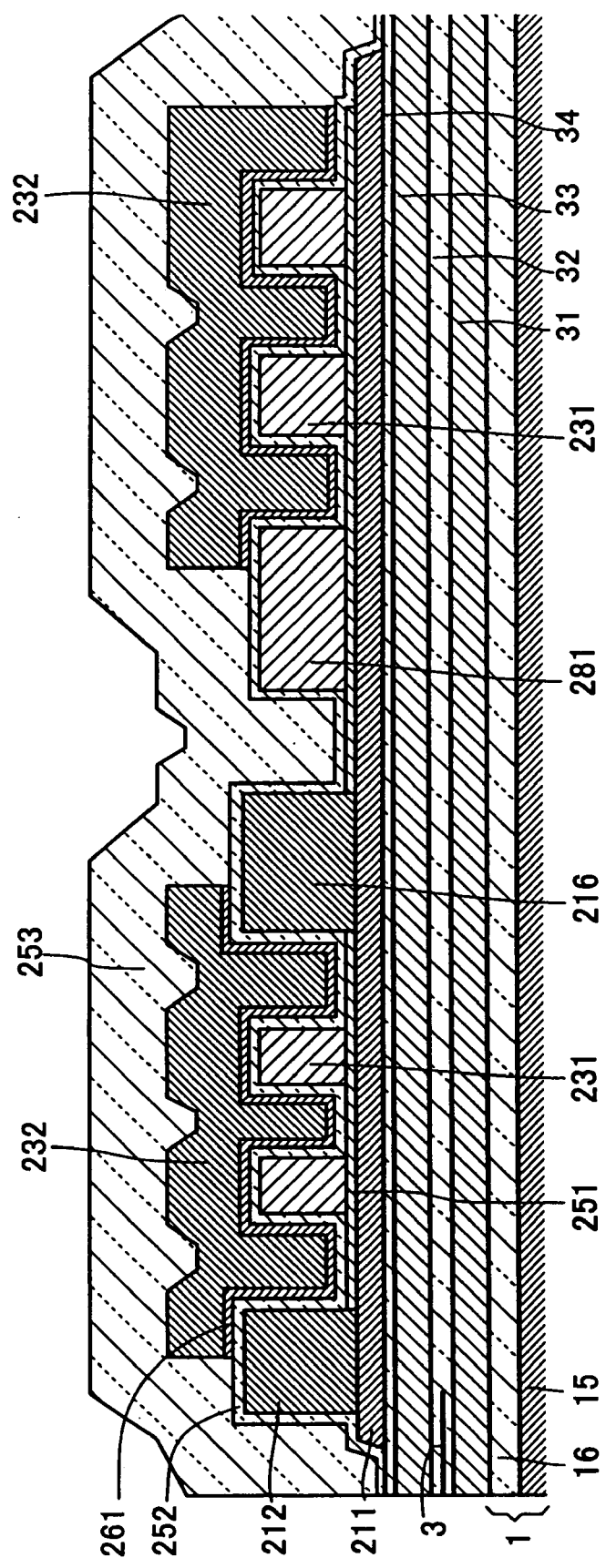
FIG. 51 is a diagram showing a process after the process shown in FIG. 50.

(E) Process Leading to a State of FIG. 51

In a process leading from the state of FIG. 50 to the state of FIG. 51, a plating film 232 to be a second coil is formed, for example, 3 to 4 μm thick on the seed film 261 by a frame-plating method. The plating film 232 comprises Cu as its main constituent and is formed by a selective plating method. The seed film 261 not covered with the plating film 232 is removed by wet etching using dilute hydrochloric acid, dilute sulfuric acid, copper sulfate or the like, or by dry etching such as ion milling or the like.

After that, an insulating film 253 of $Al_2O_3$ is formed so as to cover the plating film 232 and the area not covered with the plating film 232. The insulating film 253 is formed as a sputtering film of 4 to 6 μm in thickness.

Figure 52:
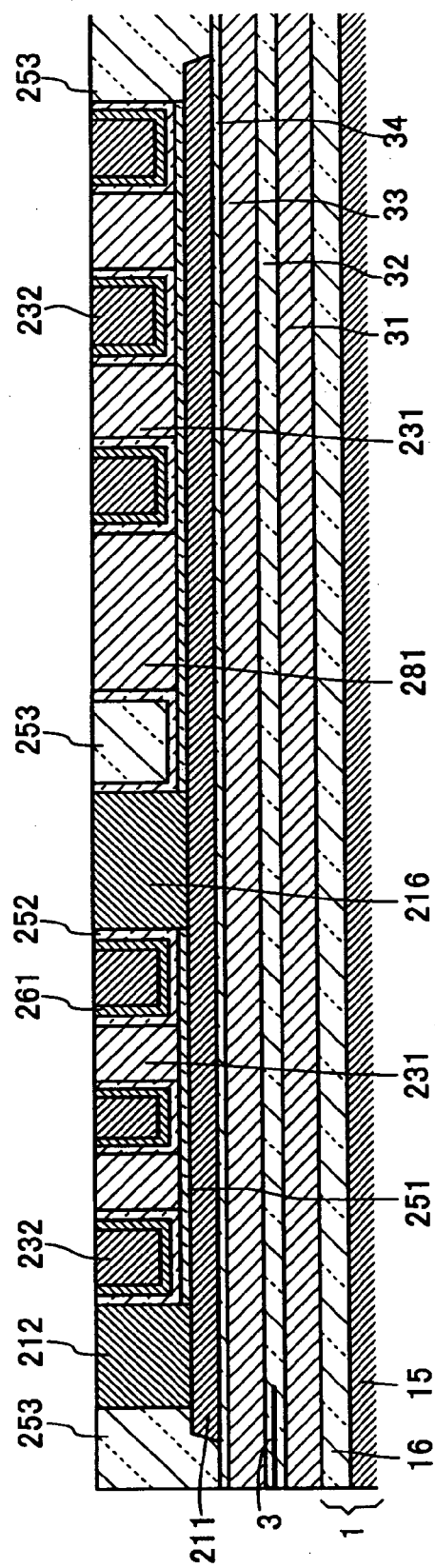
FIG. 52 is a diagram showing a process after the process shown in FIG. 51.

(F) Process Leading to a State of FIG. 52

In a process leading from the state of FIG. 51 to the state of FIG. 52, the insulating film 253 and the plating film 232 are polished and flattened by CMP. Consequently, a second coil 232 of a spiral pattern is obtained, insulated from the first coil 231 by the insulating film 252. In the CMP, the surfaces of the pole piece 212, the back gap piece 216 and the insulating film 253 are also polished so as to form the same plane as the surfaces of the first coil 231 and the second coil 232.

Figure 53:
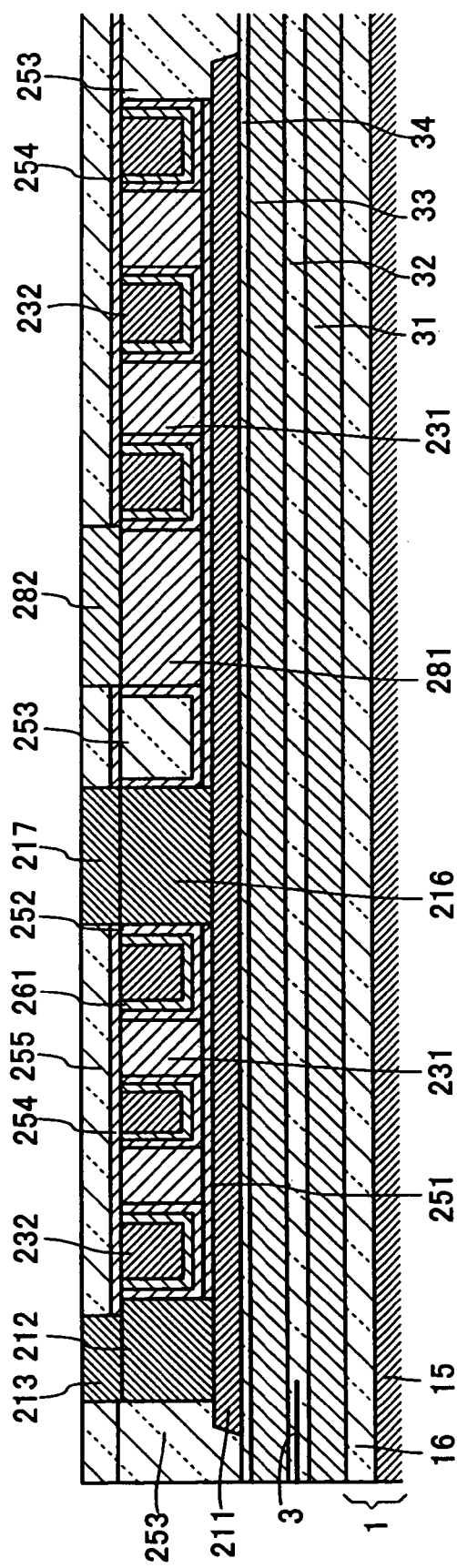
FIG. 53 is a diagram showing a process after the process shown in FIG. 52.

(G) Process Leading to a State of FIG. 53

In a process leading from the state of FIG. 52 to the state of FIG. 53, as shown in FIG. 53, an insulating film 254 covering the surfaces of the first coil 231 and the second coil 232 is formed thereon. The insulating film 254 is made of $Al_2O_3$ and formed, for example, 0.2 μm to 0.5 μm in thickness.

Next, a reactive ion etching (RIE) process or an ion milling process is performed on the insulating film 254 to form openings for a third pole piece 213 and a back gap piece 217 (see FIGS. 7 and 8). After that, plating is performed to form the third pole piece 213 and the back gap piece 217. After the third pole piece 213 and the back gap piece 217 are formed, the resist frame is removed. The third pole piece 213 and the back gap piece 217 each are a plating film of CoFe or CoNiFe (2.1 to 2.3 T) and have a film thickness of 1 to 2 μm.

Next, an insulating film 255 of $Al_2O_3$ is deposited, for example, 1 to 2 μm in thickness on the surface where the third pole piece 213 and the back gap piece 217 have been formed, and then the surfaces of the insulating film 255, the third pole piece 213 and the back gap piece 217 are polished by CMP.

Figure 54:
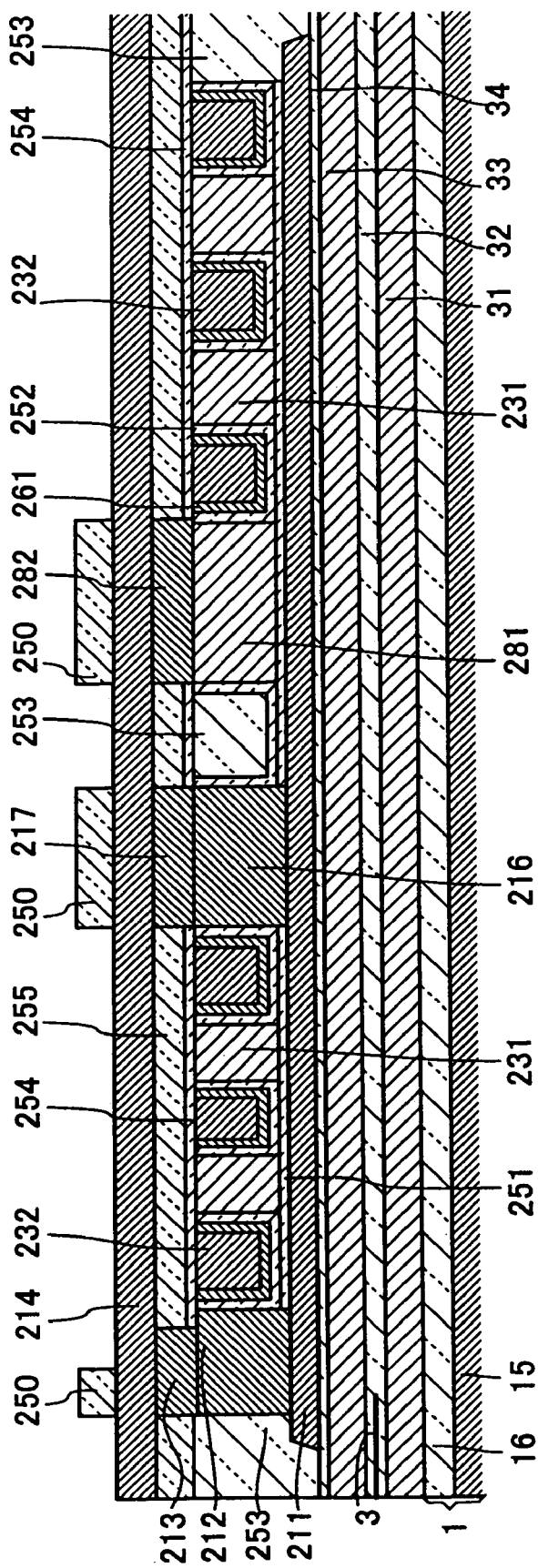
FIG. 54 is a diagram showing a process after the process shown in FIG. 53.
Figure 55:
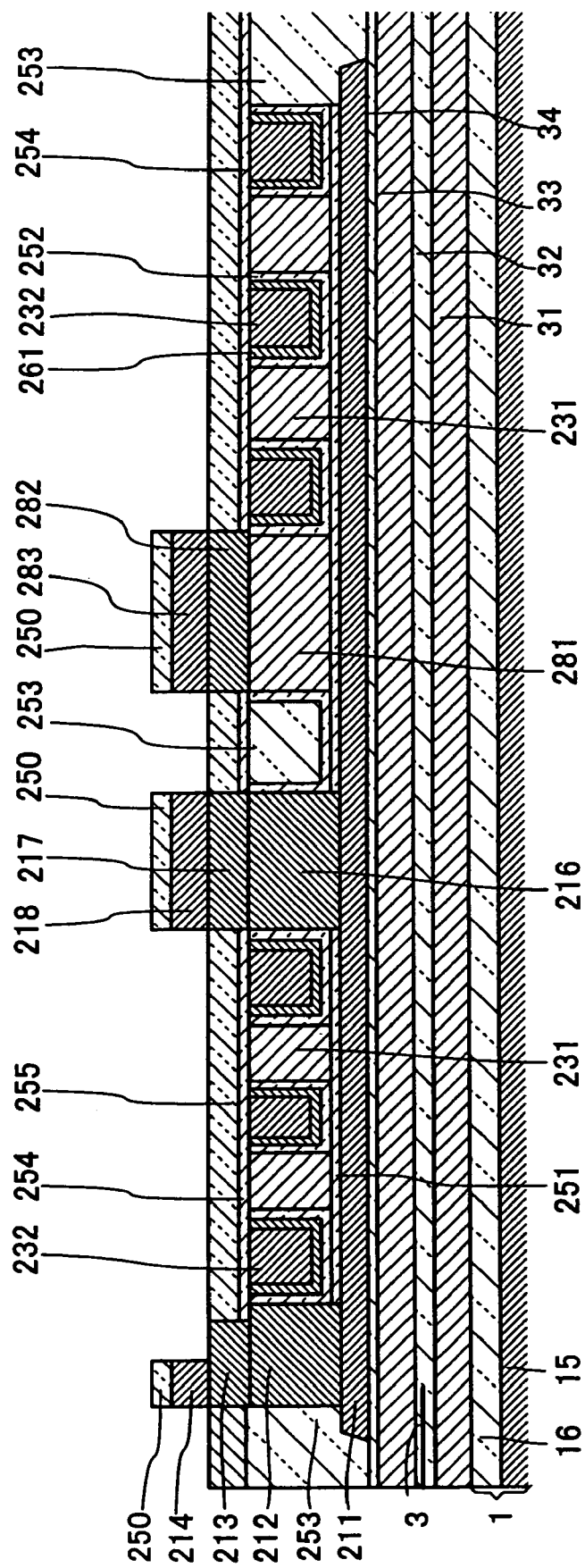
FIG. 55 is a diagram showing a process after the process shown in FIG. 54.

(H) Process Leading to States of FIGS. 54 and 55

In a process leading from the state of FIG. 53 to the state of FIG. 54, a magnetic film 214 is formed 0.5 to 1.0 μm thick on the polished surfaces of the insulating film 255, the third pole piece 213 and the back gap piece 217. The magnetic film 214 can be made of a plating film of CoFeN (2.4 T) or a sputtering film of FeAlN, FeN, FeCo or FeZrN. After that, a mask 250, which is a pattern-plating film of NiFe or CoNiFe, is formed on the third pole piece 213 and the back gap piece 217. And an IBE process with the mask 250 is performed on the magnetic film 214 so that the magnetic film 214 is patterned. Consequently, as shown in FIG. 55, a fourth pole piece 214 and a back gap piece 218 are formed.

In case of patterning the magnetic film 214 with the mask 250 of a pattern-plating film, ion beams are applied at 0 degree and 75 degrees, which provides selective patterning on the magnetic film 214 made of an HiBs material.

The magnetic film 214 can also be patterned by other methods. For example, an RIE process is applied onto the magnetic film 214 at a high temperature of 50 to 300 C under a halogen-based gas atmosphere of $Cl_2$, $BCl_3+Cl_2$ or the like, so that the magnetic film 214 is etched to 80% of its film thickness. The temperature in the RIE process is preferably 50 C or higher, more preferably 200 to 250 C. This temperature range provides a high-accuracy pattern.

Moreover, an etching profile can be accurately controlled by introducing $O_2$ into a $Cl_2$-based gas. Specifically, as mixing $O_2$ with a $BCl_3+Cl_2$ gas makes it possible to remove a deposit of a residual boron gas completely, an extremely accurate control over the etching profile is achieved.

Moreover, the use of an etching gas obtained by mixing a $CO_2$ with a $Cl_2$ gas, a $BCl_3+Cl_2$ gas or a gas having $O_2$ mixed with a $Cl_2$ gas or a $BCl_3+Cl_2$ gas increases the etching rate of RIE, and consequently improves the selection ratio with a mask material by 30 to 50%.

After a part of the magnetic film 214, for example, 80% part is etched as described above, an additional ion beam etching (hereinafter, referred to as IBE) is applied onto the remaining magnetic film 214. This IBE is applied at an angle of 40 to 70 degrees, for example.

As described above, by patterning the magnetic film 214 with the mask 250 made of a pattern-plating film of NiFe or CoNiFe, the fourth pole piece 214 with high accuracy is formed. Consequently, a throat height defined by the fourth pole piece 214 is controlled with high accuracy. For example, the throat height can be controlled to be 0.1 to 0.5 μm or. 0.2 to 0.7 μm with grate freedom. Consequently, a thin film magnetic head with a quick rise of a write current and excellent overwrite characteristic is obtained.

Moreover, as the throat height is defined by the fourth pole piece 214 of a thick HiBs material, write magnetic flux for giving a magnetic record to a medium can be concentrated at a pole end as reducing halfway leakage magnetic flux. Consequently, problems of side erase or side write can be solved.

Figure 56:
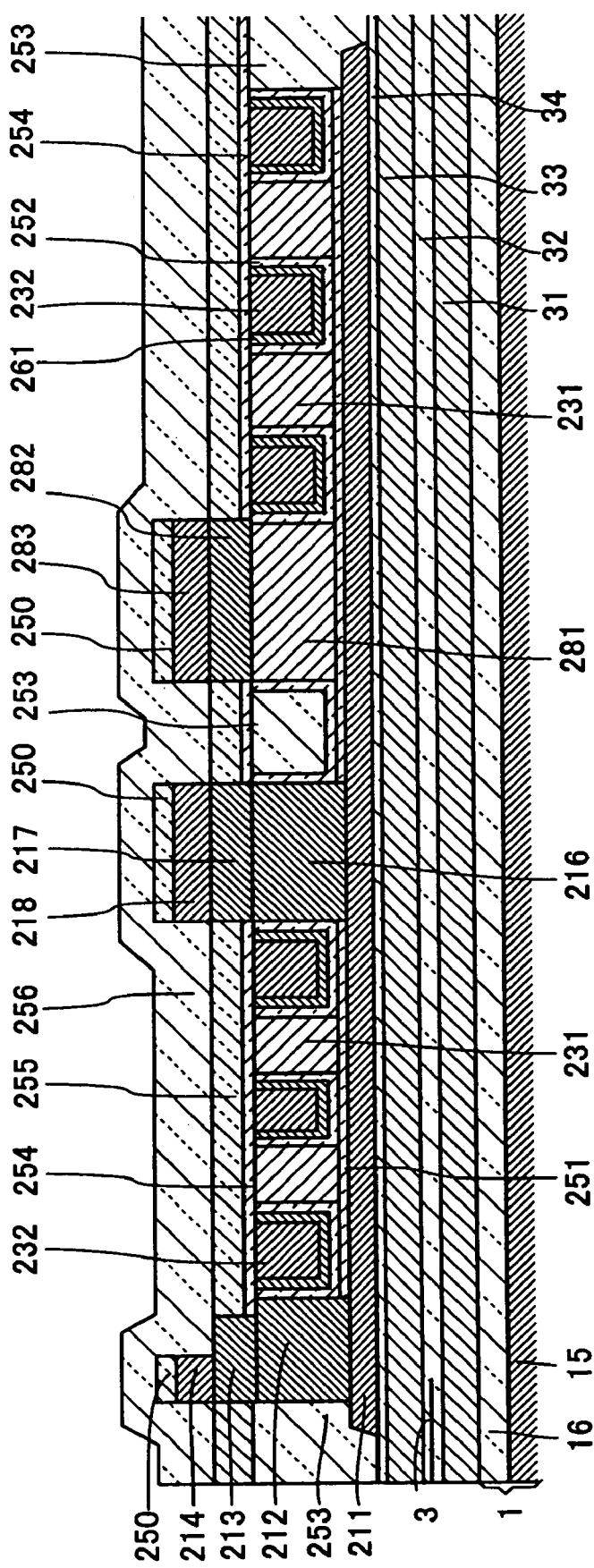
FIG. 56 is a diagram showing a process after the process shown in FIG. 55.
Figure 57:
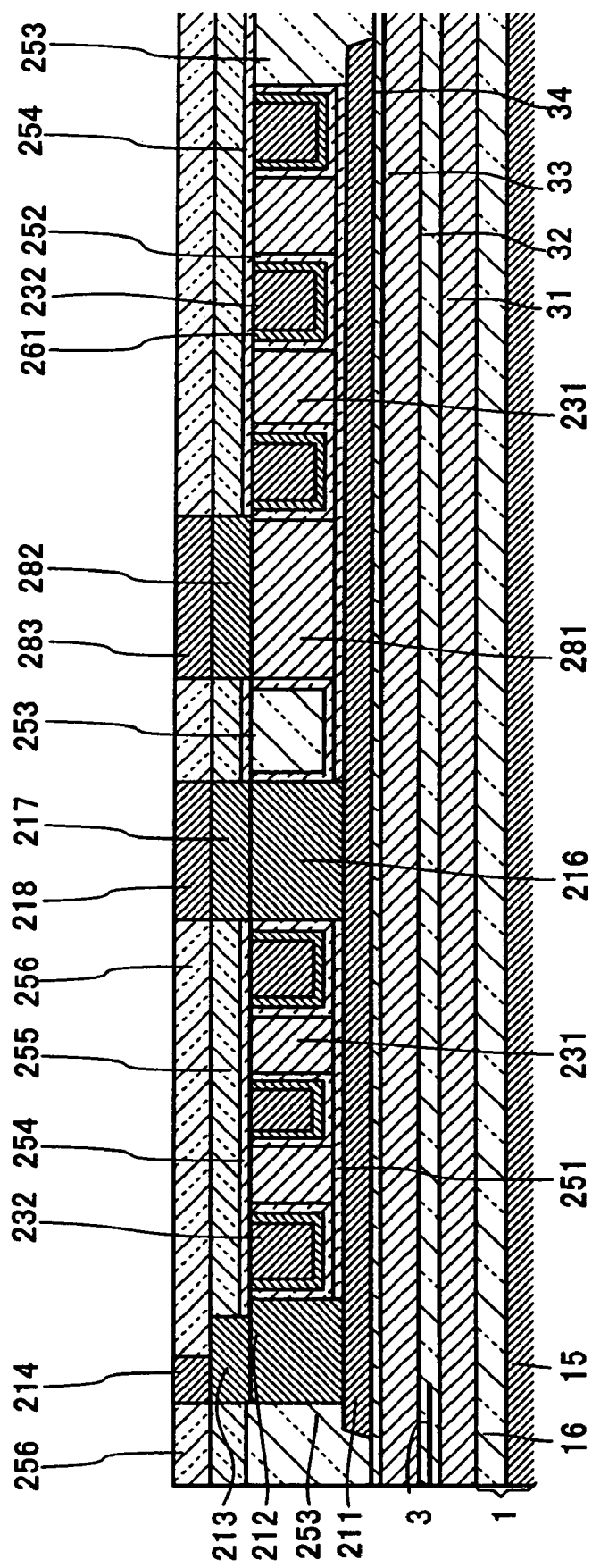
FIG. 57 is a diagram showing a process after the process shown in FIG. 56.

(I) Process Leading to States of FIGS. 56 and 57

In a process leading from the state of FIG. 55 to the state of FIG. 56, an insulating film 256 of $Al_2O_3$ is deposited by means of sputtering or the like. After that, as shown in FIG. 57, the surfaces of the insulating film 256, the fourth pole piece 214 and the back gap piece 218 are polished and flattened by CMP.

Figure 58:
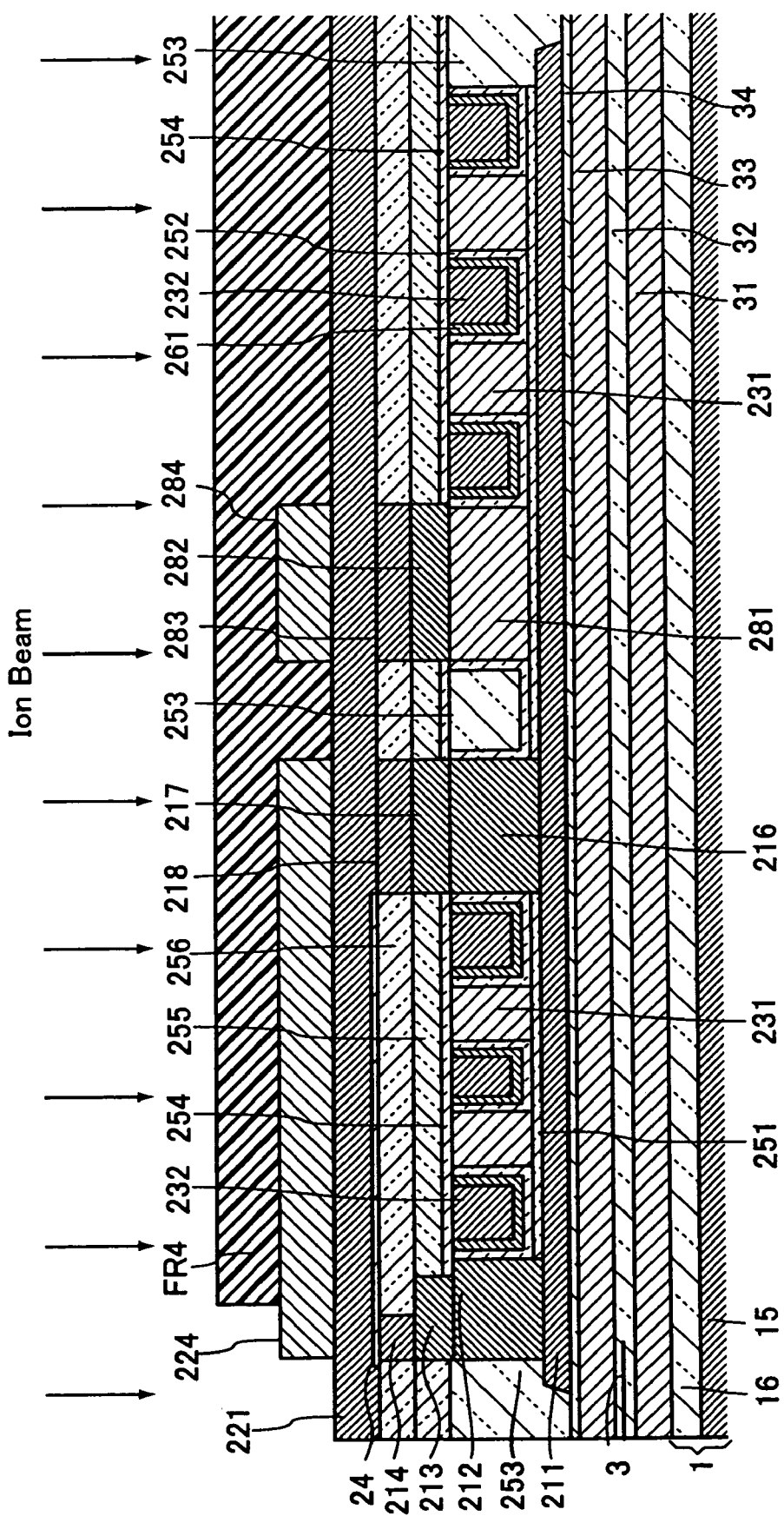
FIG. 58 is a diagram showing a process after the process shown in FIG. 57.
Figure 59:
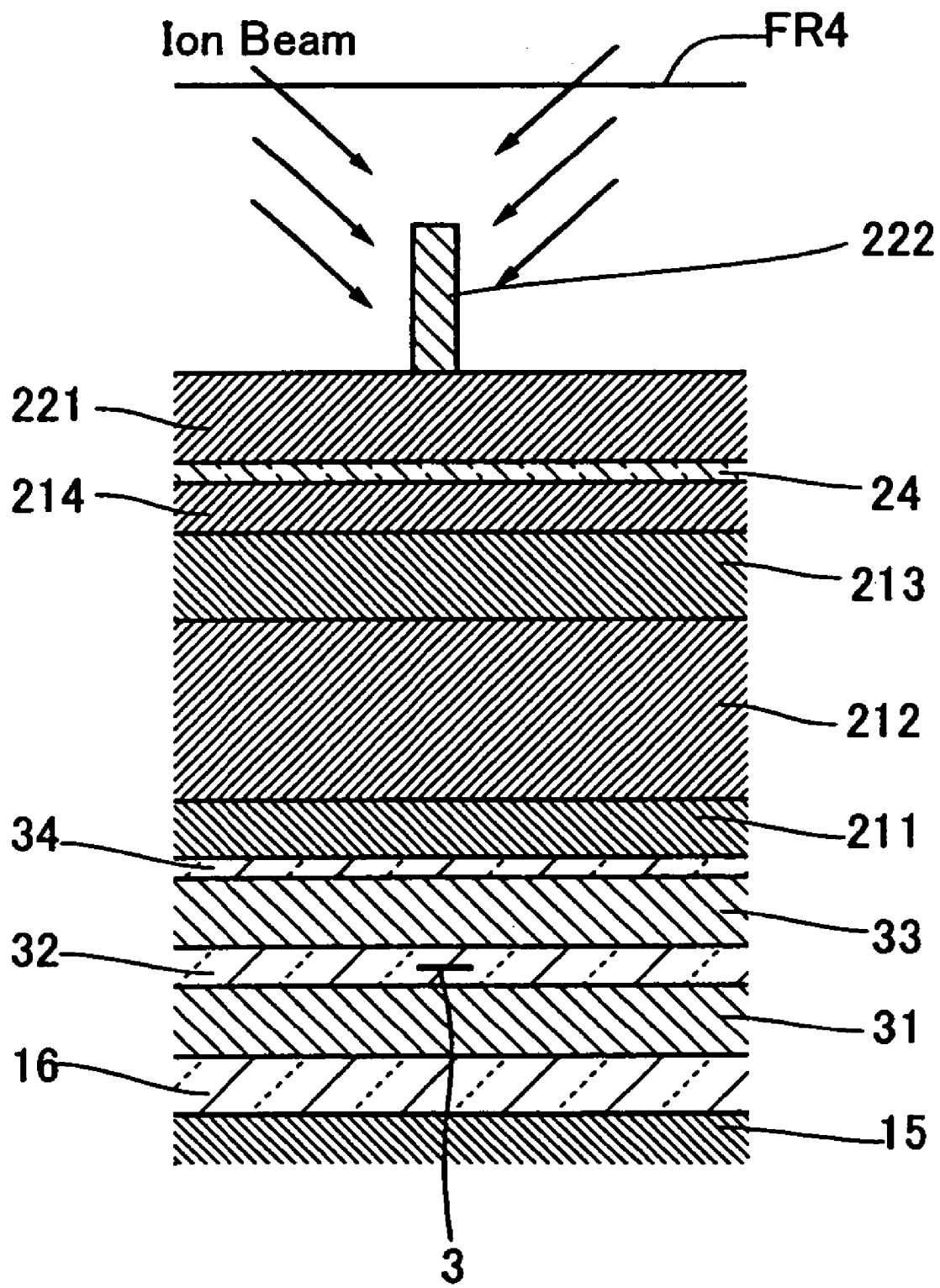
FIG. 59 is a view of the process shown in FIG. 58, seen from the ABS side.

(J) Process Leading to a State of FIGS. 58 and 59

In a process leading from the state of FIG. 57 to the state of FIGS. 58 and 59, the whole wide portion 223 of the third magnetic film 222 except the narrow portion 224 of the third magnetic film 222 is covered with a resist mask FR4. The resist mask FR4 is formed to spread above the first coil 231 and the second coil 232. Also, the resist mask FR4 is formed to have an end face perpendicular to the surface of the narrow portion 224.

Next, as shown in FIGS. 58 and 59, the area not covered with the resist mask FR4 is etched by ion beam. Consequently, the seed film 221 and the narrow portion 224 of the third magnetic film 222 exposed around the resist mask FR4 are trimmed.

The etching with the presence of the resist mask FR4 may be stopped within the thickness of the seed film 221, or may be continued to expose the gap film 24, or may be continued to expose the gap film 24 and then expose the magnetic film 214, which is a part of the first pole portion P1.

Figure 60:
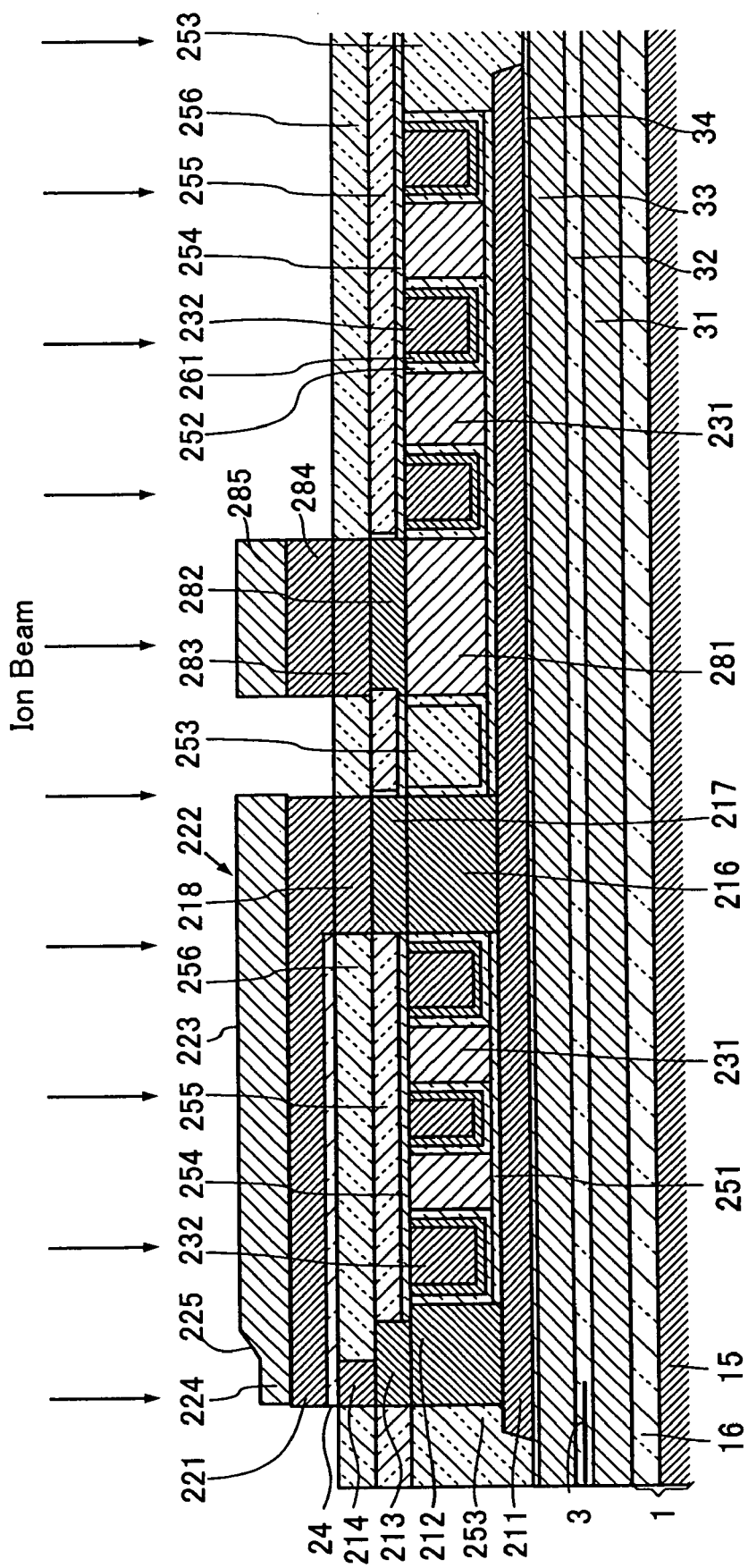
FIG. 60 is a diagram showing a process after the process shown in FIGS. 58 and 59.
Figure 61:
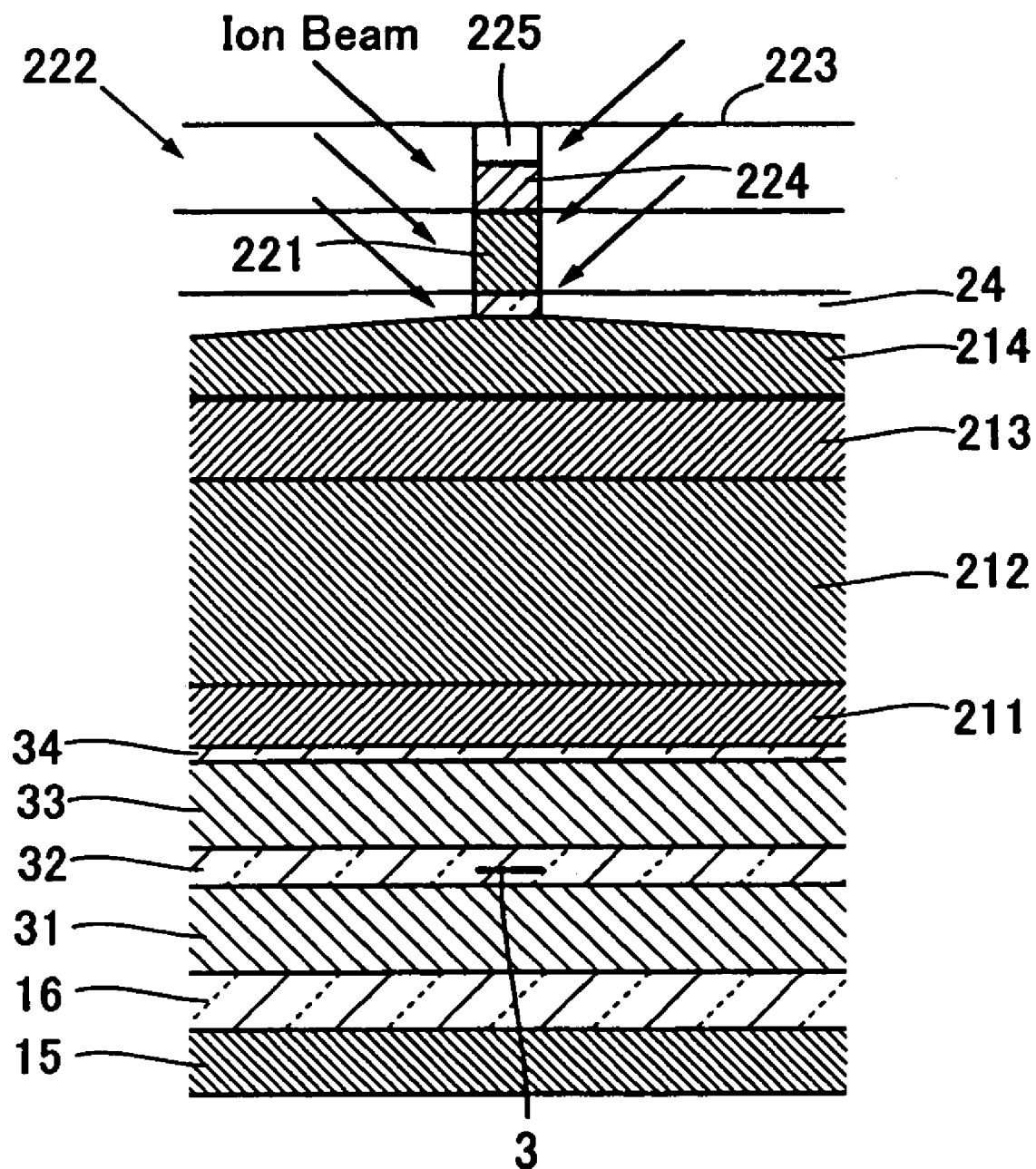
FIG. 61 is a view of the process shown in FIG. 60, seen from the ABS side.

(K) Process Leading to a State of FIGS. 60 and 61

In a process leading from the state of FIGS. 58 and 59 to the state of FIGS. 60 and 61, the resist mask FR4 is removed and then the etching without the resist mask is performed, continued to expose the magnetic film 214. After that, a protective film 258 (see FIG. 2) is deposited thereon and the manufacturing process is finished.

By the above-mentioned etching process, the surface of the narrow portion 224 is trimmed, lowered to a position lower than the surface of the wide portion 223. This produces an sloping flare portion 225 that extends from the narrow portion 224 to the wide portion 223, gradually increasing in width and its surface sloping upward away from the surface of the narrow portion 224 to the surface of the wide portion 223.

Consequently, a three-dimensional difference in level by the sloping flare portion 225 is formed between the surface of the narrow portion 224 forming the second pole portion P2 and the surface of the wide portion 223. The advantage of this three-dimensional difference in level is as already described.

Figure 62:
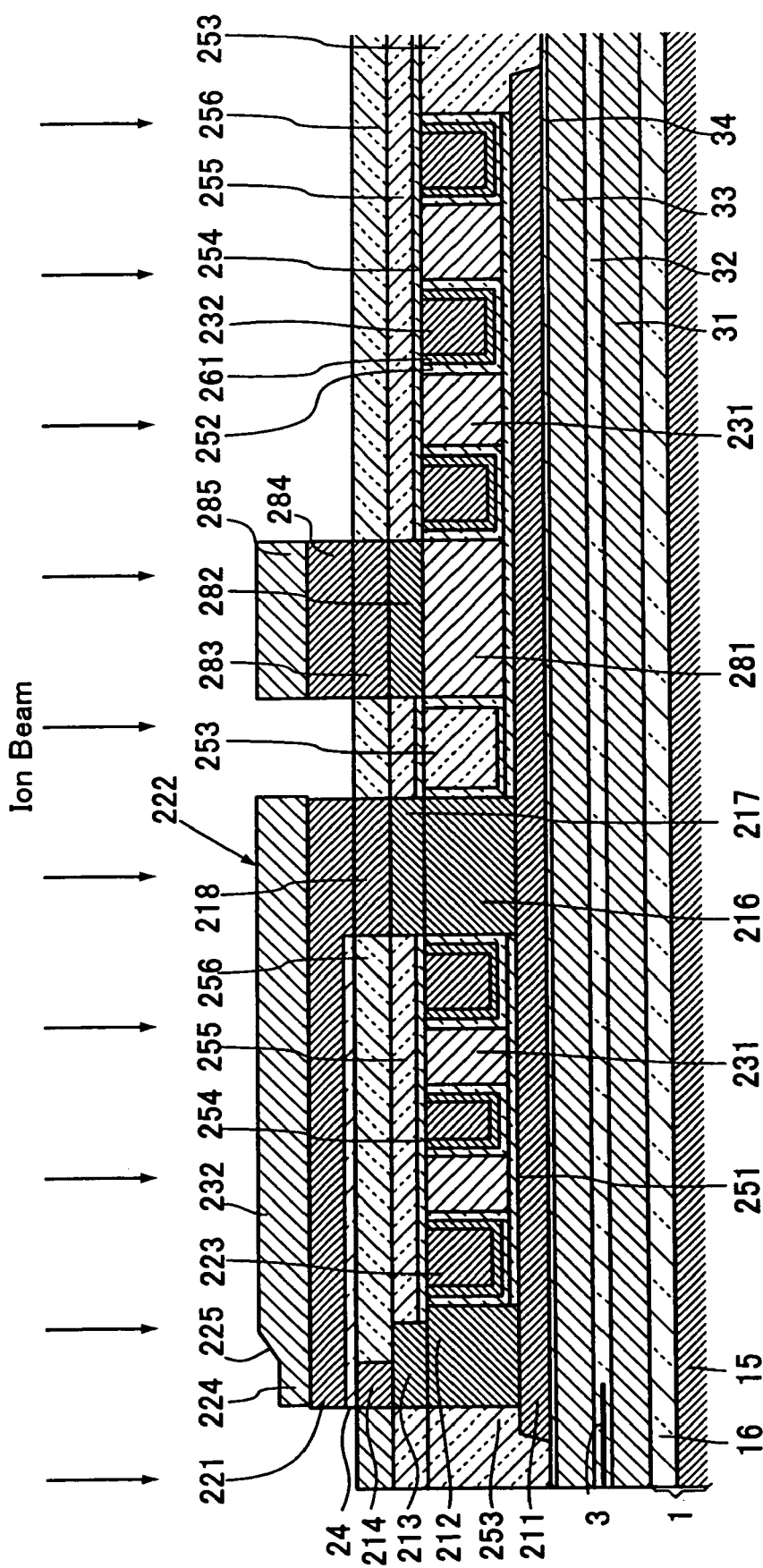
FIG. 62 is a diagram showing a process after the process shown in FIGS. 60 and 61.
Figure 63:
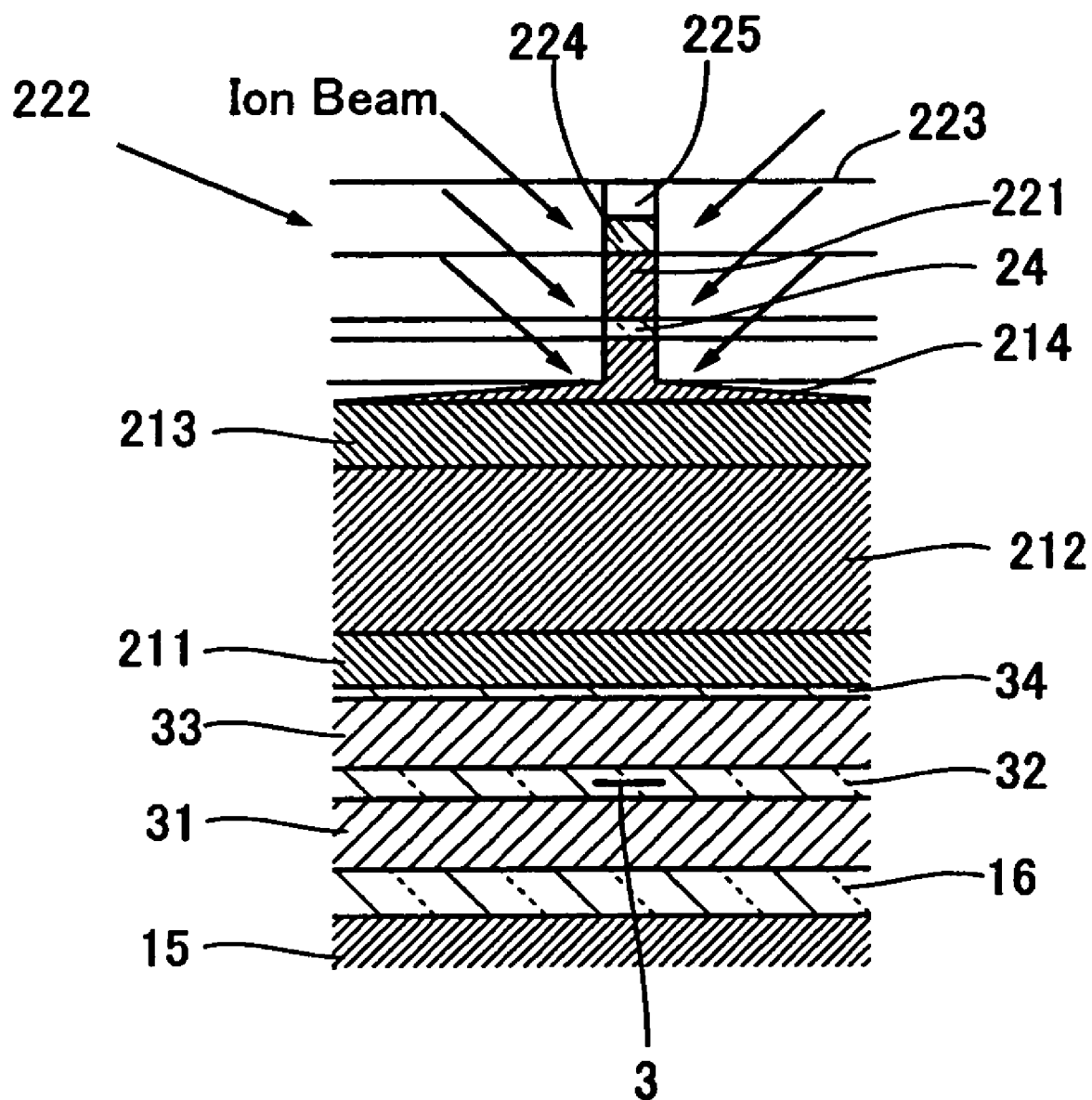
FIG. 63 is a view of the process shown in FIG. 62, seen from the ABS side.

(L) Process Leading to a State of FIGS. 62 and 63

Figure 64:
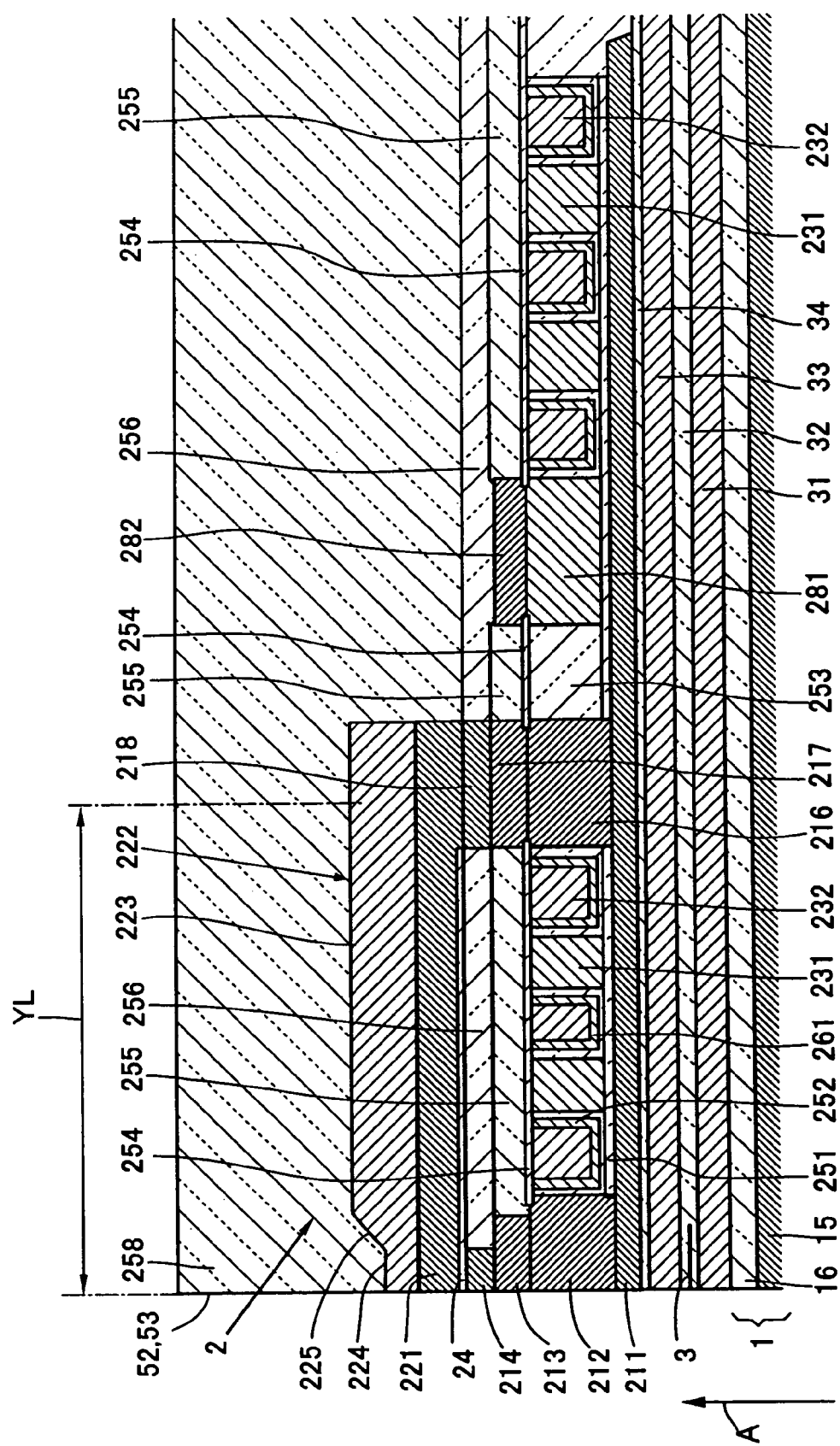
FIG. 64 is a diagram showing a process (finishing process) after the process shown in FIGS. 62 and 63.
Figure 65:
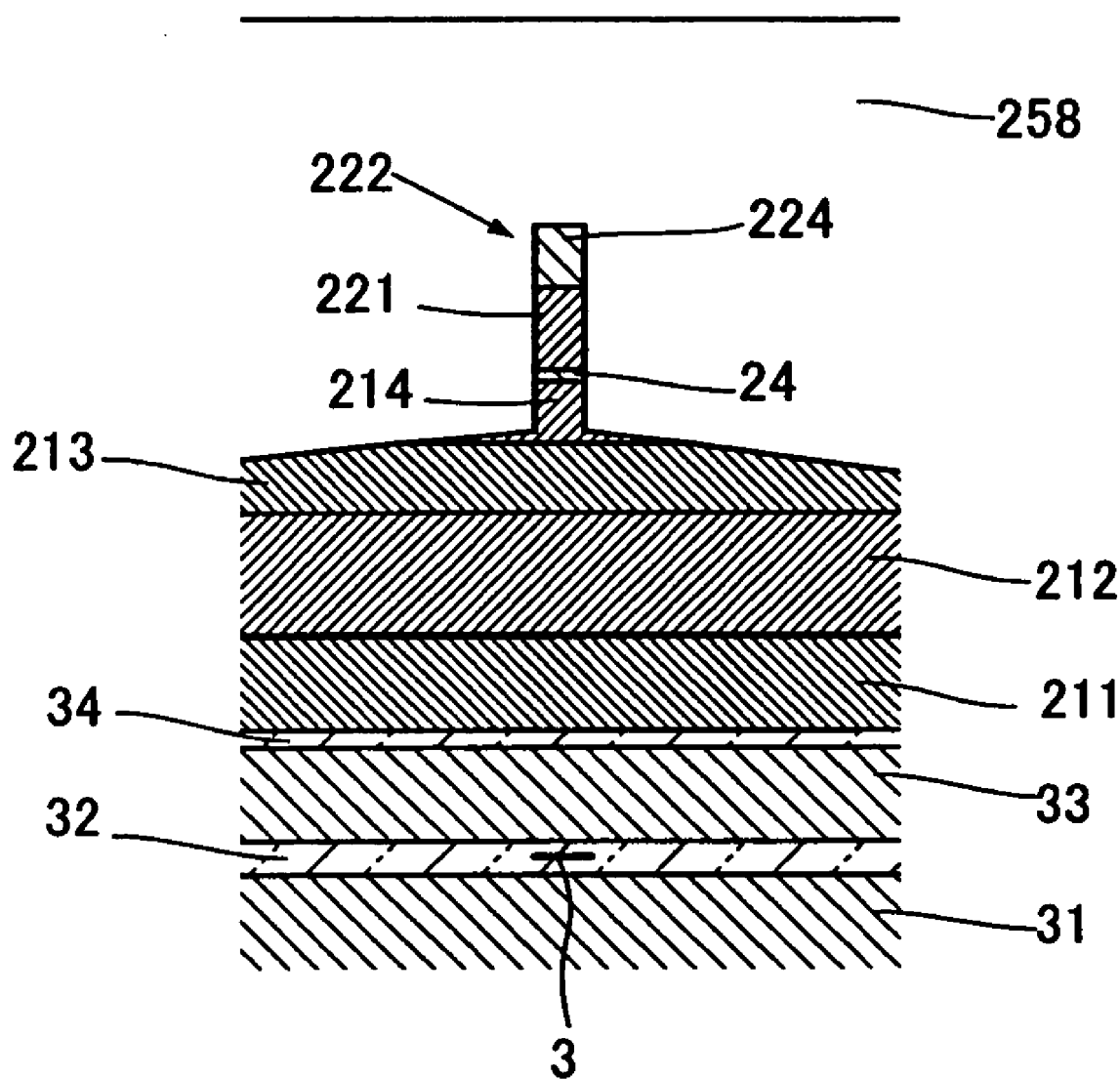
FIG. 65 is a view of the finished state of FIG. 64, seen from the ABS side.

In a process leading from the state of FIGS. 60 and 61 to the state of FIGS. 62 and 63, IBE is performed using the third magnetic film 222 and the second magnetic film 221 as a mask so that the fourth pole piece 214, which is a part of the first pole portion P1, is trimmed to a depth of 0.25 to 0.35 µm. After that, as shown in FIGS. 64 and 65, a protective film 258 is deposited 20 to 40 µm thick thereon. The deposition of the protective film 258 is made by sputtering.

The above-mentioned processes are performed on a wafer. After that, publicly known post-processes of cutting out a bar-shaped head assembly from the wafer, polishing for determining a throat height, processing ABS 52, 53 and the like are performed.

(3) Embodiment 3

Embodiment 3 is a process of manufacturing a thin film magnetic head shown in FIG. 9, and is illustrated in FIGS. 66 to 71. Processes, which have been illustrated and described in embodiment 1 or 2 and are also applied to embodiment 3, are referred to the description of embodiment 1 or 2 and the illustrations of the processes may be omitted.

Figure 66:
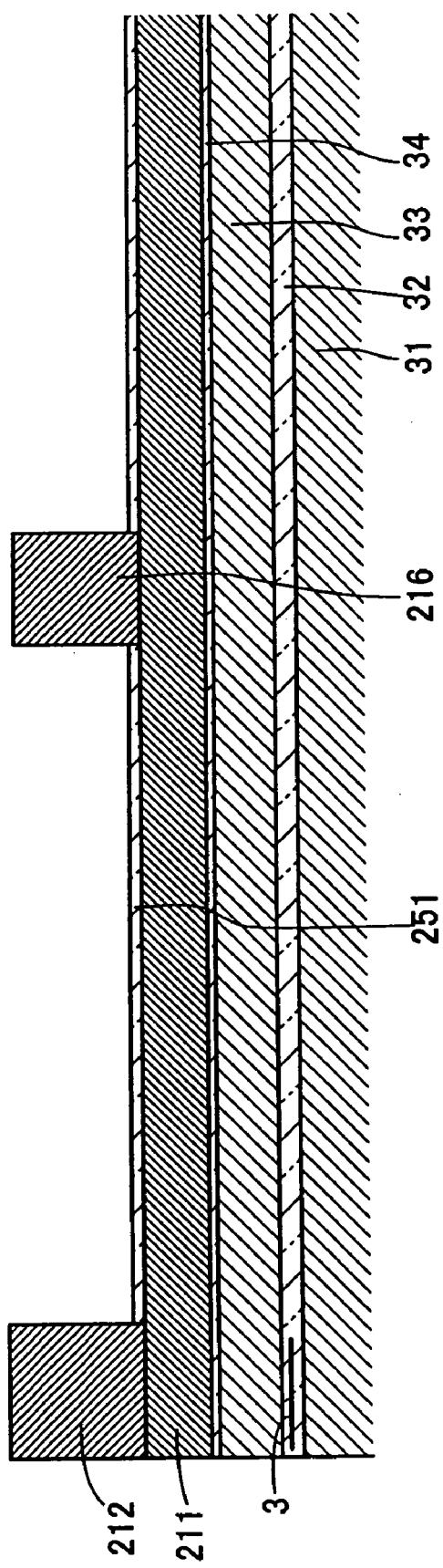
FIG. 66 is a diagram showing a process of manufacturing a thin film magnetic head shown in FIG. 9.

(A) Process Leading to a State of FIG. 66

On an insulating film 16 deposited on a base body 15 there are formed a first shield film 31, a read element 3, an insulating film 32, a second shield film 33, an insulating film 34 and a first magnetic film 211 by means of publicly known processes. After that, an insulating film 251 is formed on the flat surface of the first magnetic film 211, the insulating film 251 having an area slightly larger than an area necessary for forming a coil. The insulating film 251 is formed so as to have openings in parts where a back gap portion and a pole portion are to be formed. After that, the second pole piece 212 and the first back gap piece 216 are formed in the openings. FIG. 66 shows a state in which the second pole piece 212 and the first gap piece 216 have been formed.

Figure 67:
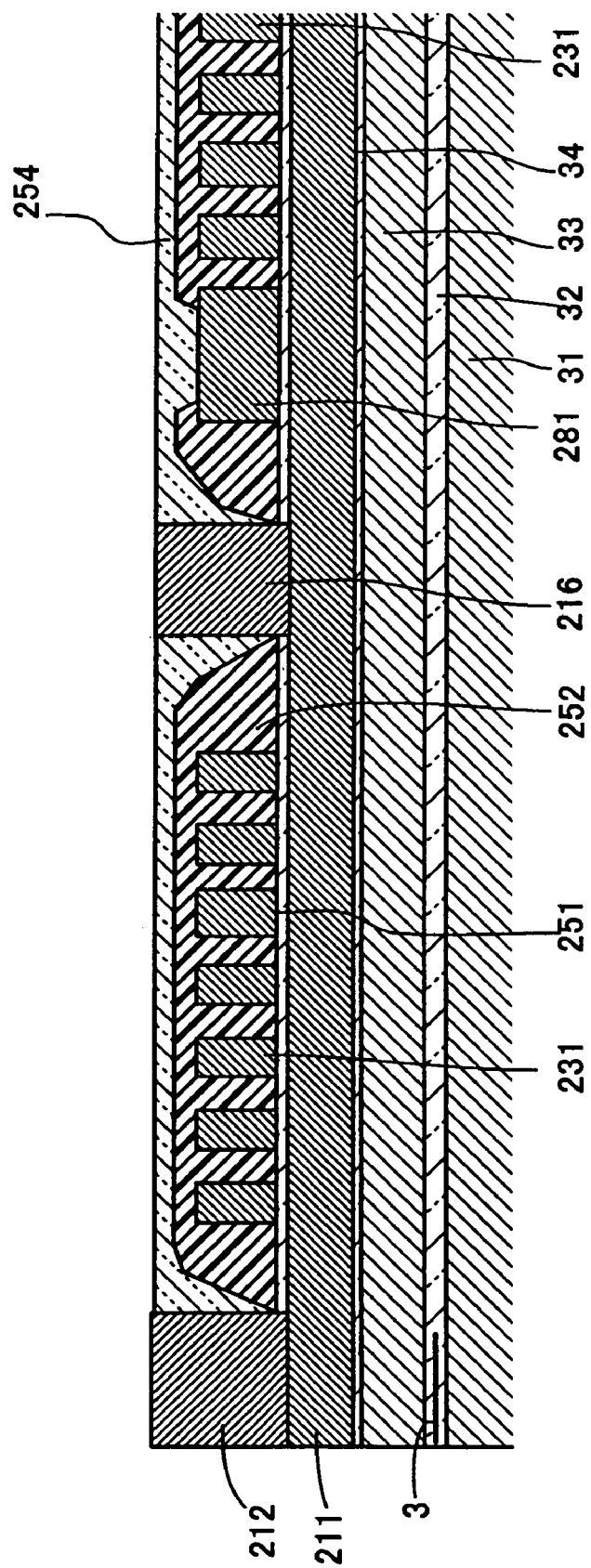
FIG. 67 is a diagram showing a process after the process shown in FIG. 66.

(B) Process Leading to a State of FIG. 67

After the process of FIG. 66, a photolithography process is performed on one surface where the insulating film 251 has been formed, and a resist frame plating method is performed so that a first coil 231 is formed. Next, an insulating film 252 of photoresist is formed in the space between coil turns of the first coil 231.

Next, an insulating film 254 of $Al_2O_3$ is deposited, for example, 3 to 4 µm thick on the surface where the pole piece 212 and the back gap piece 216 have been formed, and then the surfaces of the insulating film 254, the pole piece 212 and the back gap piece 216 are polished by CMP. FIG. 67 shows a state in which the CMP has been performed.

Figure 68:
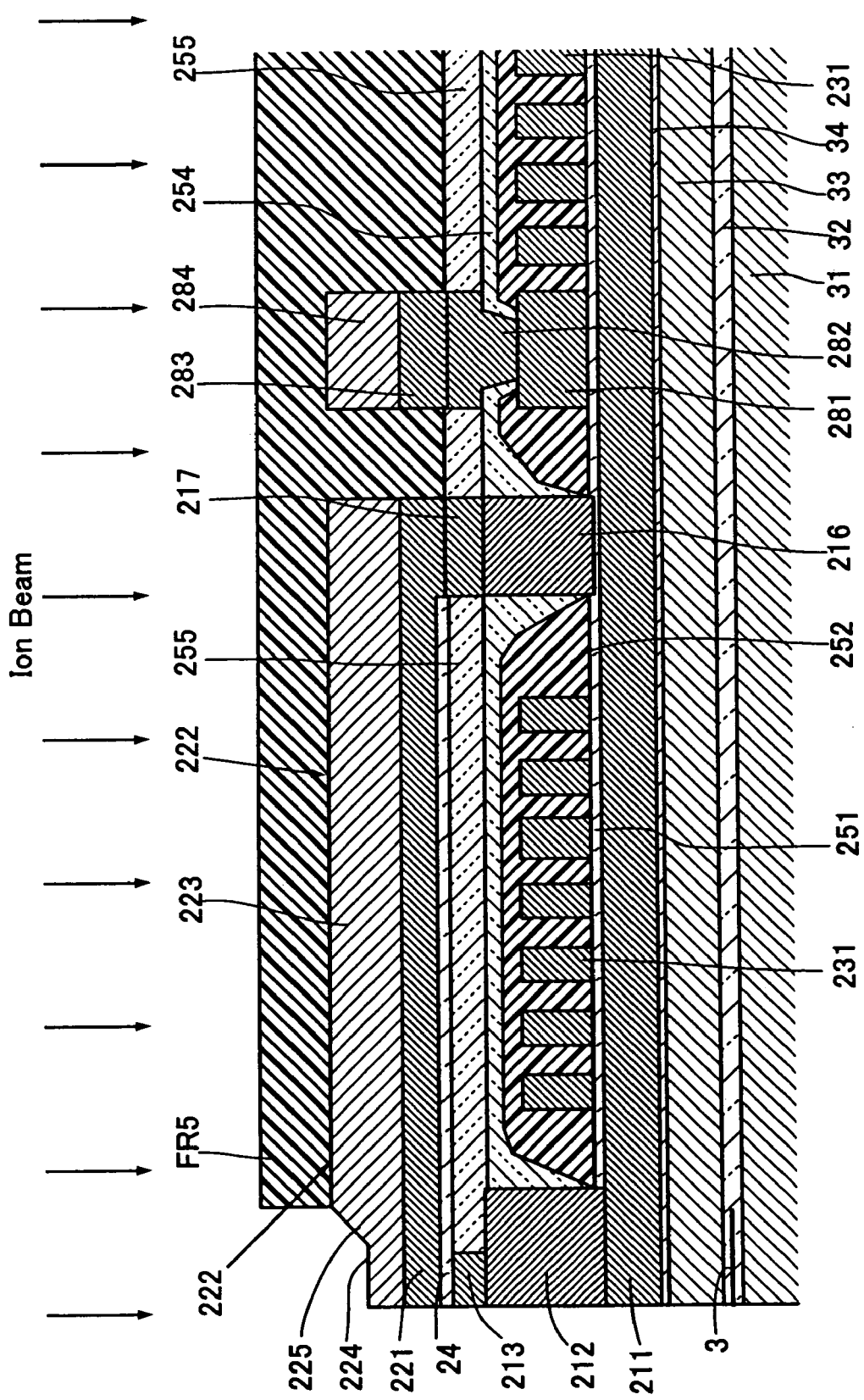
FIG. 68 is a diagram showing a process after the process shown in FIG. 67.
Figure 69:
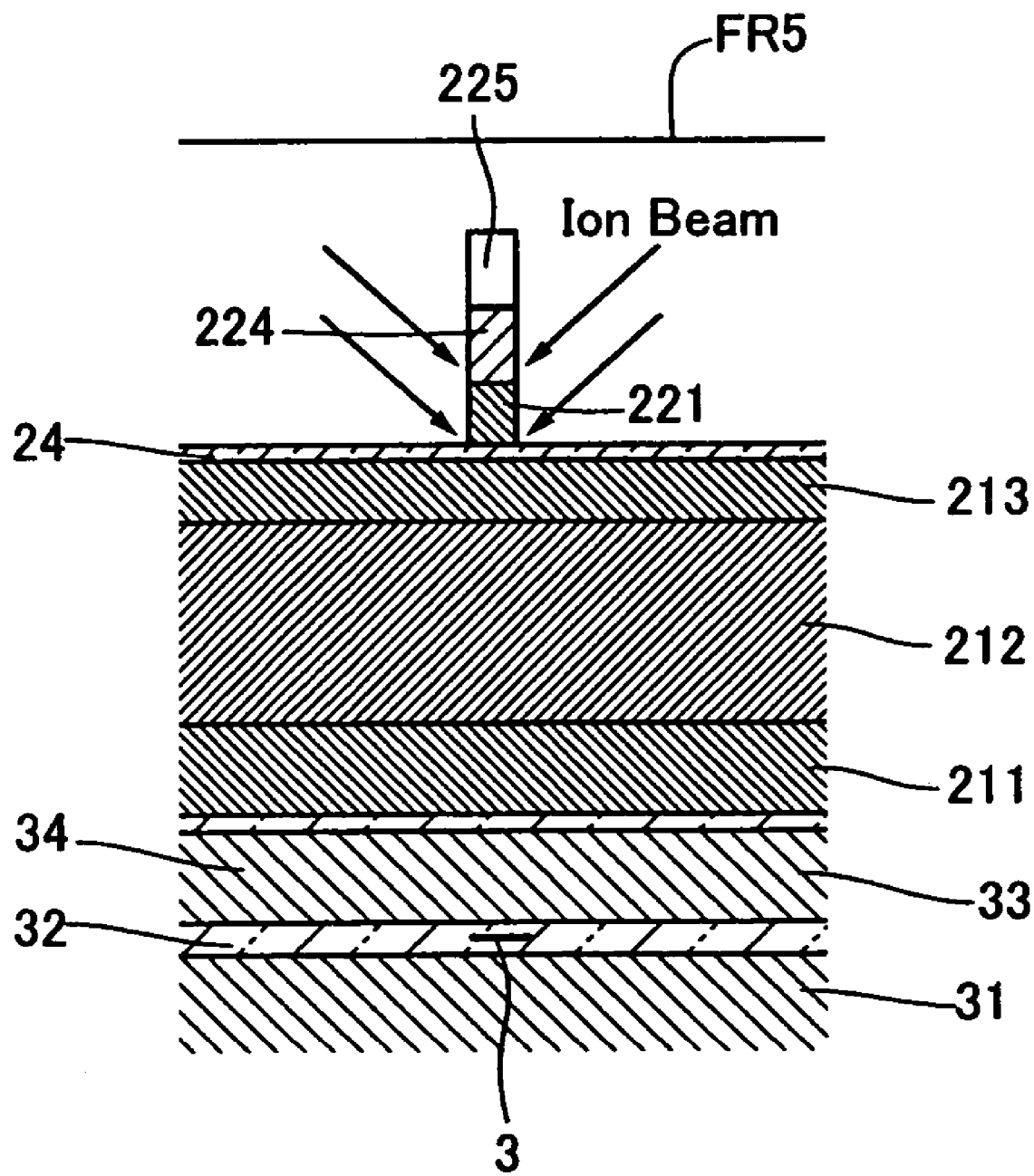
FIG. 69 is a view of the process shown in FIG. 68, seen from the ABS side.

(C) Process Leading to a State of FIGS. 68 and 69

In a process leading from the state of FIG. 67 to the state of FIGS. 68 and 69, the processes of FIGS. 20 to 27 are performed. First, a photolithography process is performed on one surface where the insulating film 254 has been formed, so that a resist frame for a connecting conductor 282 to be connected to the inner end 281 of the first coil 231 and a resist frame for the third pole piece 213 and the back gap piece 217 (see FIG. 27) are formed, and then a frame-plating process is performed according to a pattern defined by the obtained resist frames. Consequently, the connecting conductor 282, the third pole piece 213 and the back gap piece 217 are formed. The connecting conductor 282, the third pole piece 213 and the back gap piece 217 each are a plating film of CoFe or CoNiFe and have a film thickness of 1 to 2 µm, for example (see FIG. 20).

Next, an insulating film 255 of $Al_2O_3$ is deposited on the surface where the connecting conductor 282, the third pole piece 213 and the back gap piece 217 have been formed, and then the surfaces of the insulating film 255, the third pole piece 213, the back gap piece 217 and the connecting conductor 282 are polished by CMP. This CMP is performed so that the third pole piece 213 and the back gap piece 217 become 0.2 to 0.6 µm in thickness, for example (see FIG. 21).

Next, a gap film 24 is formed 0.06 to 0.1 µm thick on the surface flattened by CMP (see FIG. 25). The gap film 24 is made of a non-magnetic metal material such as Ru and formed by sputtering or the like. Next, a second magnetic film 221 is formed on the surface of the gap film 24 and the flattened surface. The second magnetic film 221 is made of an HiBs material. Concretely, CoFe and CoFeN are particularly suitable among HiBs materials such as FeAlN, FeN, CoFe, CoFeN, FeZrN and the like. The second magnetic film 221 is formed, for example, 0.3 to 0.6 µm thick and is to be used as a seed film in the subsequent plating process for forming a third magnetic film.

After that, the third magnetic film 222 is formed by a frame-plating method using the second magnetic film 221 as a seed film. The third magnetic film 222 is made of NiFe (composition ratio, 55:45), CoNiFe (composition ratio, nearly 67:15:18, 1.9 T to 2.1 T), CoFe (composition ratio, 40:60, 2.3 T) or the like. The third magnetic film 222 is 3.5 to 4.0 µm thick. The third magnetic film 222 is formed so as to have a wide portion 223 and a narrow portion 224 (see FIG. 26). The wide portion 223 forms a second yoke portion and the narrow portion 224 forms a second pole portion P2.

Next, the whole wide portion 223 of the third magnetic film 222 except the narrow portion 224 of the third magnetic film 222 is covered with a resist mask FR5 (see FIGS. 27 to 29). The resist mask FR5 is formed to spread above the first coil 231. Also, the resist mask FR5 is formed is formed to have an end face perpendicular to the surface of the narrow portion 224. FIGS. 68 and 69 show a state in which the resist mask FR5 has been formed.

Next, as shown in FIGS. 68 and 69, the area not covered with the resist mask FR5 is etched by ion beam. Consequently, the seed film 221 and the narrow portion 224 of the third magnetic film 222 exposed around the resist mask FR3 are trimmed.

The etching with the presence of the resist mask FR5 may be stopped within the thickness of the seed film 221, or may be continued to expose the gap film 24, or may be continued to expose the gap film 24 and then expose the magnetic film 213, which is a part of the first pole portion P1.

Figure 70:
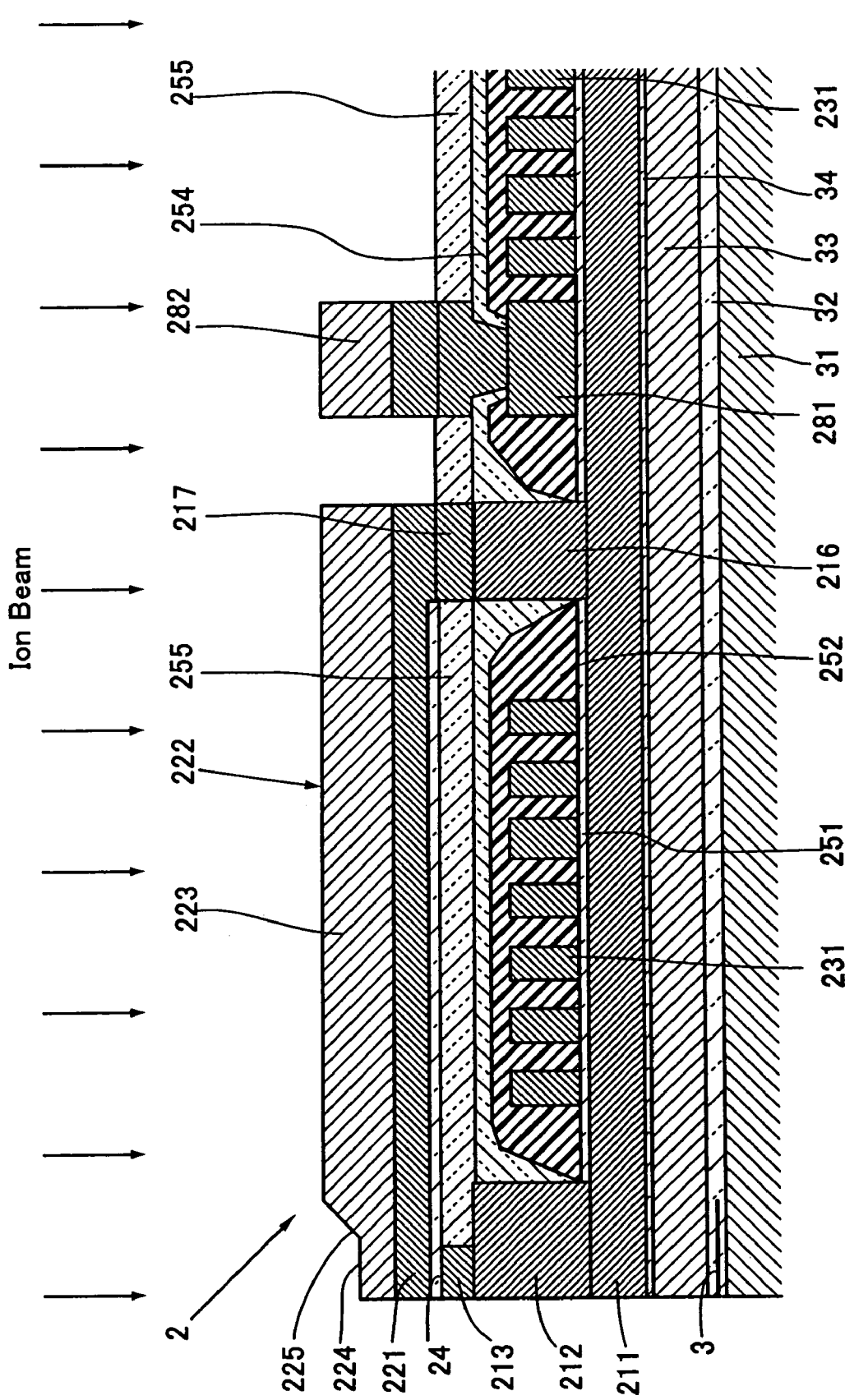
FIG. 70 is a diagram showing a process after the process shown in FIGS. 68 and 69.
Figure 71:
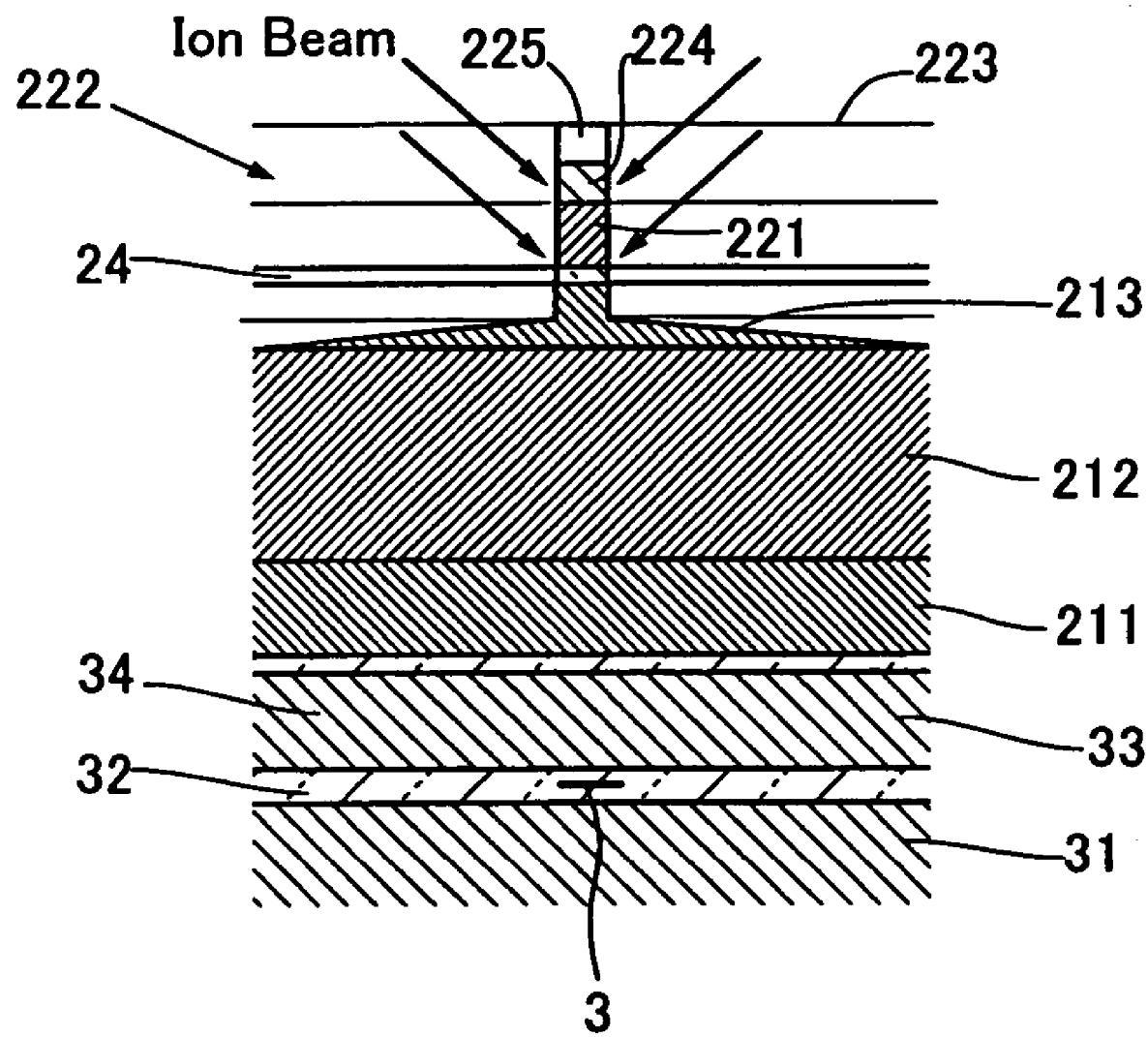
FIG. 71 is a view of the process shown in FIG. 70, seen from the ABS side.

In the illustrated embodiment, referring to FIG. 69, the etching with the presence of the resist mask FR5 is stopped within the thickness of the seed film 221. Next, as shown in FIGS. 70 and 71, the resist mask FR5 is removed and then the etching is performed, continued to expose the magnetic film 214. After that, a protective film 258 (see FIG. 2) is deposited thereon and the manufacturing process is finished.

By the above-mentioned etching process, the surface of the narrow portion 224 is trimmed, lowered to a position lower than the surface of the wide portion 223. This produces a sloping flare portion 225 that extends from the narrow portion 224 to the wide portion 223, gradually increasing in width and its surface sloping upward away from the surface of the narrow portion 224 to the surface of the wide portion 223.

Consequently, a three-dimensional difference in level by the sloping flare portion 225 is formed between the surface of the narrow portion 224 forming the second pole portion P2 and the surface of the wide portion 223. The advantage of this three-dimensional difference in level is as already described.

3. Magnetic Head Device and a Magnetic Recording/reproducing Apparatus

Figure 72:
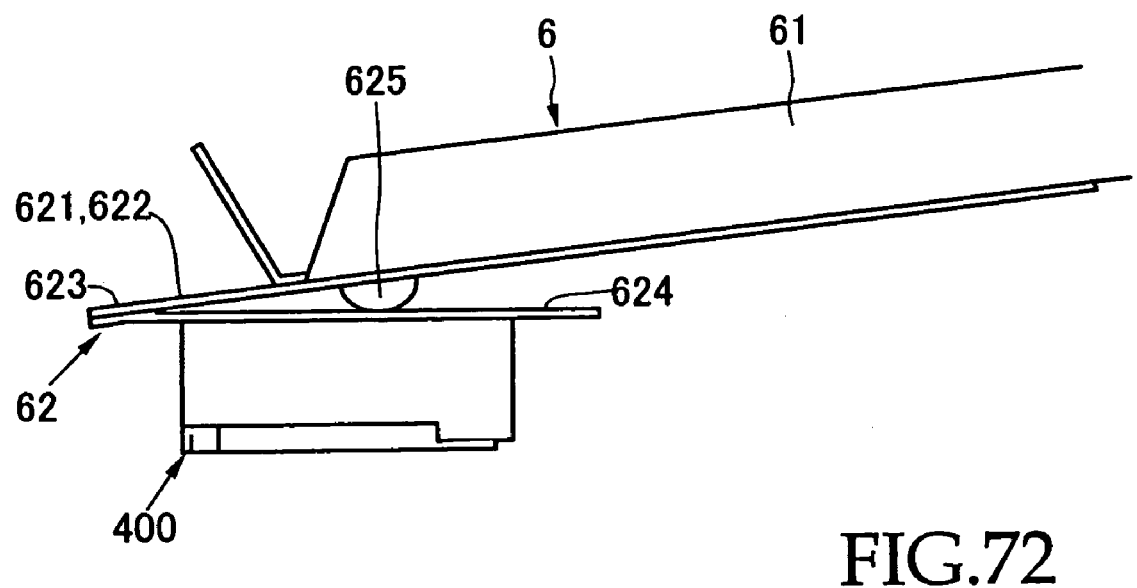
FIG. 72 is a front view of a magnetic head device using a thin film magnetic head according to the present invention.
Figure 73:
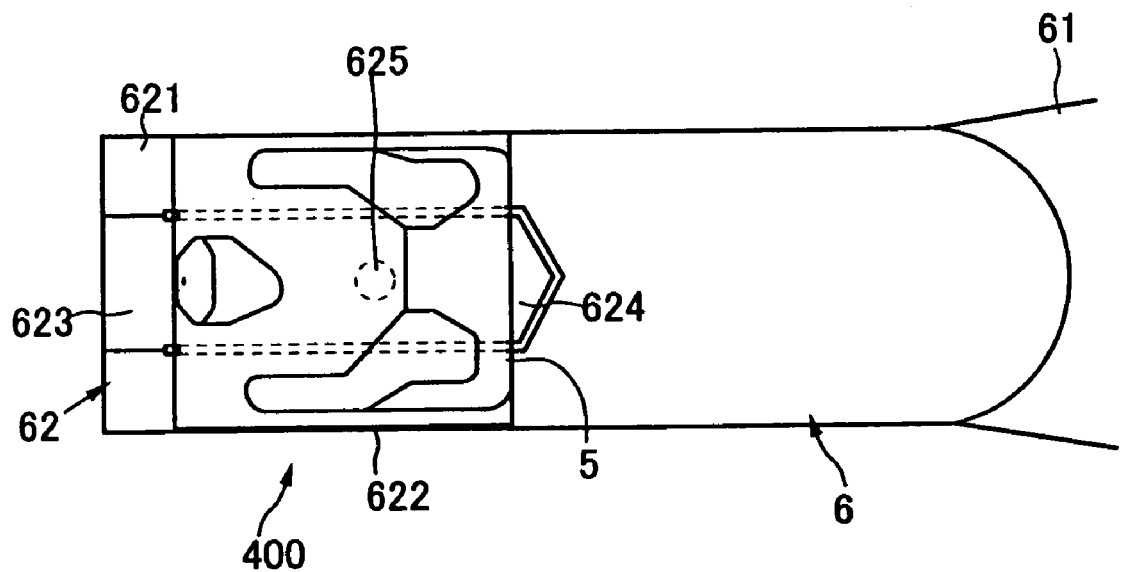
FIG. 73 is a view of the magnetic head device shown in FIG. 72, seen from the bottom side (ABS side)

The present invention also discloses a magnetic head device and a magnetic recording/reproducing apparatus. Referring to FIGS. 72 and 73, a magnetic head device according to the present invention comprises a thin film magnetic head 400 shown in FIGS. 1 to 9 and a head supporting device 6. The structure of the head supporting device 6 is as follows: a flexible member 62 made of a metal sheet is attached to a free end of a supporting member 61 made of a metal sheet, the free end being at one end in the longitudinal direction; and the thin film magnetic head 400 is attached to the lower surface of the flexible member 62.

Specifically, the flexible member 62 comprises: two outer frame portions 621 and 622 extending nearly in parallel with the longitudinal axial line of the supporting member 61; a lateral frame 623 for connecting the outer frame portions 621 and 622 at the end which is distant from the supporting member 61; and a tongue-shaped piece 624 extending nearly from the middle part of the lateral frame 623 nearly in parallel with the outer frame portions 621 and 622 and having a free end at the tip. One end of the flexible member 62 opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transmits load from the free end of the supporting member 61 to the tongue-shaped piece 624.

The thin film magnetic head 400 is joined to the lower surface of the tongue-shaped piece 624 by means of adhesion or the like. The thin film magnetic head 400 is supported so as to allow pitching and rolling actions.

A head supporting device to which the present invention is applied is not limited to the above-described embodiment. The present invention can also be applied to head supporting devices which have been proposed up to now or will be proposed in the future. For example, the present invention can be applied to a head supporting device obtained by integrating the supporting member 61 and the tongue-shaped piece 624 by a flexible high-molecular wiring sheet such as a TAB tape (TAB: tape automated bonding), and a head supporting device having a publicly known conventional gimbals structure.

Figure 74:
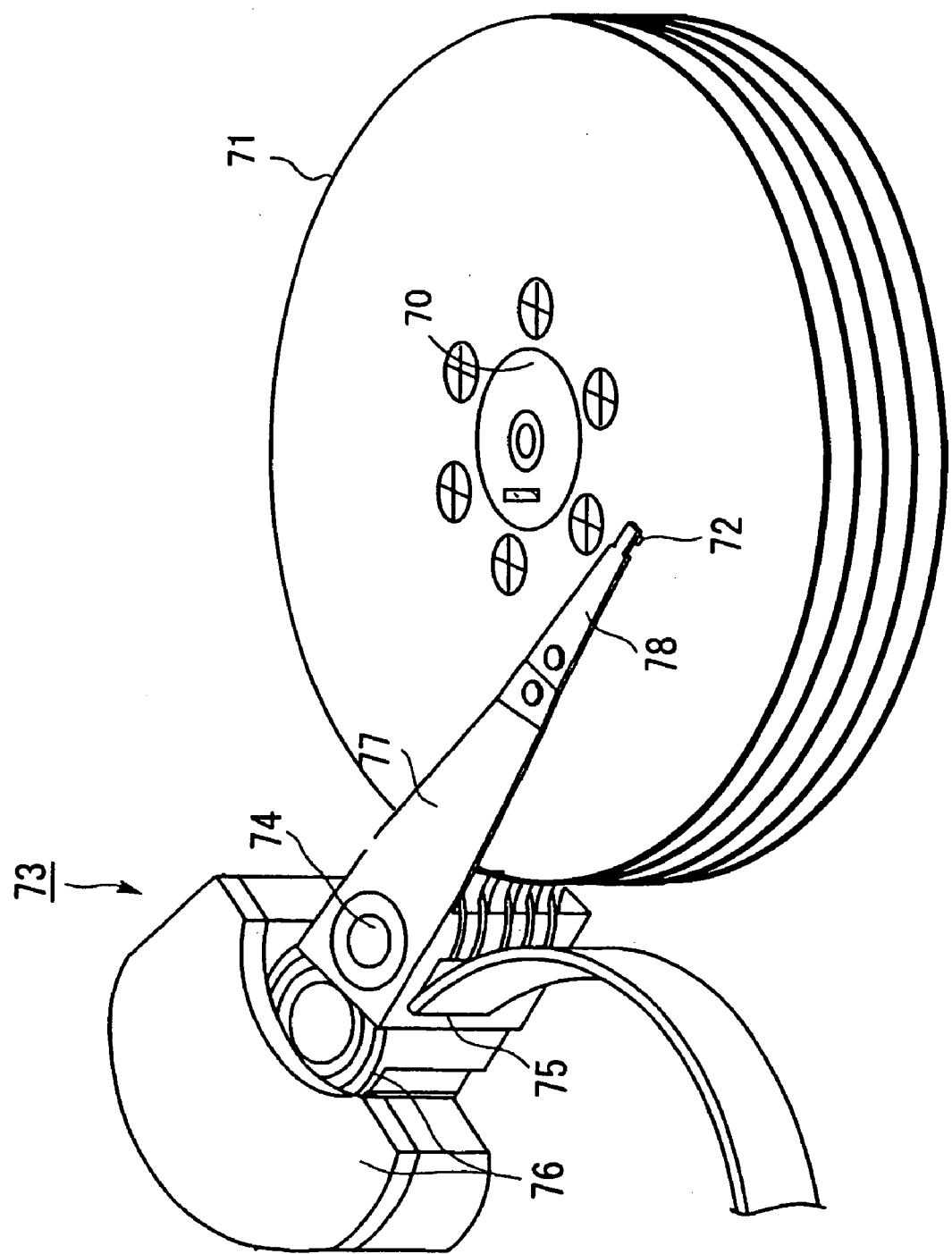
FIG. 74 is a perspective view roughly showing a magnetic recording/reproducing apparatus having a magnetic head device comprising a thin film magnetic head according to the present invention and a magnetic recording medium combined with one another.

Next, referring to FIG. 74, a magnetic recording/reproducing apparatus according to the present invention comprises a magnetic disk 71 provided so as to be capable of turning around an axis 70, a thin film magnetic head 72 for recording and reproducing information on the magnetic disk 71 and an assembly carriage device 73 for positioning the thin film magnetic head 72 on a track of the magnetic disk 71.

The assembly carriage device 73 comprises a carriage 75 capable of turning around an axis 74 and an actuator 76 composed of, for example, a voice coil motor (VCM) for turning this carriage 75, as main components.

The base portion of a plurality of driving arms 77 stacked in the axial direction of the axis 74 is attached to the carriage 75, and a head suspension assembly 78 with a thin film magnetic head 72 is fixedly joined to the tip of each driving arm 77. Each head suspension assembly 78 is joined to the tip of a driving arm 77 so that a thin film magnetic head 72 on the tip of the head suspension assembly 78 faces the surface of each magnetic disk 71.

The driving arm 77, head suspension assembly 78 and thin film magnetic head 72 form the magnetic head device described with reference to FIGS. 72 and 73. The thin film magnetic head 72 has the structure shown in FIGS. 1 to 9. Thus, the magnetic recording/reproducing apparatus shown in FIG. 86 exhibits the action and effect described with reference to FIGS. 1 to 9.

Although the contents of the present invention have been concretely described above with reference to the preferred embodiments, it is obvious that people in this field can take various variations on the basis of the basic technical idea and teachings of the present invention.

What is claimed is:

1. A thin film magnetic head comprising a write element, said write element comprising:
    a first yoke portion formed of a first magnetic film and having a flat surface;
    a first pole portion projecting from the flat surface of said first magnetic film at a medium-facing surface and having a reduced width at its upper end;
    a gap film;
    a second pole portion facing the upper end of said first pole portion, separated from the upper end of said first pole portion by said gap film and having the same width as the upper end of said first pole portion;
    a second yoke portion comprising:
        a wide portion having a flat surface and connected to said first magnetic film by a back gap portion that is recessed in the thin film magnetic head from the medium-facing surface;
        a narrow portion forming said second pole portion and the surface of the narrow portion being at a position lower than the surface of said wide portion; and
        a flare portion extending from said narrow portion to said wide portion, gradually increasing in width and its surface sloping upward away from the surface of said narrow portion to the surface of said wide portion; and
    a coil surrounding in a spiral form said back gap portion on a first insulating film formed on the flat surface of said first magnetic films,
    wherein said second yoke portion comprises a second magnetic film and a third magnetic film deposited on said second magnetic film, said wide portion is formed of the uniform-thickness parts of said second and third magnetic films and the surfaces of said narrow portion and sloping flare portion are obtained by etching part of the surface of said third magnetic film.

2. A thin film magnetic head according to claim 1, wherein:
    said first pole portion includes a pole piece adjacent to said gap film, said pole piece trimmed at both sides in the width direction to have a narrow part having substantially the same width as said second pole portion and a base part connected to said narrow portion, increasing in thickness toward said narrow part.

3. A thin film magnetic head according to claim 2, wherein:
said pole piece adjacent to said gap film comprises one of CoFe, CoFeN, FeAlN, FeN, FeCo and FeZrN.

4. A thin film magnetic head according to claim 1, wherein:
said second magnetic film comprises a magnetic material containing Co and Fe.

5. A thin film magnetic head according to claim 4, wherein:
said second magnetic film comprises one of CoFe and CoFeN.

6. A thin film magnetic head according to claim 5, wherein:
said second magnetic film is a sputtering film.

7. A thin film magnetic head according to claim 1, wherein:
said coil comprises a first coil and a second coil;
said first coil and said second coil surround in a spiral form said back gap portion on said first insulating film formed on the flat surface of said first magnetic film, and one of said first and second coils is fitted into the space between coil turns of the other, insulated from the coil turns of the other by a second insulating film, and said first and second coils are connected to each other so as to generate magnetic flux in the same direction; and
the upper surfaces of said first and second coils form the same plane.

8. A thin film magnetic head according to claim 7, wherein:
said first coil is a plating film and is formed on said first insulating film; and
said second coil is a plating film and is formed on said second insulating film in said space, and said second insulating film is formed on the bottom face and both side faces of said space.

9. A thin film magnetic head according to claim 7, wherein:
said first pole portion comprises a first pole piece, a second pole piece, a third pole piece and a fourth pole piece;
said first pole piece is formed of an end of said first magnetic film;
said second pole piece has one surface being adjacent to said first pole piece;
said third pole piece has one surface being adjacent to the other surface of said second pole piece;
said fourth pole piece has one surface being adjacent to the other surface of said third pole piece and the other surface being adjacent to said gap film;
the other surface of said second pole piece is flattened to be located at the same level as the flattened surfaces of said first and second coils;
the other surface of said third pole piece is flattened to be located at the same level as the surface of a third insulating film provided on the flattened surfaces of said first and second coils;
the other surface of said fourth pole piece is flattened to be located at the same level as the surface of a fourth insulating film provided on said third insulating film; and
said gap film is on the flattened surfaces of said fourth pole piece and said fourth insulating film.

10. A thin film magnetic head according to claim 9, wherein:

said second yoke portion comprises a second magnetic film and a third magnetic film deposited on said second magnetic film;
said wide portion is formed of the uniform-thickness parts of said second and third magnetic films; and
said fourth pole piece has a greater film thickness than the difference in level between the surface of said wide portion of said second and third magnetic films and the surface of the second pole portion.

11. A thin film magnetic head according to claim 1, wherein:
said coil has the space between coil turns, said space being filled up with an organic insulating resin;
said coil and said organic insulating resin are covered with a fifth insulating film of an inorganic insulating material;
said fifth insulating film has a flattened surface;
said first pole portion comprises a first pole piece, a second pole piece and a third pole piece;
said first pole piece is formed of an end of said first magnetic film;
said second pole piece has one surface being adjacent to said first pole piece;
said third pole piece has one surface being adjacent to the other surface of said second pole piece;
the other surface of said second pole piece is flattened to be located at the same level as the flattened surface of said fifth insulating film;
the other surface of said third pole piece is flattened to be located at the same level as the surface of a sixth insulating film provided on the flattened surface of said fifth insulating film; and
said gap film is on the flattened surfaces of said third pole piece and said sixth insulating film.

12. A thin film magnetic head according to claim 1, further comprising a read element, wherein:
said read element comprises a giant magnetoresistance effect element.

13. A thin film magnetic head according to claim 12, wherein:
said giant magnetoresistance effect element comprises one of a spin valve film and a ferromagnetic tunnel junction.

14. A magnetic recording/reproducing apparatus comprising a thin film magnetic head and a magnetic recording medium, said thin film magnetic head comprising a write element, wherein:
said write element comprises a first yoke portion, a first pole portion, a gap film, a second pole portion, a second yoke portion and a coil;
said first yoke portion is formed of a first magnetic film and has a flat surface;
said first pole portion projects from the flat surface of said first magnetic film at a medium-facing surface and has a reduced width at its upper end;
said second pole portion faces the upper end of said first pole portion, separated from the upper end of said first pole portion by said gap film and has the same width as the upper end of said first pole portion;
said second yoke portion comprises:
a wide portion having a flat surface and connected to said first magnetic film by a back gap portion that is recessed in the thin film magnetic head from the medium-facing surface;
a narrow portion forming said second pole portion and the surface of the narrow portion being at a position lower than the surface of said wide portion;

a flare portion extending from said narrow portion to said wide portion, gradually increasing in width and its surface sloping upward away from the surface of said narrow portion to the surface of said wide portion; and said coil surrounds in a spiral form said back gap portion on a first insulating film formed on the flat surface of said first magnetic film; and said magnetic recording medium performs magnetic recording/reproducing operations in cooperation with said thin film magnetic head, wherein said second yoke portion comprises a second magnetic film and a third magnetic film deposited on said second magnetic film, said wide portion is formed of the uniform-thickness parts of said second and third magnetic films and the surfaces of said narrow portion and sloping flare portion are obtained by etching part of the surface of said third magnetic film.

15. A magnetic recording/reproducing apparatus according to claim 14, wherein:

said first pole portion includes a pole piece adjacent to said gap film, said pole piece trimmed at both sides in the width direction to have a narrow part having substantially the same width as said second pole portion and a base part connected to said narrow portion, increasing in thickness toward said narrow part.

16. A magnetic recording/reproducing apparatus according to claim 15, wherein:

said pole piece adjacent to said gap film comprises one of CoFe, CoFeN, FeAlN, FeN, FeCo and FeZrN.

17. A magnetic recording/reproducing apparatus according to claim 14, wherein:

said second magnetic film comprises a magnetic material containing Co and Fe.

18. A magnetic recording/reproducing apparatus according to claim 17, wherein:

said second magnetic film comprises one of CoFe and CoFeN.

19. A magnetic recording/reproducing apparatus according to claim 17, wherein:

said second magnetic film is a sputtering film.

20. A magnetic recording/reproducing apparatus according to claim 14 wherein:

said coil comprises a first coil and a second coil;

said first coil and said second coil surround in a spiral form said back gap portion on said first insulating film formed on the flat surface of said first magnetic film, and one of said first and second coils is fitted into the space between coil turns of the other, insulated from the coil turns of the other by a second insulating film, and said first and second coils are connected to each other so as to generate magnetic flux in the same direction; and the upper surfaces of said first and second coils form the same plane.

21. A magnetic recording/reproducing apparatus according to claim 20, wherein:

said first coil is a plating film and is formed on said first insulating film; and said second coil is a plating film and is formed on said second insulating film in said space, and said second insulating film is formed on the bottom face and both side faces of said space.

22. A magnetic recording/reproducing apparatus according to claim 20, wherein:

said first pole portion comprises a first pole piece, a second pole piece, a third pole piece and a fourth pole piece;

said first pole piece is formed of an end of said first magnetic film;

said second pole piece has one surface being adjacent to said first pole piece;

said third pole piece has one surface being adjacent to the other surface of said second pole piece;

said fourth pole piece has one surface being adjacent to the other surface of said third pole piece and the other surface being adjacent to said gap film;

the other surface of said second pole piece is flattened to be located at the same level as the flattened surfaces of said first and second coils;

the other surface of said third pole piece is flattened to be located at the same level as the surface of a third insulating film provided on the flattened surfaces of said first and second coils;

the other surface of said fourth pole piece is flattened to be located at the same level as the surface of a fourth insulating film provided on said third insulating film; and said gap film is on the flattened surfaces of said fourth pole piece and said fourth insulating film.

23. A magnetic recording/reproducing apparatus according to claim 22, wherein:

said second yoke portion comprises a second magnetic film and a third magnetic film deposited on said second magnetic film;

said wide portion is formed of the uniform-thickness parts of said second and third magnetic films; and said fourth pole piece has a greater film thickness than the difference in level between the surface of said wide portion of said second and third magnetic films and the surface of the second pole portion.

24. A magnetic recording/reproducing apparatus according to claim 14, wherein:

said coil has the space between coil turns, said space being filled up with an organic insulating resin;

said coil and said organic insulating resin are covered with a fifth insulating film of an inorganic insulating material;

said fifth insulating film has a flattened surface;

said first pole portion comprises a first pole piece, a second pole piece and a third pole piece;

said first pole piece is formed of an end of said first magnetic film;

said second pole piece has one surface being adjacent to said first pole piece;

said third pole piece has one surface being adjacent to the other surface of said second pole piece;

the other surface of said second pole piece is flattened to be located at the same level as the flattened surface of said fifth insulating film;

the other surface of said third pole piece is flattened to be located at the same level as the surface of a sixth insulating film provided on the flattened surface of said fifth insulating film; and said gap film is on the flattened surfaces of said third pole piece and said sixth insulating film.

25. A magnetic recording/reproducing apparatus according to claim 14, further comprising a read element, wherein:

said read element comprises a giant magnetoresistance effect element.

26. A magnetic recording/reproducing apparatus according to claim 25, wherein:

said giant magnetoresistance effect element comprises one of a spin valve film and a ferromagnetic tunnel junction.

27. A method for manufacturing a thin film magnetic head comprising a write element, wherein:

said write element comprises a first yoke portion, a first pole portion, a gap film, a second pole portion, a second yoke portion and a coil;

said first yoke portion is formed of a first magnetic film and has a flat surface;

said first pole portion projects from the flat surface of said first magnetic film at a medium-facing surface and has a reduced width at its upper end;

said second pole portion faces the upper end of said first pole portion, separated from the upper end of said first pole portion by said gap film and has the same width as the upper end of said first pole portion;

said second yoke portion comprises;
- a wide portion having a flat surface and connected to said first magnetic film by a back gap portion that is recessed in the thin film magnetic head from the medium-facing surface;
- a narrow portion forming said second pole portion and the surface of the narrow portion being at a position lower than the surface of said wide portion; and
- a flare portion extending from said narrow portion to said wide portion, gradually increasing in width and its surface sloping upward away from the surface of said narrow portion to the surface of said wide portion; and said coil surrounds in a spiral form said back gap portion on a first insulating film formed on the flat surface of said first magnetic film;

said method comprising the steps of:

forming said second yoke portion of an uniform film thickness;

covering the whole wide portion of said second yoke portion with a resist mask, except for the narrow portion of said second yoke portion; and etching at least the parts of said second yoke portion which are not covered with said resist mask and are to form said second pole portion and said sloping flare portion, thereby obtaining a narrow track width.

28. A manufacturing method according to claim 27, wherein:

said second yoke portion comprises a second magnetic film and a third magnetic film deposited on said second magnetic film; and said etching step comprises the steps of;
- etching said third magnetic film with the presence of said resist mask;
- removing said resist mask after etching said third magnetic film; and
- etching said second magnetic film after removing said resist mask.

29. A manufacturing method according to claim 27, wherein:

said etching step comprises the steps of;
- etching said second pole portion with the presence of said resist mask, to expose the surface of said gap film;
- removing said resist mask; and
- etching said gap film and said second pole portion after removing said resist mask.

* * * * *